Oct. 7, 1947. K. L. BURGENER 2,428,550
CYCLIC CONTROL MEANS FOR LINE RELAYS
Original Filed Feb. 9, 1945 14 Sheets-Sheet 1

FIG. 1

INVENTOR.
KARL L. BURGENER
BY
Davis, Lindsey, Smith & Shonts
Attorneys

Oct. 7, 1947.　　　K. L. BURGENER　　　2,428,550
CYCLIC CONTROL MEANS FOR LINE RELAYS
Original Filed Feb. 9, 1945　　14 Sheets-Sheet 4

INVENTOR.
KARL L. BURGENER
BY
Davis, Lindsey, Smith & Shonts
Attorneys

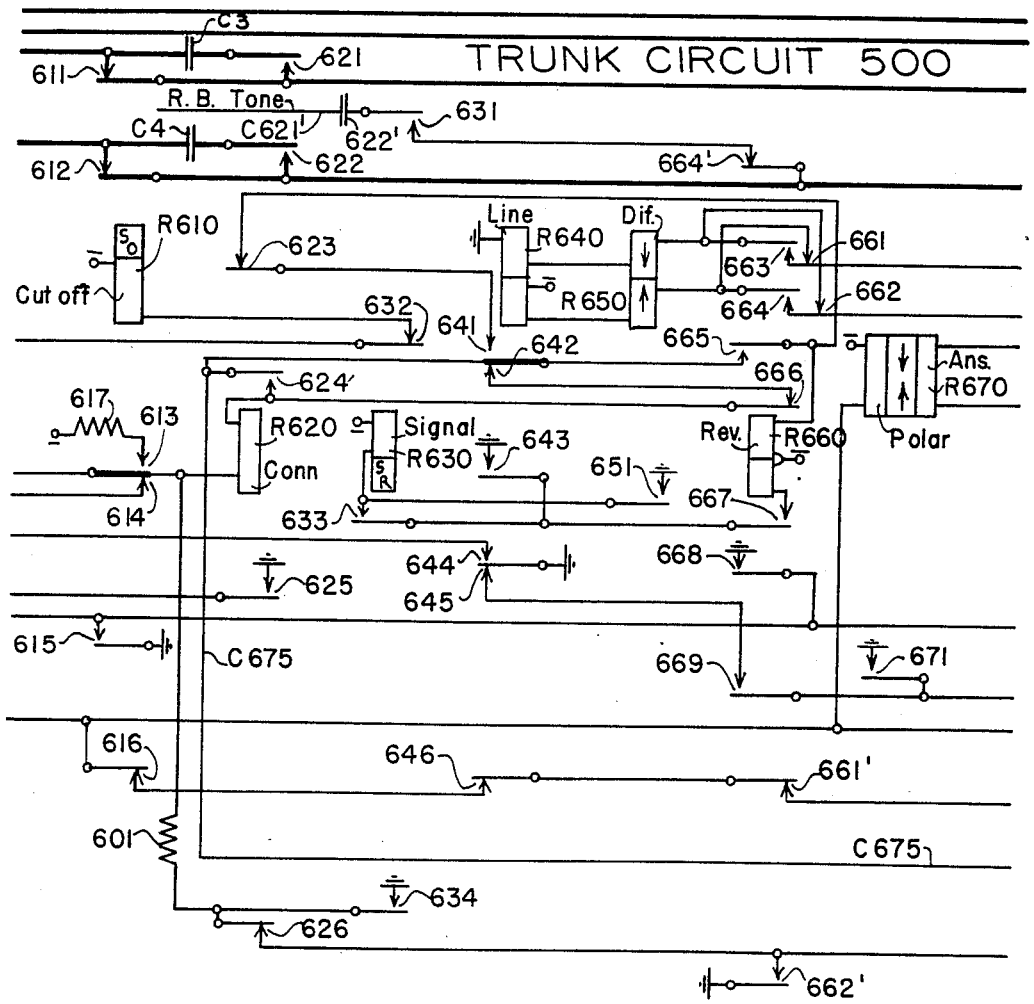
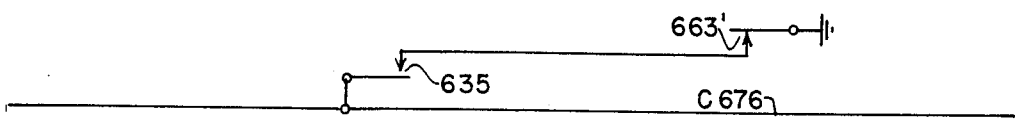
FIG. 6
INVENTOR.
KARL L. BURGENER
BY
Davis, Lindsey, Smith & Shonts
Attorneys Oct. 7, 1947.  K. L. BURGENER  2,428,550
CYCLIC CONTROL MEANS FOR LINE RELAYS
Original Filed Feb. 9, 1945   14 Sheets-Sheet 7

INVENTOR.
KARL L. BURGENER
BY
Davis, Lindsey, Smith & Shonts
Attorneys

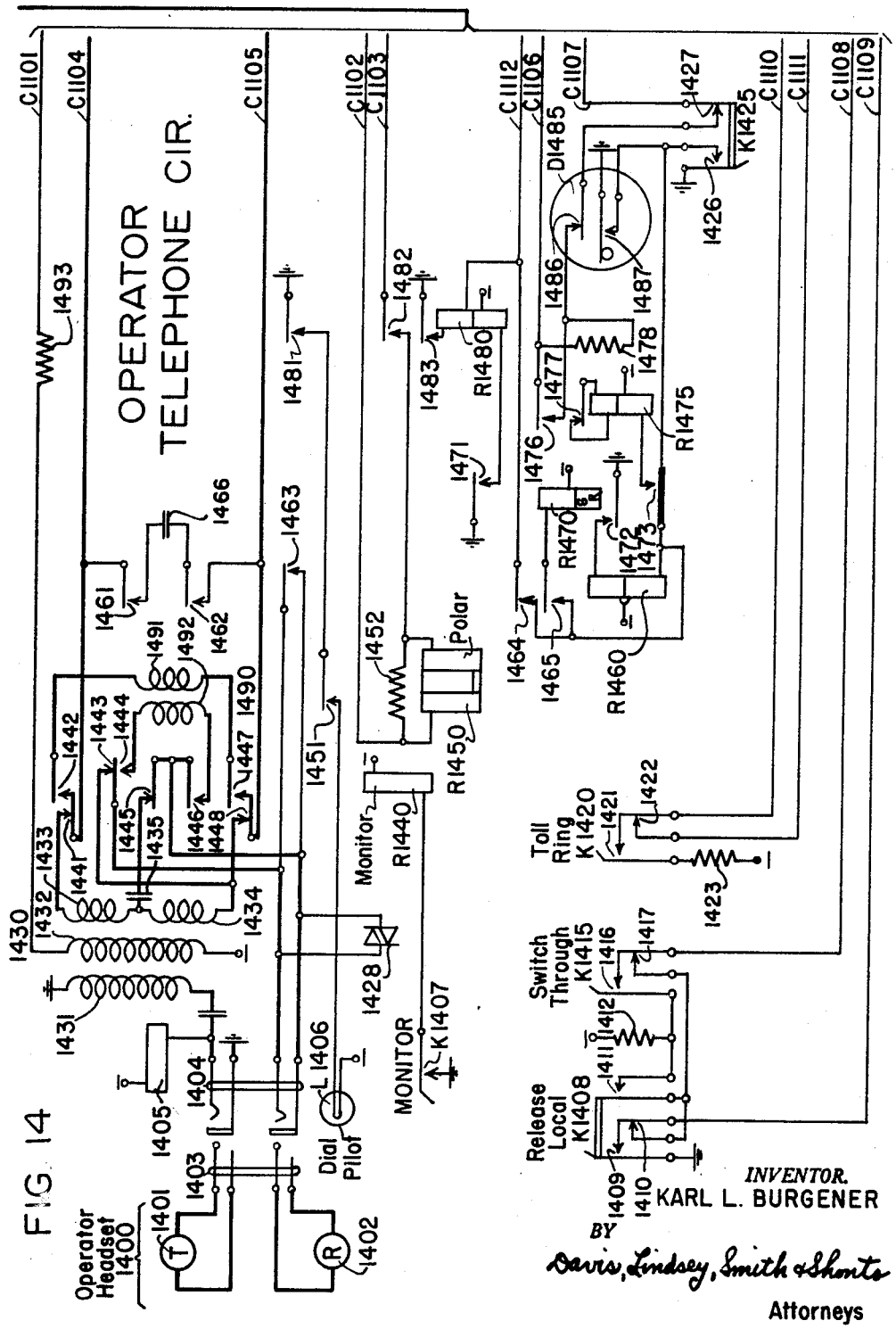

Patented Oct. 7, 1947

2,428,550

UNITED STATES PATENT OFFICE 2,428,550

CYCLIC CONTROL MEANS FOR LINE RELAYS

Karl L. Burgener, Villa Park, Ill., assignor to Automatic Electric Laboratories, Inc., Chicago, Ill., a corporation of Delaware Original application February 9, 1945, Serial No. 576,913. Divided and this application October 20, 1945, Serial No. 623,545

5 Claims. (Cl. 179—16)

The present invention relates to telephone systems in general and, more particularly, to improvements in interexchange telephone networks including both automatic and combined automatic and manual exchanges. This application is a division of the copending application of Karl L. Burgener, Serial No. 576,913, filed February 9, 1945.

It is an object of the present invention to provide in a telephone system of the character indicated, an improved dialing arrangement for use in controlling the automatic switching apparatus comprising an impulse receiving relay which is disconnected from the dialing circuit each time the circuit thereof is interrupted during pulsing, thereby preventing extraneous current surges in the dialing circuit from affecting the impulse receiving relay, and includes a circuit for preenergizing the impulse receiving relay during this period so that the relay will reoperate rapidly after it is reconnected to the dialing circuit and the interrupted dialing circuit is reclosed.

In accordance with another object of the invention, provisions are made whereby the automatic subscribers in the main automatic exchange may establish toll connections by directly controlling the automatic switching apparatus to extend the connections to the toll switchboard, and whereby the automatic subscribers in the combined automatic and manual exchange who attempt to set up toll connections to the toll switchboard by directly controlling the main exchange automatic switching apparatus are rerouted to the operator switchboard at the combined automatic and manual exchange.

Figure 2:
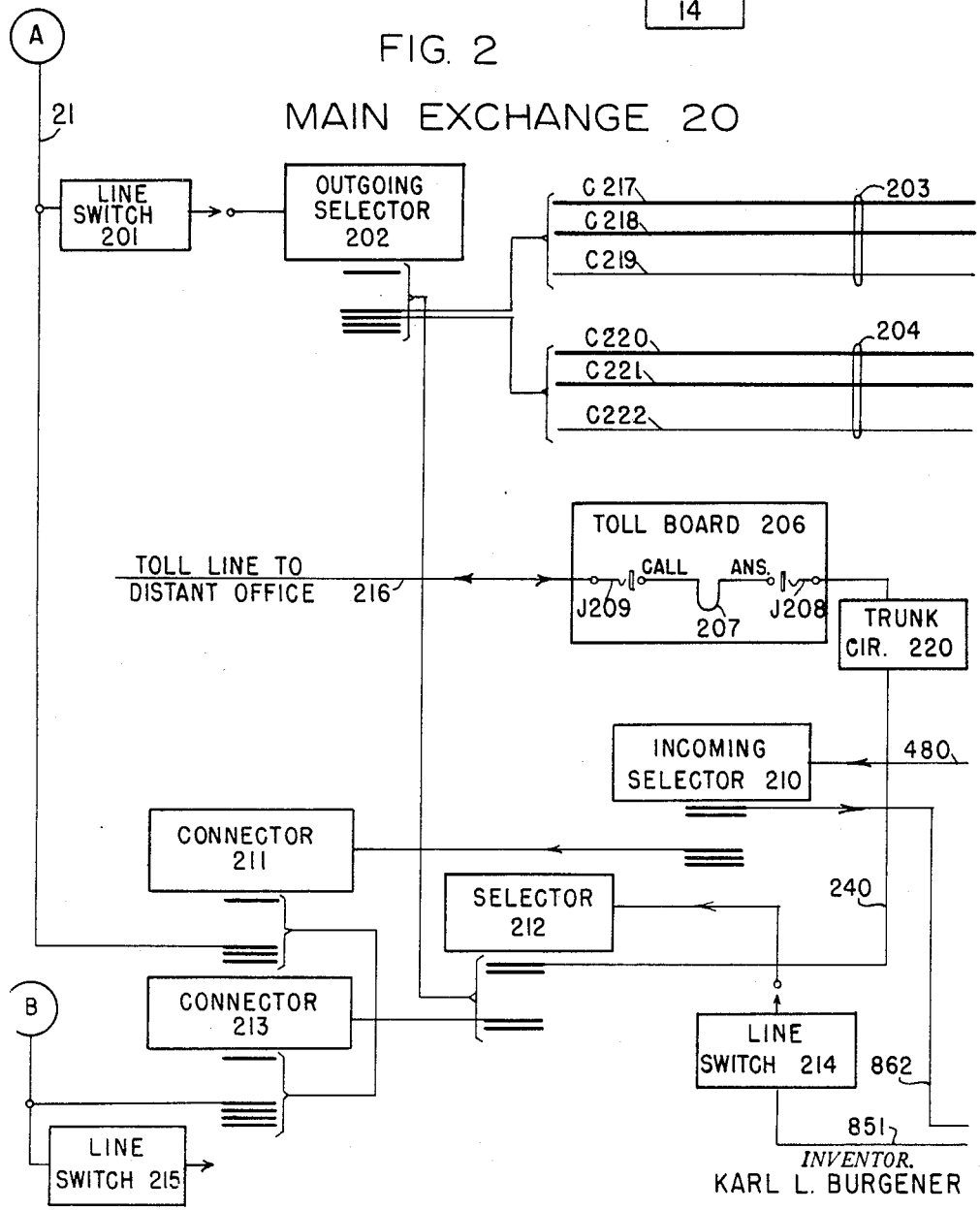
Figure 3:
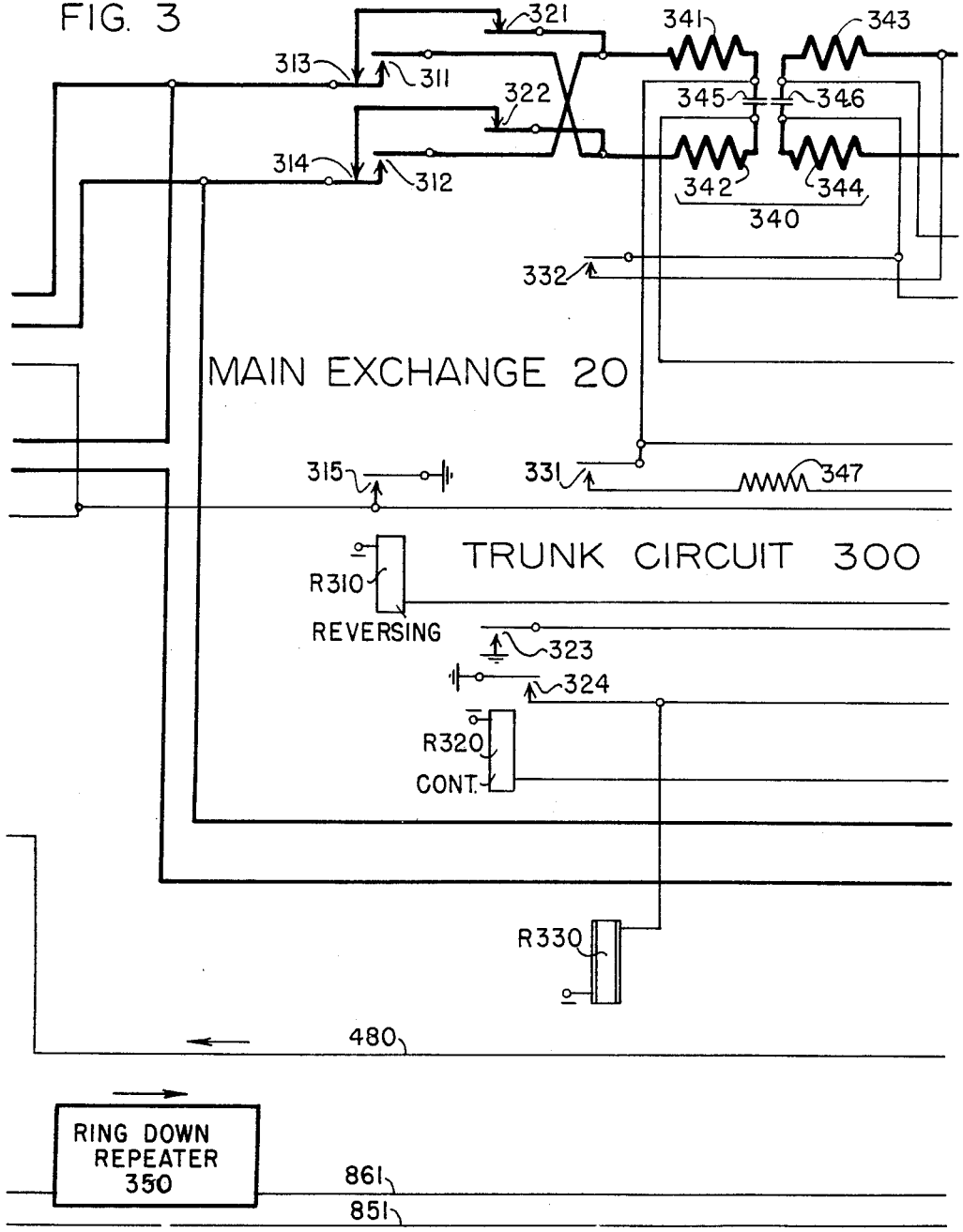
Figure 4:
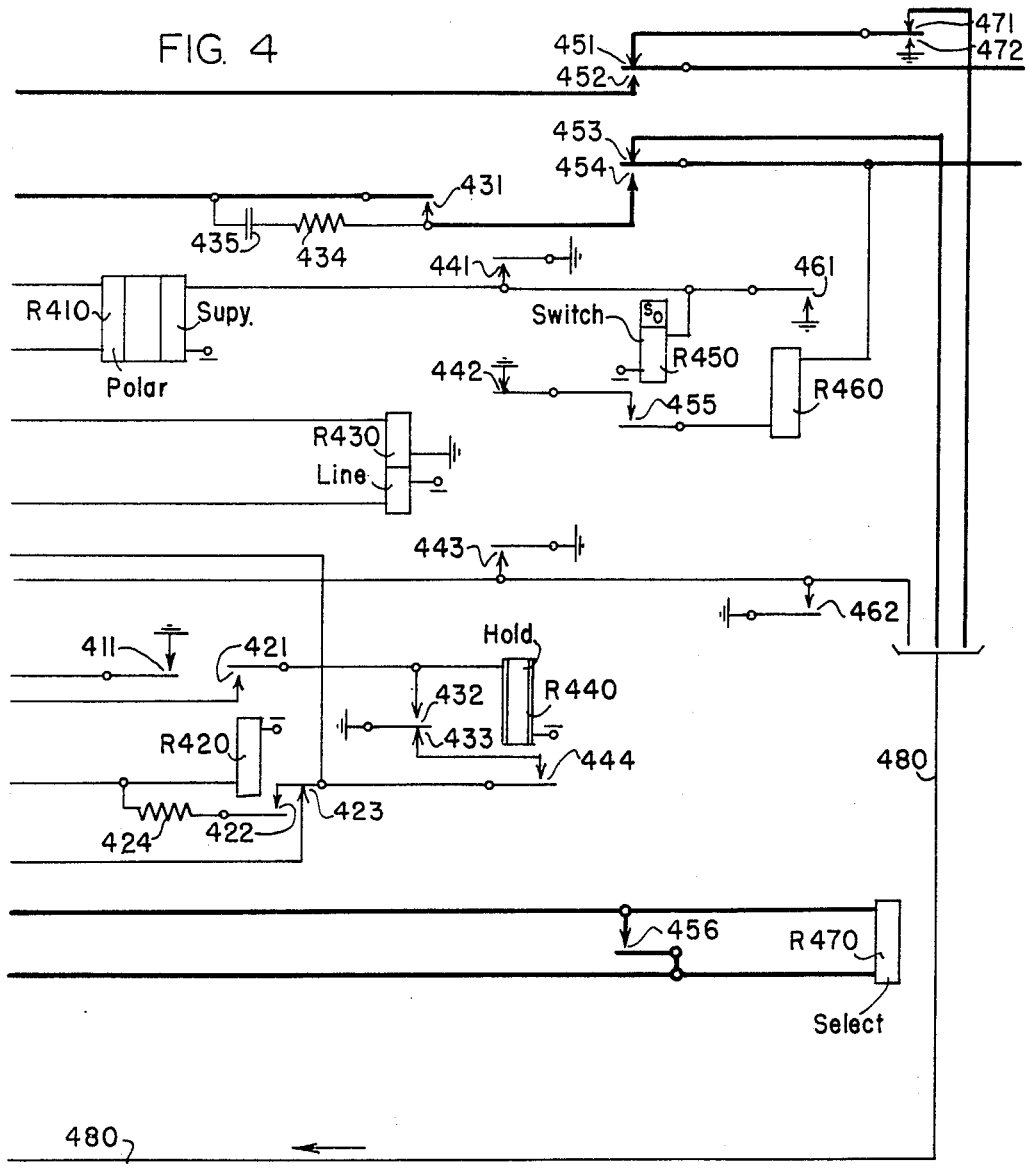
Figure 5:
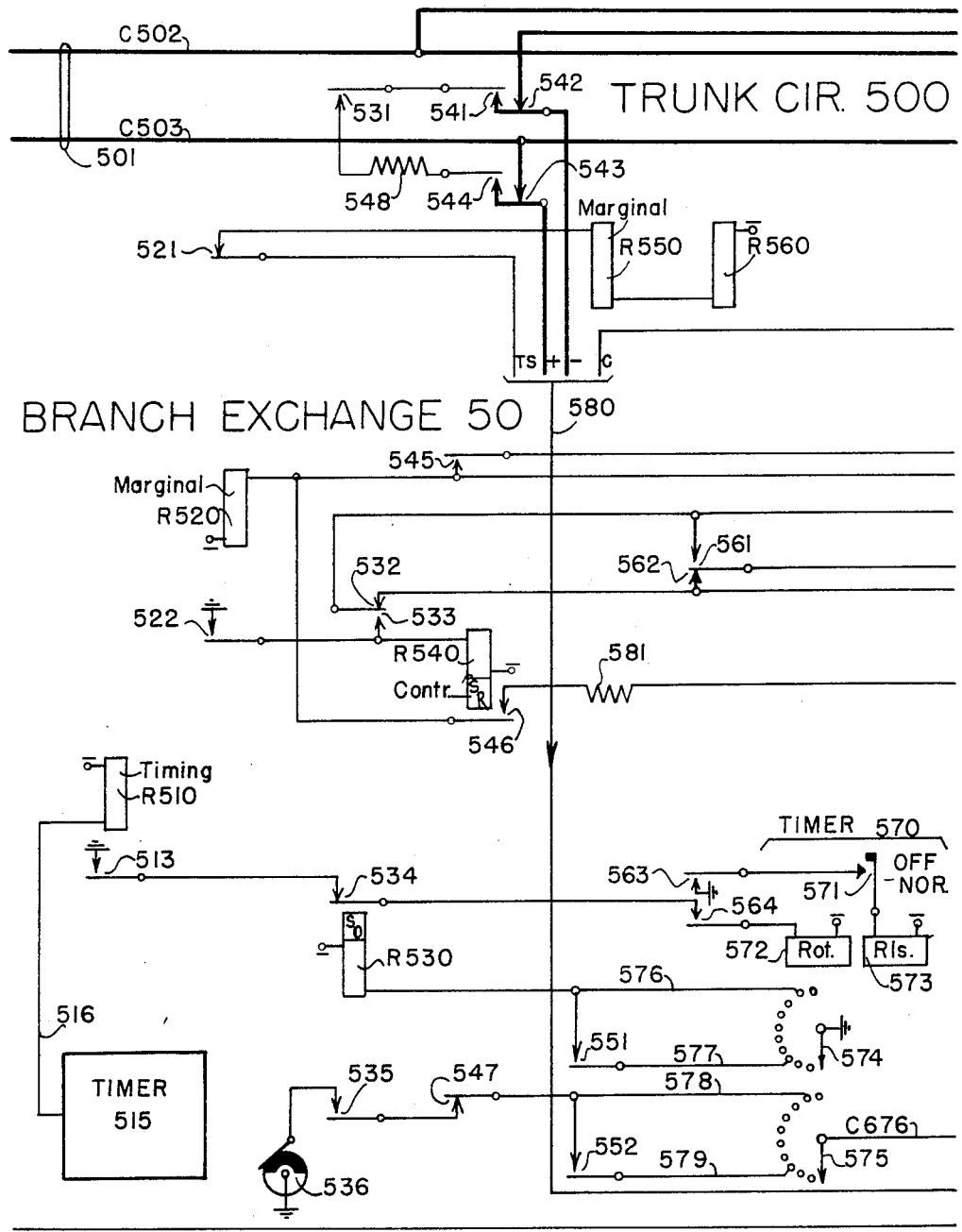
Figure 7:
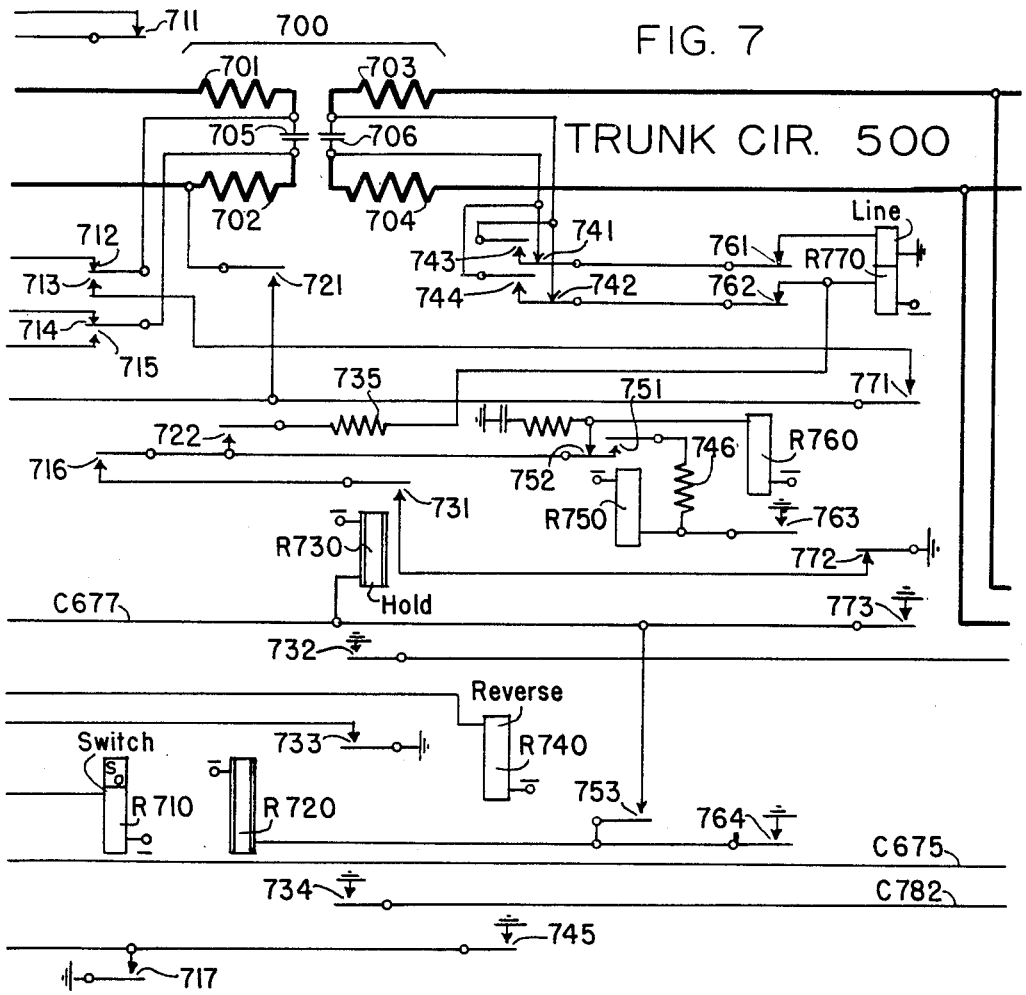
Figure 8:
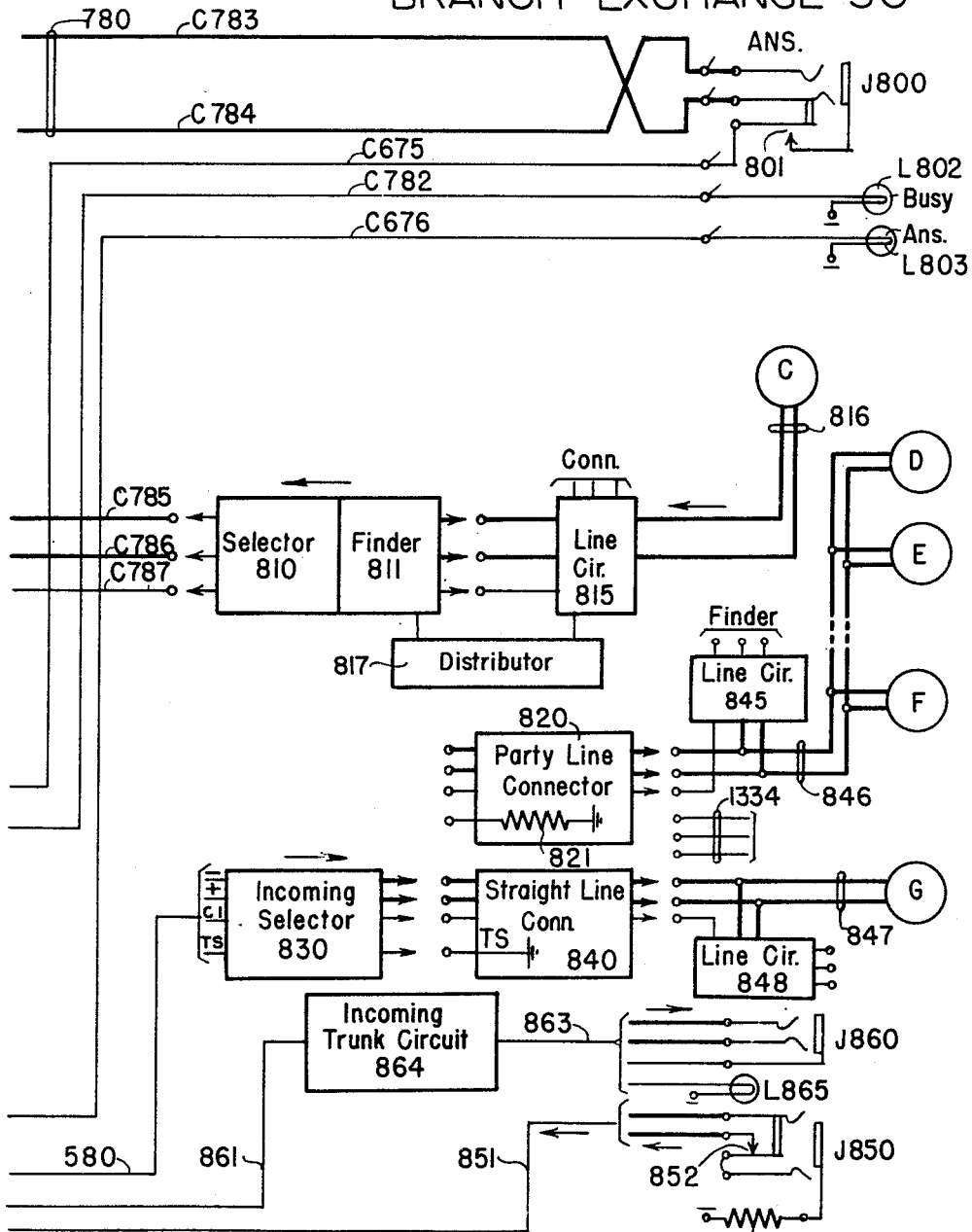
Figure 9:
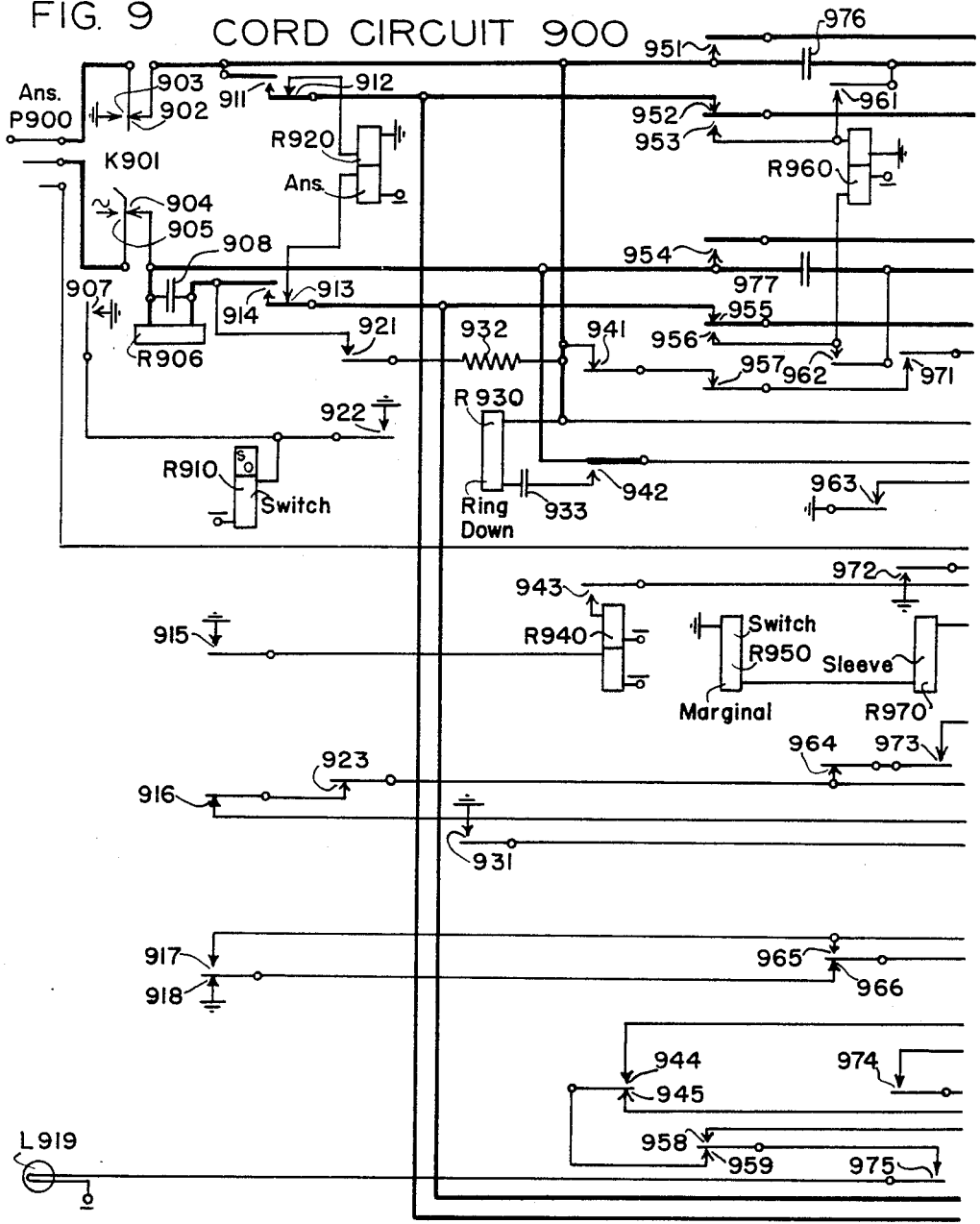
Figure 10:
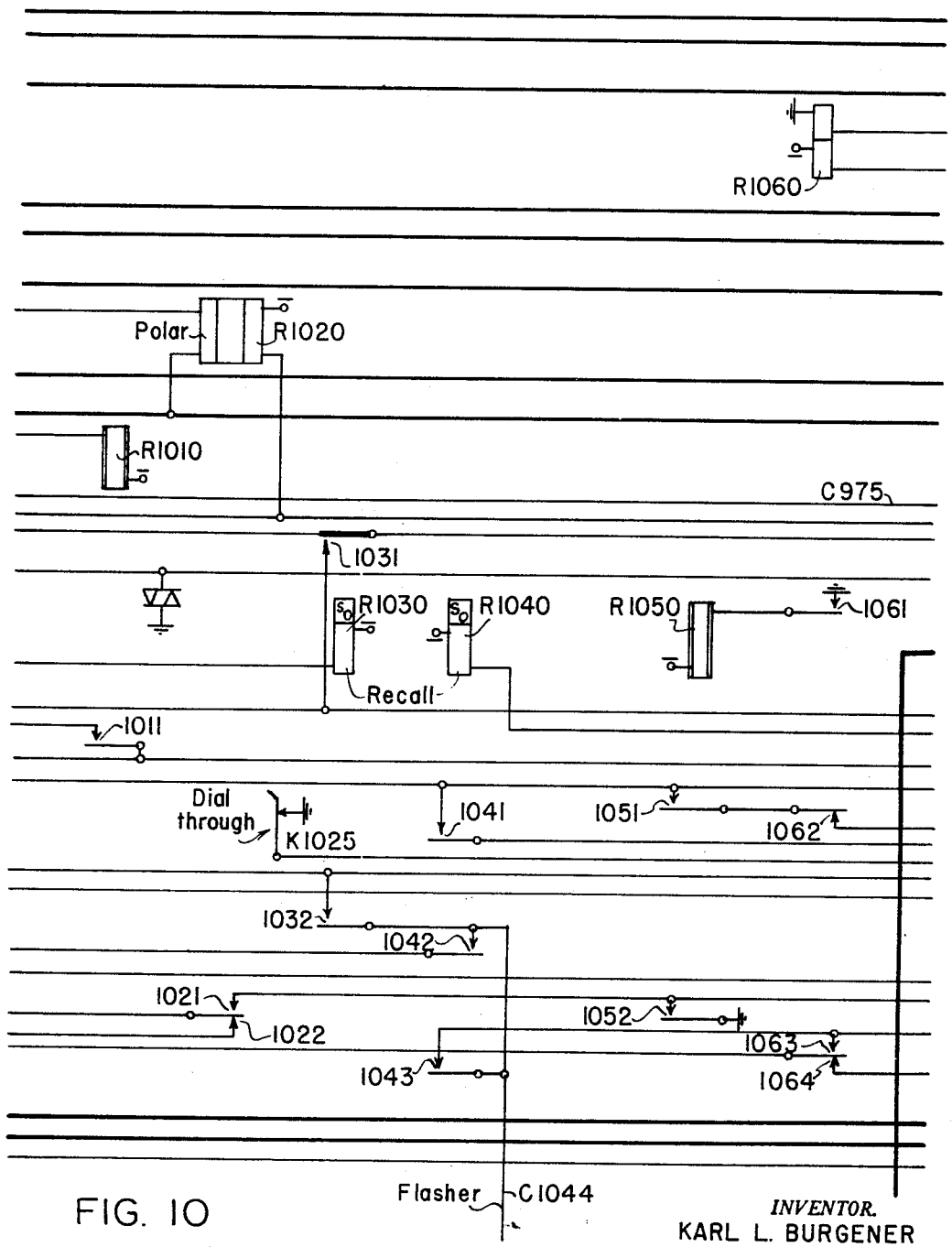
Figure 11:
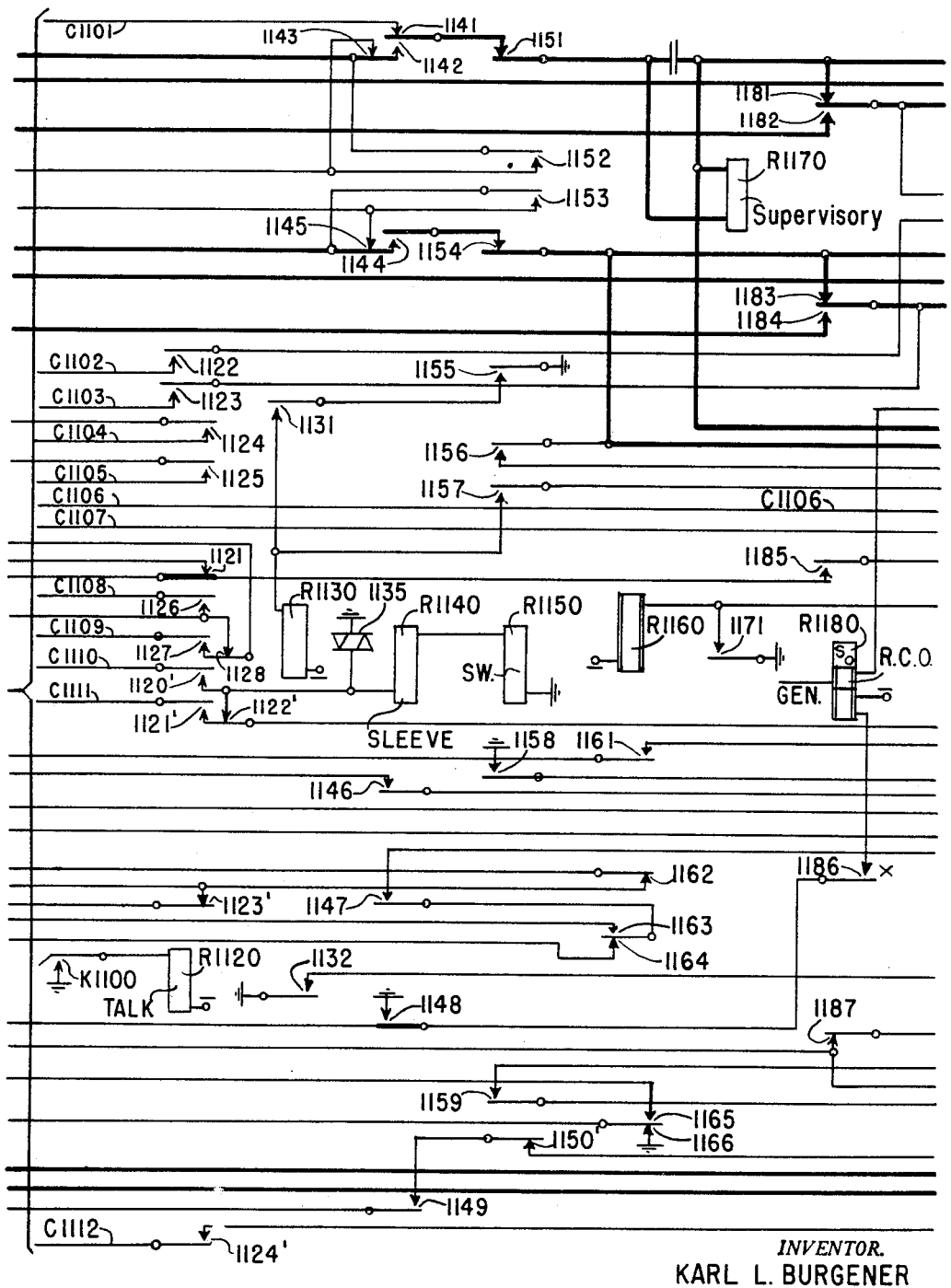
Figure 12:
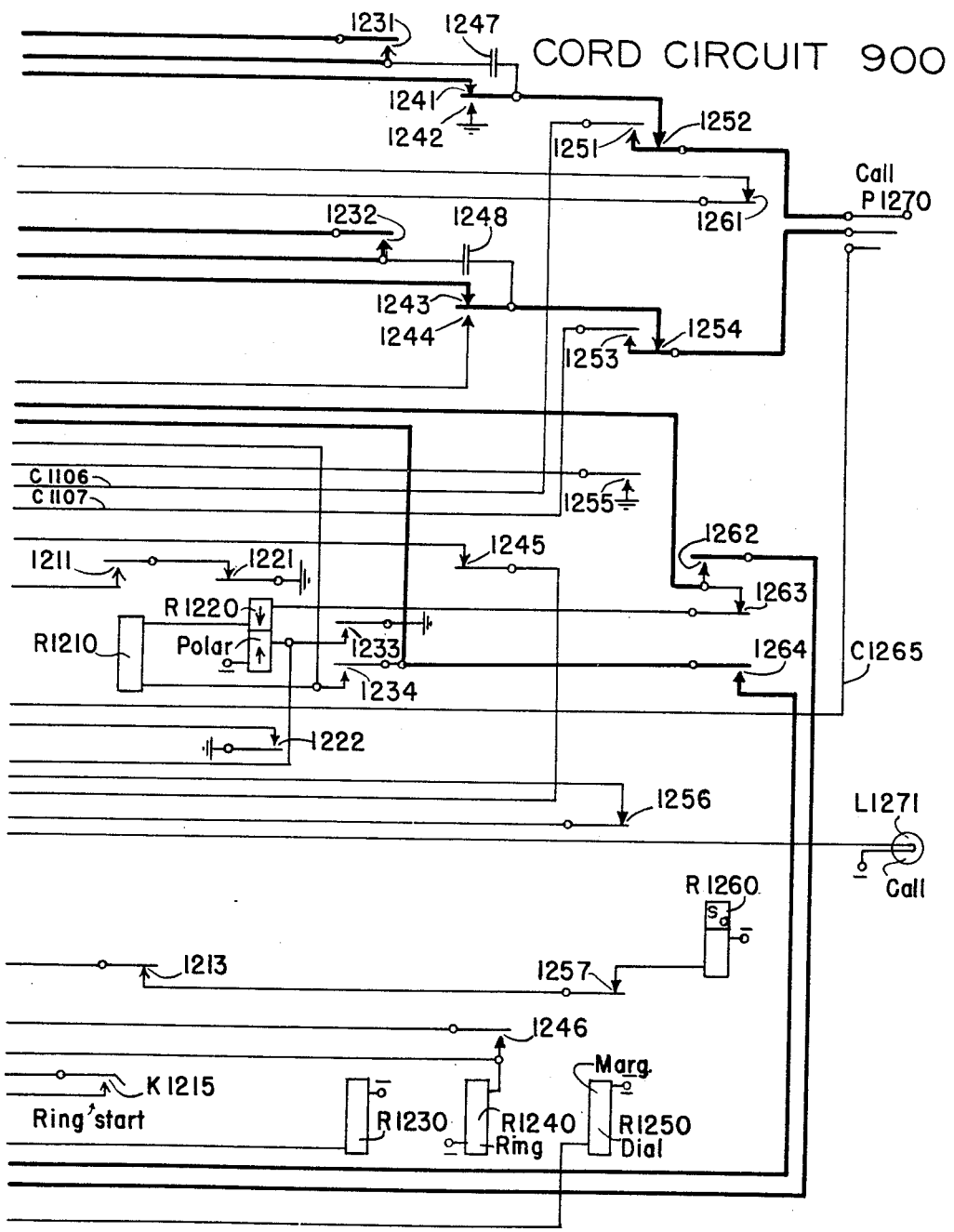
Figure 13:
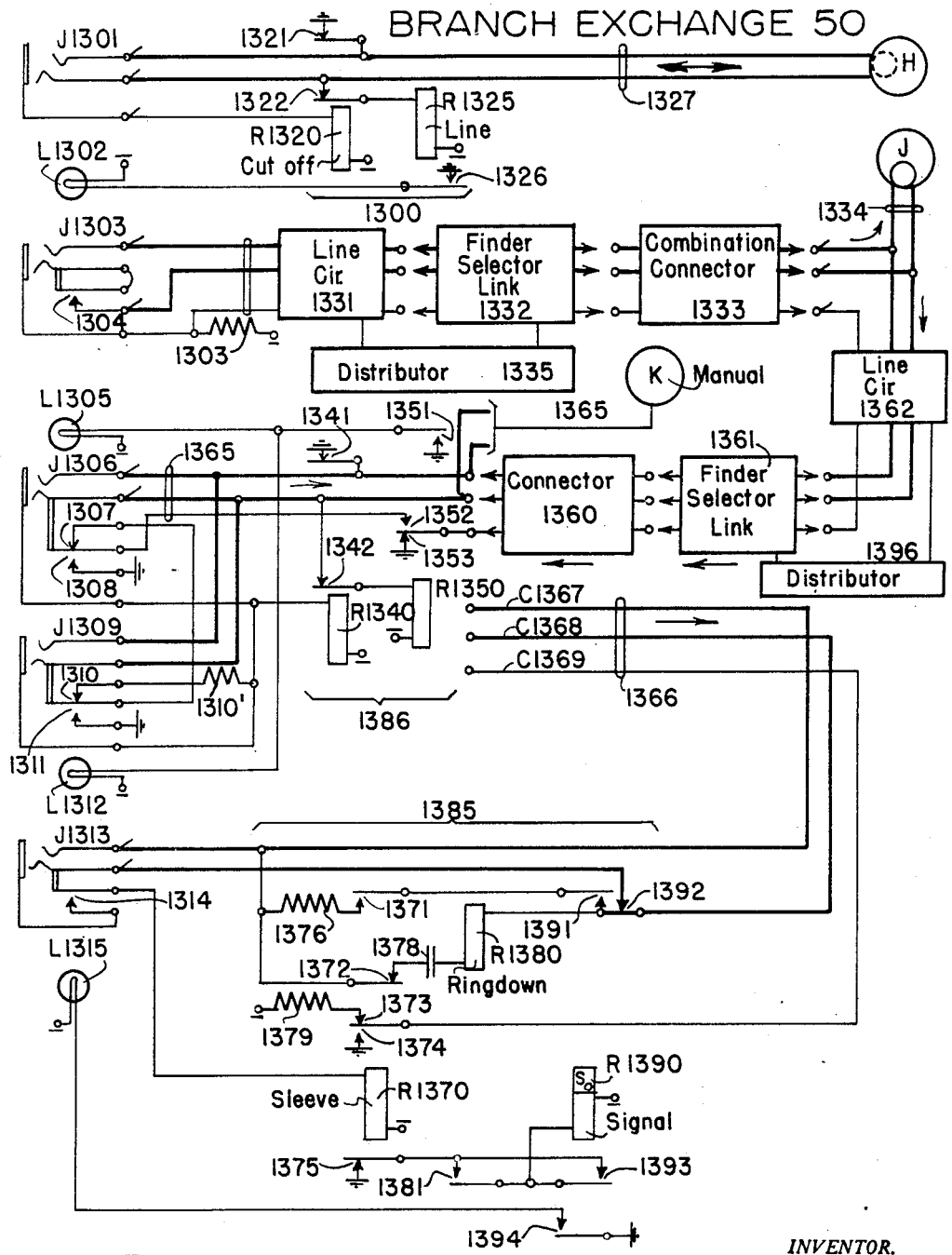

The invention, both as to its organization and method of operation, together with other objects and advantages thereof, will best be understood by reference to the following specification taken in connection with the accompanying drawings, in which Figure 1 illustrates the general arrangement of a telephone system embodying the present invention; Figs. 2 to 14, inclusive, taken together, illustrate the details of a system having incorporated therein the features of the invention, as briefly outlined above; and Fig. 15 illustrates the mode of combining Figs. 2 to 14, inclusive, of the drawings to form a unified system. More specifically, Figs. 2, 3 and 4 show a schematic layout of the equipment located in the main exchange 20, including the detailed circuits of a two-way trunk circuit 300; Figs. 5, 6 and 7 show the detailed circuits of a two-way trunk circuit 500 located in the branch exchange 50; Figs. 8 and 13 show the schematic layout of additional equipment located at the branch exchange 50 and includes the detailed circuits of certain line equipment; Figs. 9 to 12, inclusive, show the details of a cord circuit 900 at the manual switchboard 1000; and Fig. 14 shows the details of an operator telephone circuit associated with the cord circuit 900.

Referring now more particularly to Fig. 1 of the drawings, the telephone system there illustrated comprises a main exchange 20 and a private branch exchange 50, referred to hereinafter as the branch exchange 50. The main exchange 20 terminates a number of automatic subscriber lines which may be trunk connected to subscriber lines served by the branch exchange 50 and includes a toll switchboard 206 terminating a number of toll trunks from distant exchanges, which may be interconnected with the subscriber lines served by the main exchange automatic equipment or which may be interconnected with subscriber lines served by the branch exchange equipment.

The branch exchange 50 terminates a number of automatic subscriber lines which may be trunk connected through appropriate automatic switching equipment with automatic subscriber lines terminating in the main exchange 20 and includes a manual switchboard terminating manual subscriber lines which may be interconnected with the automatic subscriber lines terminating in either the branch exchange 50 or the main exchange 20. The branch exchange also includes automatic switching apparatus whereby certain of the automatic subscriber lines of the system may establish connections directly with certain manual subscriber lines, and whereby connections with other manual subscriber lines may be established with the aid of the operator at the manual switchboard 1000.

The main exchange 20 and the branch exchange 50 are also interconnected by a plurality of two-way trunk lines, such as 501, whereby connections between these exchanges may be completed either with or without the assistance of the operators at the switchboards provided in the respective exchanges, as will be explained more fully hereinafter. The two exchanges are also interconnected by a plurality of one-way trunk lines, such as 851 and 861, the former being provided to enable the operators at the branch exchange switchboard 1000 to extend connections to automatic subscriber lines terminated in the automatic switching apparatus located in the main exchange 20, and the latter being provided to intercept connections which automatic subscribers in the branch exchange 50 attempt to extend to the toll switchboard in the main exchange 20 by wrongfully by-passing the manual switchboard in the branch exchange 50.

CALL FROM THE SUBSTATION A IN THE MAIN EXCHANGE 20 TO THE MANUAL SUBSTATION H IN THE BRANCH EXCHANGE 50

In order for the subscriber at substation A in the main exchange to establish a connection with the subscriber at substation H in the branch exchange, the subscriber at substation A must first call the branch exchange operator at the manual switchboard 1000. After ascertaining the number of the called subscriber the operator thereat will then complete the connection by plugging into the jack terminating the desired called manual line. For example, when the subscriber at substation A removes his receiver, the line switch 201 operates in a well known manner and selects an idle selector switch. Assuming that the selector switch 202 is the one selected by the line switch 201, the selector 202 responds and causes a dial tone signal to be transmitted to the subscriber at substation A in order to indicate that the selector switch is in condition to respond to the impulses dialed by the calling subscriber.

Since the desired called substation is located in the branch exchange 50, the digit to be dialed by the calling subscriber at substation A corresponds to the level in the selector 202 which has access to the group of trunk lines terminating in the manual switchboard 1000. When the calling device at the substation A is operated in accordance with this digit the selector 202 will elevate its wipers to the selected level, after which, the wipers of the selector automatically rotate to select an idle trunk line in the selected group of trunks. In the present instance it will be assumed that digit "3" is assigned to this group of trunks. Consequently, when the subscriber at substation A dials this digit the selector 202 responds and raises its wipers to the third level of its associated set of bank contacts and then automatically rotates its wipers over the selected level to engage the contacts terminating an idle trunk line in the selected group of trunks. Accordingly, it will be assumed that the wipers of the selector 202 have selected the trunk line 204 comprising conductors C220, C221, C222 extending to the trunk circuit 300 of Figs. 3 and 4.

It may be well to note at this time that the trunk circuit 300 of Figs. 3 and 4 may be selected by a calling main exchange subscriber over either one of two paths. If the trunk circuit 300 is seized over the trunk line 204 it operates, in a manner to be described hereinafter, to extend a connection to the branch exchange at the manual switchboard 1000. However, if the trunk circuit 300 is seized over the trunk line 203 it operates in a manner, to be described hereinafter, to extend a connection to the automatic switching apparatus in the branch exchange 50 so that the calling subscriber in the main exchange may extend a connection to a desired automatic subscriber in the branch exchange without the intervention of a manual operator.

Since the trunk circuit 300 in the present instance has been seized by the selector 202 over the trunk line 204, the line relay R430 and the select relay R470 are now operated over a series circuit including the conductors C220 and C221, and the selector 202 applies ground potential to conductor C222 of the trunk line 204 and to the conductor C219 of the trunk line 203 and multiples thereof in the banks of other selectors in order to mark the trunk circuit 300 busy to all selectors having access thereto. The circuit for operating the line relay R430 and the select relay R470 may be traced from ground, by way of the upper winding of the line relay R430, the winding 342 of the repeating coil 340, the contacts 322 and 314, the winding of the select relay R470, the conductor C221, through the selector 202, the line switch 201, one conductor of the subscriber line 21, the closed loop circuit at the substation A, and returning over the other conductor of the subscriber line 21 through the line switch 201, the selector 202, the conductor C220, the contacts 313 and 321, the winding 341 of the repeating coil 340, and the lower winding of the line relay R430, to battery. Upon operating, the selector relay R470, at its contacts 471, opens a point in the circuit of the outgoing trunk 480 extending to the incoming selector 210 in order to prevent operation thereof. At its contacts 472, the relay R470 extends ground potential by way of the contacts 451 to the conductor C502, in order to unbalance the trunk line 501 and cause the trunk circuit 500 to extend the call to the branch exchange switchboard 1000, in a manner to be described hereinafter. The line relay R430, upon operating over the above described circuit, at its contacts 432 completes an operating circuit for the hold relay R440 and at its contacts 431 it prepares a circuit for controlling the trunk circuit 500.

When the hold relay R440 operates over the above mentioned circuit, at its contacts 441 it completes a circuit for operating the switching relay R450, and it completes an energizing circuit for the right-hand polarizing winding of the supervisory relay R410. The supervisory relay R410 is a shunt field electro-polarized relay and does not operate its contacts 411 when only its right-hand polarizing winding is energized. However, when the current flow in the left-hand operating winding of the relay is in opposition to the current flow in the right-hand polarizing winding of the relay, the contacts 411 are operated, as will be described hereinafter. At its contacts 443, the relay R440 applies ground potential to the control conductors C219 and C222. Ground potential is applied to the control conductor C222 from the trunk circuit 300 in order to replace the busy ground potential applied thereto for a short period of time by the selector 202. This ground potential now maintains the selector 202 and the line switch 201 in their operated positions and marks the trunk line 204 as busy to other selectors having access thereto. Ground potential is also applied to the control conductor C219 in order to mark the other trunk line 203 as busy to the selectors having access thereto. At its contacts 444, the relay R440 prepares a circuit for operating the control relay R320, and it also prepares a circuit, including the resistor 347 and the contacts 331, for preenergizing the lower winding of the line relay R430. The latter circuit is effective to increase the speed at which the line relay R430 responds when the trunk circuit 300 operates to repeat impulses received therein.

When the switching relay R450 operates over the above mentioned circuit, at its contacts 451 and 453 it disconnects the conductors C502 and C503 from the incoming selector 210 and, at its contacts 452 and 454, it connects the conductors C502 and C503 to the right-hand windings of the repeating coil 340. At its contacts 456, the relay R450 places a shunt circuit around the winding of the select relay R470, thereby causing the latter relay to restore and also to reduce the resistance in the incoming circuit in order to insure more positive operation of the line relay R430. At its contacts 455, the relay R450 also prepares a point in the circuit for subsequently operating the relay R460.

Since the connection being described is one which is to be extended by way of the branch exchange operator at the manual switchboard 1000, further impulses are not transmitted by the calling subscriber and, consequently, the line relay R430 remains in its operated position.

It will be recalled that when the select relay R470 was initially operated, ground potential was applied at its contacts 472 to the conductor C502 and, as a result thereof, a circuit was completed for operating the differential relay R650 and the line relay R640 in the trunk circuit 500 in the branch exchange 50. This circuit may be traced from ground by way of the contacts 472 and 451, the conductor C502, the contacts 611, the winding 701 of the repeating coil 700, the contacts 712 and 661, the lower winding of the differential relay R650, and the lower winding of the line relay R640, to battery. Since no circuit is completed for the opposing upper winding of the differential relay R650 at this time, the relay operates to close its contacts 651 and completes a circuit for operating the signal relay R630. The line relay R640, upon operating over the above traced circuit, at its contacts 641 prepares a circuit for operating the reversing relay R660. At its contacts 643, the relay R640 completes a holding circuit for the signal relay R630 which may be traced from ground, the contacts 643 and 633, and the winding of the relay R630, to battery.

It will be recalled that after the ground potential is applied to the conductor C502 at the contacts 472, the switching relay R450 energized and at its contacts 452 and 454 it connected the conductors C502 and C503 to the right-hand windings of the repeating coil 340 in the trunk circuit. When the above described operation takes place, a circuit may be traced from ground by way of the upper winding of the line relay R640, the upper winding of the differential relay R650, the contacts 662 and 714, the winding 702 of the repeating coil 700, the contacts 612, the conductor C503, the contacts 454 and 431, the winding 344 of the repeating coil 340, the left-hand winding of the supervisory relay R410, the winding 343 of the repeating coil 340, the contacts 452, the conductor C502, the contacts 611, the winding 701 of the repeating coil 700, the contacts 712 and 661, the lower winding of the differential relay R650, and the lower winding of the line relay R640, to battery. It will be noted that the above traced circuit includes the two windings of the relays R640 and R650 in series with the left-hand winding of the supervisory relay R410; the latter relay, however, is not operated over this circuit since the current flow through its left-hand winding is in opposition to the current flow through its right-hand polarizing winding. The line relay R640, however, remains operated over this circuit but the differential relay R650 is now restored to normal, because the current flow through its upper winding is in opposition to the current flow through its lower winding. Upon restoring, the relay R650, at its contacts 651, opens the initial energizing circuit for the signal relay R630, but this relay remains in its operated position over a holding circuit including its contacts 633.

Referring again to the operation of the line relay R640, at its contacts 644 it also applies ground potential to the conductor C677 by way of the contacts 532, thereby causing the operation of the hold relay R730. As a further result of the operation of the relay R640, at its contacts 642, it opens a point in the incomplete circuit of the connect relay R620; at its contacts 645 it opens a point in the incomplete circuit of the reversing relay R740; and at its contacts 646 it opens a point in the incomplete circuit of the switching relay R710.

As has been mentioned above, the signal relay R630 is operated as a result of the operation of the differential relay R650 and it locks itself in its operated position over a circuit including its contacts 633 and the contacts 643. As a further result of the operation of the relay R630, at its contacts 632 it disconnects the cutoff relay R610 from the C1 conductor extending by way of the cable 580 to the incoming selector 830. At its contacts 634, the relay R630 completes a circuit for energizing the relay R520 which may be traced from ground, by way of the contacts 634, the resistance 601, the contacts 614, and the winding of the relay R520, to battery. At its contacts 635, the relay R630 completes a circuit from ground by way of the contacts 663' and 635, the conductor C676 and the answer lamp L803, to battery. The answer lamp L803 is illuminated as a result of the above traced circuit to indicate to the operator at the switchboard 1000 that a call has been received and should be answered. At its contacts 631 the relay R630 also completes a circuit for transmitting ringback tone to the calling subscriber in order to indicate that the operator at the branch exchange 50 is being signaled. This circuit may be traced from the ring-back tone conductor C621', the condenser 622', the contacts 631, 664' and 612, the conductor C503, the contacts 454 and 431, and the winding 344 of the repeating coil 340, whereat the ring-back tone is repeated in a well known manner, to the calling subscriber.

When the hold relay R730 operates as a result of the ground potential applied to the conductor C677, at its contacts 731 it prepares a circuit to be described hereinafter; at its contacts 732 it places ground potential on the control conductor C787 in order to busy the trunk circuit 500 in the banks of all outgoing selectors to prevent the trunk circuit from being seized for an outgoing call; at its contacts 733 it completes an energizing circuit for the left-hand polarizing winding of the shunt field relay R670; and, at its contacts 734, it places ground potential on the conductor C782, thereby to illuminate the busy lamp L802 and indicate to the operators at the switchboard 1000 that the trunk circuit 500 is busy.

When the relay R520 operated over the above traced circuit under control of the signal relay R630, at its contacts 521 it disconnected the relays R550 and R560 from the TS conductor of the cable 580 extending to the incoming selector 830. The relay R520, at its contacts 522, completes an obvious circuit for energizing the control relay R540. Upon operating, the control relay R540, at its contacts 542 and 543, disconnects the — and + conductors of the cable 580 extending to the incoming selector 830 from the trunk conductors C502 and C503; and, at its contacts 541 and 544, it prepares a circuit including the — and + conductors of the cable 580, which circuit, however, is ineffective in the present call. As a further result of the operation of relay R540, a multiple circuit is completed, at its contacts 545, for the relay R520, which circuit is independent of the contacts 614 of the cutoff relay R610. At its contacts 546, the relay R540 completes a circuit for the relay R520 which includes the resistance 581 and the ground potential applied therethrough by way of the contacts 733; and, at its contacts 547, it disconnects an incomplete circuit including the interrupter 536 to prevent the answer lamp L803 from being flashed at the present time.

From the foregoing description it will be understood that the calling subscriber at substation A has now extended the connection to the manual switchboard 1000, that the manual operator thereat has been signaled by the illumination of the answer lamp L803, and that the calling subscriber has been notified of the fact that the operator is being signaled by the transmission of the ring-back tone signal.

It may be well to mention at this time that when the operator has taken her position at her section of the switchboard 1000 and is ready to handle calls, she must first insert the plug of the operator headset 1400 at that position into the jack terminating the operator telephone circuit. Thus to answer and extend calls received at the switchboard 1000 the headset plug 1403 is inserted into the jack 1404. In response to this operation the transmitter 1401 is included in a series circuit with the battery feed impedance coil 1405 and in multiple with the left-hand winding 1431 of the induction coil 1430. Furthermore, the receiver 1402 is bridged across the lower right-hand winding 1434 of the induction coil 1430 in series with the contacts 1443 and 1445 and the condenser 1435. It should also be noted that a pair of oppositely poled copper oxide half-wave rectifiers 1428 is included in a circuit shunting the receiver 1402. These rectifiers are connected in parallel in order to pass current in both directions and therefore do not actually rectify. However, at the speech level of ordinary conversation the rectifiers as a unit have a high resistance and do not introduce any appreciable loss to the speech currents traversing the circuit, but on the other hand they have a relatively low resistance to a large voltage change such as would produce a loud click in the receiver 1402 and thereby practically short-circuit the receiver 1402 to weaken the clicks to a point where they are no longer objectionable to the operator.

Accordingly, when the operator is signaled by the illumination of lamp L803 indicating that a call is to be answered, she inserts the answer plug of one of her cord circuits into the jack associated with the lamp L803. It will be assumed that the operator has selected the cord circuit 900, of Figs. 9 to 12, inclusive, and that she has inserted the plug P900 into the jack J800.

When the plug P900 is inserted into the jack J800 the series connected relays R950 and R970 in the cord circuit 900 and the reversing relay R660 in the trunk circuit 500 are connected over a series circuit which may be traced from ground, by way of the windings of the marginal switching relay R950 and the sleeve relay R970, the contacts 1128, the sleeve elements of the plug P900 and the jack J800, the contacts 801, the sleeve conductor C675, the contacts 641 and 623, and the upper winding of the reversing relay R660, to battery. The sleeve relay R970 in the branch exchange 50 and the reversing relay R660 in the main exchange 20 operate over the above mentioned circuit but, due to the resistance included in this circuit, the switching relay R950 does not operate at this time.

In the main exchange 20 the reversing relay R660, upon operating at its contacts 667, completes a holding circuit including its lower winding, from ground at the contacts 643; and, at its contacts 661 to 664, inclusive, it reverses the connection of battery and ground potentials applied by way of the windings of the line relay R640 to the trunk line 501. The reversal of the direction of current flow over the trunk line 501 causes the current flow in the left-hand winding of the supervisory relay R410 to be in such a direction that the relay R410 is now operated to close its contacts 411. Thus at its contacts 411, the relay R410 completes an obvious circuit for operating the reversing relay R310. The reversing relay R310 upon operating, at its contacts 311 to 314, inclusive, reverses the direction of current flow over the conductors C220 and C221 of the trunk line 204 and the calling line 21, which reversal may cause the operation of the calling subscriber meter, if desired. The relay R310, at its contacts 315, also applies a multiple holding ground potential to conductors C219 and C222 and to the control conductor of cable 480.

As a further result of the operation of the relay R660 in the trunk circuit 500, at its contacts 665 it completes a holding circuit, including the grounded sleeve conductor C675, for its upper operating winding, which circuit is independent of contacts 623 and 641. At its contacts 668 and 662', the relay R660 completes separate multiple circuits for holding operated the relays R730 and R520, respectively. At its contacts 664', the relay R660 interrupts the circuit for transmitting ring-back tone to the calling subscriber and, at its contacts 663', it interrupts the circuit for illuminating the answer lamp L803.

It will be recalled that the sleeve relay R970 of the cord circuit 900 operated over a previously traced circuit when the plug P900 was inserted into the jack J800 to answer the call received over the trunk line 780. Upon operating over this circuit, the relay R970, at its contacts 971, completes a circuit for bridging the left-hand operating winding of the shunt field relay R1020 across the tip conductor C784 and the ring conductor C783, by way of the tip and ring elements of the plug P900 and jack J800 to cause the operation of the line relay R770 in the trunk circuit 500, as will be described hereinafter. At its contacts 972, the relay R970 also completes an obvious circuit for the right-hand polarizing winding of the shunt field relay R1020, and, at its contacts 973, it prepares a point in the circuit of the recall relay R1030. At its contacts 974 and 975, the relay R970 prepares points in the control circuit of the answer lamp L919.

When the left-hand winding of the shunt field relay R1020 was bridged across the tip and ring conductors of the trunk line 780, a loop circuit was completed for operating the line relay R770 of the trunk circuit 500. This circuit may be traced from ground, through the upper winding of the line relay R770, the contacts 761 and 741, the lower right-hand winding 704 of the repeating coil 700, the tip conductor C784 of the trunk 780, the tip elements of the jack J800 and plug P900, the contacts 902 of the key K901, the contacts 941, 975 and 971, the left-hand winding of the shunt field relay R1020, the contacts 904 of the key K901, the ring elements of the plug P900 and jack J800, the ring conductor C783 of the trunk 780, the upper right-hand winding 703 of the repeating coil 700, the contacts 742 and 762, and the lower winding of the line relay R770, to battery. The relay R770, upon operating, at its contacts 771 prepares a point in the circuit for the right-hand winding of the shunt field answer relay R670; at its contacts 772 it interrupts a point in the incomplete circuit of relay R760; and, at its contacts 773, it applies ground potential to conductor C677 in order to maintain the hold relay R730 operated.

The shunt field relay R1020 in the cord circuit 900 also operates over the above traced circuit including the windings of the line relay R770. At its contacts 1021, relay R1020 closes a point in the operating circuit for the ringing relay R1240 and, at its contacts 1022, it interrupts a point in the incomplete circuit for the answer lamp L919.

The operator at the switchboard 1000 having answered the call by inserting the plug P900 into the jack J800, may now operate the talk key K1100 in order to associate her operator telephone circuit (Fig. 14) with the selected cord circuit 900. When the talk key K1100 is actuated a circuit is completed for operating the talk relay R1120. Upon operating, the talk relay R1120, at its various contacts, associates the operator telephone circuit of Fig. 14 with the selected cord circuit 900. It will be noted, however, that the various conductors C1101 to C1112, inclusive, which are individual to the operator telephone circuit, are also common to all of the cord circuits available to the operator in order to permit the association of the operator telephone circuit with any one of the cord circuits by merely operating the talk key individual to a selected cord circuit.

Accordingly, when the relay R1120 operates, at its contacts 1124 and 1125 it connects the tip conductor C784 and the ring conductor C783 of the trunk 780 to conductors C1104 and C1105, respectively, of the operator telephone circuit, whereupon a conversational circuit is completed including the contacts 1441 and 1448, the right-hand windings 1433 and 1434 of the induction coil 1430, and the receiver 1402 of the operator headset 1400. Accordingly, the voice currents from the calling subscriber line complete a circuit through the upper right-hand winding 1433 and the lower right-hand winding 1434 of the induction coil 1430. The receiver 1402 which is bridged across the lower right-hand winding 1434, carries a greater part of the voice currents because of the low impedance path it offers in comparison with the lower right-hand winding 1434. When the operator speaks into the transmitter 1401 the resistance of the transmitter varies, causing the current supplied from battery through the winding of the impedance coil 1405 to vary at different voice frequencies. This fluctuation in current also passes through the left-hand winding 1431 of the induction coil 1430 but is kept out of the battery circuit by the impedance 1405 to prevent cross talk. The current fluctuation passing through the left-hand winding 1431 induces a similar voltage in the windings 1433 and 1434 of the induction coil 1430, and since the winding 1434 has the same number of turns as the winding 1433 the induced voltage across the winding 1434 will be equal to that induced across the winding 1433. Since the resistance of the winding 1434 is approximately equal to the resistance of the winding 1433 plus the loop resistance of the calling line, the voltage induced into the windings 1433 and 1434 produces current flow through the receiver of the calling station and the receiver 1402 of the operator headset. It should also be noted that there are two paths through the receiver 1402 that voice currents may follow. One is from the midpoint of the windings 1433 and 1434 of the induction coil 1430, through the windings 1434, the contacts 1443, the receiver 1402, the contacts 1445, the condenser 1435, and back to the midpoint between the windings 1433 and 1434. The second path may be traced from the midpoint of the windings 1433 and 1434, the condenser 1435, the contacts 1445, the receiver 1402, the contacts 1443 and 1448, the conductor C1105, over the calling subscriber loop and returning by way of the conductor C1104, the contacts 1441, the winding 1443, and back to the midpoint between the windings 1433 and 1434. Since these two circuits have equal voltages induced in them and have approximately equal resistances, the resulting currents will be approximately equal. Because the direction of the current flow in these circuits is always opposite through the receiver 1402, and being approximately equal in magnitude, the resulting current through the receiver will be quite small, thereby minimizing the voice currents through the receiver 1402 when the voice currents originate from the transmitter 1401 associated therewith.

At this point it may be well to note that transmission battery is supplied to the calling subscriber line 21 through the windings of the line relay R430 in the trunk circuit 300. Transmission battery for the trunk line 501 extending between the right-hand windings of the repeating coil 340 of the trunk circuit 300 and the left-hand windings of the repeating coil 700 of the trunk circuit 500, is supplied through the windings of the line relay R640 in the trunk circuit 500. Transmission battery for the trunk line 780 interconnecting the right-hand windings of the repeating coil 700 of the trunk circuit 500 and the operator telephone circuit is supplied through windings of the line relay R770 of the trunk circuit 500. Accordingly, the operator at the switchboard 1000 may now converse with the subscriber at the calling substation A in order to obtain the telephone number of the desired called manual subscriber at substation H.

Referring again to the operation of the talk relay R1120, in addition to connecting the talking conductors of the calling trunk to the operator telephone circuit at its contacts 1124 and 1125, it also prepares, at its contacts 1122 and 1123, a circuit for connecting the tip and ring conductors of the call plug P1210 to the operator telephone circuit by way of the conductors C1102 and C1103. At its contacts 1128, the relay R1120 disconnects the sleeve conductor C975 from the circuit, including the series connected switching relay R950 and the sleeve relay R970, and in place thereof, at its contacts 1127 and 1126, substitutes a circuit including the conductors C1108 and C1109 and the release local key K1408 and the switch-through key K1415 in the operator telephone circuit. Accordingly, the circuit for the switching relay R950 and the sleeve relay R970 now includes the sleeve conductor C975, the contacts 1127, the conductor C1109, the contacts 1410 of the key K1408, the contacts 1417 of key K1415, the conductor C1108, the contacts 1126, the windings of relays R970 and R950, to ground. The control to be exercised by the keys K1408 and K1415, which are now included in series with the sleeve conductor C975 and the above mentioned relays, will be described in detail hereinafter. At its contacts 1120', 1121' and 1122', the relay R1120 inserts the contacts of the toll ring key K1420 into the circuit including the sleeve conductor of the call plug P1270 and the windings of the relays R1140 and R1150, for the purpose to be described hereinafter. Furthermore, the relay R1120, at its contacts 1123', opens a point in the circuit of the dial-through key K1025 and, at its contacts 1124', prepares a point in the circuit of the dial relay R1250.

*Extending the call from the operator position at switchboard 1000 to the called subscriber at substation H*

Before extending the connection to the called subscriber line the operator at the switchboard 1000 may restore the talk key K1100 to disconnect her operator telephone circuit from the cord circuit 900. This operation, however, is optional since the operator telephone circuit may be retained connected to the cord circuit 900 during the setting up of a call, and may be disconnected therefrom after the connection is established. However, it will be assumed in the present case that the talk key K1100 is restored to normal by the operator before the connection is extended.

A further operation to be performed by the operator before the connection is to be extended to the called line of substation H is to test the called line to determine whether or not it is busy in another connection by placing the tip of the plug P1270 against the sleeve element of the jack J1301 terminating the called subscriber line. If the called line is busy, a ground potential will be applied to the sleeve element of the jack J1301 through the rectifier unit 1135 of the cord circuit which is used in interconnecting the busy subscriber line of the substation H with another subscriber line. Consequently, when the tip of the plug P1270 is placed into engagement with the sleeve element of jack J1301, the ground potential thereon will be extended over a circuit which may be traced through the tip element of the plug P1270, the contacts 1252, 1241 and 1181, the winding of supervisory relay R1170, the contacts 1151 and 1141, the conductor C1101, the resistance 1493, and the winding 1432 of the induction coil 1430, to battery. This circuit produces a click in the receiver 1402 of the operator headset 1400 to indicate to the operator that the line of substation H is busy. When this condition exists the operator must reoperate the talk key K1100 to reconnect her telephone circuit to the cord circuit 900 and the calling subscriber line in order to inform the calling subscriber that the called subscriber at substation H is busy.

It will now be assumed that when the above described busy test is made by the operator the line is idle and, therefore, battery potential applied to the sleeve conductor of the jack J1301 through the winding of the cutoff relay R1320 does not produce a click in the receiver of the operator telephone circuit.

In order for the operator at the switchboard 1000 to extend a call to the manual substation H, the operator inserts the plug P1270 into the jack J1301 terminating the line 1327 individual to the manual substation H. When the plug P1270 is inserted in the jack J1301, a circuit is completed for operating in series the sleeve relay R1140, the switching relay R1150, and the cutoff relay R1320, the latter relay being individual to the called line 1327, over a circuit which may be traced from ground, by way of the winding of relay R1150, the winding of relay R1140, the contacts 1122', the sleeve elements of the plug P1270 and the jack J1301, and the winding of relay R1320, to battery. The resistance in the above described circuit is such that the three relays R1140, R1150 and R1320 all operate to perform various control operations to be described hereinafter.

The relay R1150, upon operating over the above traced circuit, at its contacts 1151 and 1154 interrupts points in the tip and ring conductors of the cord circuit; at its contacts 1150' it opens a point in the incomplete circuit of the relay R1230; at its contacts 1155 and 1157 it prepares separate operating and holding circuits for the control relay R1130; and, at its contacts 1158, it completes a circuit for energizing only the lower polarizing winding of the relay R1220. This energizing circuit merely prepares the relay for quick operation when a circuit including its upper operating winding is completed. Further, the relay R1150 also connects, at its contacts 1156, a circuit including the winding of the relay R1210, the upper winding of the relay R1220, and the contacts 1263 in bridge of the talking conductors of the cord circuit 900 (indicated by heavy lines) extending to the tip and ring elements of the plug P1270. One talking conductor of the cord circuit 900 extends to the tip element of the plug P1270 through the contacts 1181, 1241 and 1252, and the other talking conductor of the cord circuit extends to the ring element of the plug P1270 through the contacts 1183, 1243 and 1254. At its contacts 1159, the relay R1150 also prepares a further point in the operating circuit of the ring relay R1240.

The relay R1140, upon operating over the previously traced circuit, interrupts, at its contacts 1143 and 1145, a point in the incomplete circuit of the relay R1060. Although the relay R1060 is bridged across the talking conductors of the cord circuit 900 through the contacts 1152 and 1153, this relay cannot be operated at the present time because it is disconnected from the answering end of the cord circuit at the contacts 951 and 954, and it is also disconnected from the calling end of the cord circuit at the contacts 1151 and 1154. At its contacts 1141, the relay R1140 also disconnects the busy test circuit extending to the operator telephone circuit; at its contacts 1146 it prepares a point in the incomplete circuit of the answering recall relay R1040; and, at its contacts 1147, it completes a circuit for illuminating the call lamp L1271. The circuit for illuminating the call lamp may be traced from ground, through the contacts 918, 966, 1164 and 1147, and the call lamp L1271, to battery. As a further result of the operation of the relay R1140 another point in the incomplete operating circuit of the ring relay R1240 is prepared at its contacts 1148, and, at its contacts 1149, a further point is closed in the incomplete operating circuit of the relay R1230.

As a result of the above described operations of the relays R1140 and R1150, the cord circuit 900 is now in condition to be controlled by the operator at the switchboard 1000 to signal the wanted subscriber at substation H. However, before this operation is described it may be well to mention that as a result of the seizure of the called line of substation H by the insertion of the plug P1270 into the jack J1301, the cutoff relay R1320 of the wanted subscriber line circuit 1300 is operated. At its contacts 1321 and 1322, the relay R1320 disconnects battery and ground potentials from the conductors of the called subscriber line 1327.

It was assumed in the foregoing description of the operation of the cord circuit 900 that the operator at the switchboard 1000 restored the talk key K1100 before she extended the connection to the wanted subscriber at substation H. It should be understood, however, that if the operator has neglected to restore the talk key of the selected cord prior to extending the connection to the called subscriber, the key may be restored at the present time without interfering with the above described operations of the cord circuit 900.

Since the connection has now been extended to the called subscriber at substation H, the operator at the switchboard 1000 may now momentarily actuate the ring start key K1215 individual to the selected cord circuit 900 in order to signal the called subscriber. As a result of the momentary operation of the ring start key K1215 a circuit is completed for the ringing relay R1240, which may be traced from ground, through the contacts 1148, 974 and 1021, the contacts of the key K1215, the contacts 1159, and the winding of relay R1240, to battery. The relay R1240 operates over the above traced circuit and, at its contacts 1246, completes a holding circuit from ground by way of the contacts 1148, 974, 1021, 1187 and 1246, and the winding of relay R1240, to battery. It will be noted that this holding circuit is independent of the contacts of the ring start key K1215 and, consequently, the relay R1240 remains in its operated position after the contacts of the key K1215 have been opened. At its contacts 1242 and 1244, the relay R1240 completes a circuit for signaling the wanted subscriber at substation H. This circuit may be traced from the ungrounded terminal of the ringing generator GEN., the upper winding of the ring cutoff relay R1180, the contacts 1244 and 1254, the ring elements of the plug P1270 and the jack J1301, the ring conductor of the line 1327, through the ringer bridged across the line 1327 at substation H, the tip conductor of the line 1327, the tip elements of the jack J1301 and the plug P1270, the contacts 1252 and 1242, to the grounded terminal of the interrupter generator. The ringer at the called substation H is actuated as a result of the above described circuit to signal the subscriber thereat that a call is waiting to be answered. However, it is to be noted that a ringback tone signal is transmitted to the calling subscriber by way of the interrupter generator GEN., the upper winding of the ring cutoff relay R1180, the contacts 1244, the condensers 1248 and 977, the contacts 904 of the key K901, the ring elements of the plug P900 and the jack J800, the conductor C783, the winding 703 of the repeating coil 700, the condenser 706, the winding 704 of the repeating coil 700, the conductor C784, the tip elements of the jack J800 and the plug P900, the contacts 902 of the key K901, the condensers 976 and 1247, and the contacts 1242, to ground. This ring-back tone signal is repeated by the repeating coil 700 to the calling subscriber at substation A in a well known manner. The ring-back tone signal indicates to the calling subscriber that the called subscriber is now being signaled.

When the called subscriber at substation H responds to the ringing signal and removes the receiver from the switchhook, a direct current bridge is connected across the line 1327 in order to control the ring cutoff relay R1180 and interrupt the above described ringing circuit. When the direct current bridge is connected across the line 1327 the relay R1180 operates and, at its contacts 1186, completes a holding circuit including its lower winding from ground at the contacts 1148. As a further result of the operation of the relay R1180, the holding circuit for the ringing relay R1240 is opened at the contacts 1187, whereupon the ringing relay R1240 restores and, at its contacts 1242 and 1244, disconnects the ringing generator GEN. from the called subscriber line. At its contacts 1182 and 1184 the relay R1180 also prepares circuits for connecting the answer relay R920 to the called line 1327. As a further result of the restoration of the ringing relay R1240, at its contacts 1241 and 1243 it connects the windings of the answer relay R920 to the tip and ring conductors of the called line 1327.

Since the answer relay R920 in the cord circuit 900 is now connected to the called subscriber line 1327, the relay is operated over a circuit which may be traced from ground, through the upper winding of the relay R920, the contacts 912, 952, 1182, 1241 and 1252, the tip elements of the plug P1270 and the jack J1301, the tip conductor of the line 1327, the direct current bridge circuit at the called substation H, the ring conductor of the line 1327, the ring elements of the jack J1301 and the plug P1270, the contacts 1254, 1243, 1184, 955 and 913, and through the lower winding of R920, to battery.

At its contacts 921, the relay R920 upon operating, places a bridging circuit across the tip and ring elements of the plug P900 which includes the relay R906, the contacts 921, and the resistance 932 in order to prevent any interruption in the circuit of the line relay R770 in the trunk circuit 500 during the switching operations caused as a result of the called subscriber answering the connection. At its contacts 923, the relay R920 opens a point in the completed circuit for the slow-to-operate recall relay R1030. The circuit for the latter relay was completed upon the restoration of the ringing relay R1240 from ground, by way of the contacts 972, 1121, 1185, 1245, 916, 923, 964 and 973, and through the winding of the recall relay R1030, to battery. Since the relay is of the slow-to-operate type the circuit therefor is opened at the contacts 923 before it has operated its associated contacts 1031 and 1032. The relay R920, at its contacts 922, also completes an operating circuit for the switching relay R910.

When the series relay R906 is bridged across the tip and ring elements of the plug P900, a circuit is completed therefor from the battery and ground applied to the tip and ring elements of the plug P900 by way of the windings of the line relay R770 in the trunk circuit 500. The relay R906 operates over this circuit and, at its contacts 907, completes a multiple circuit for maintaining the relay R910 in its operated position.

When the relay R910 operates over the above described circuit, at its contacts 911 and 914 it completes a loop circuit including the line relay R770 and the called line 1327 of substation H, which may be traced from ground, by way of the upper winding of the line relay R770, the contacts 761 and 741, the lower winding 704 of the repeating coil 700, the conductor C784, the tip elements of the jack J800 and the plug P900, the contacts 902 of the key K901, the contacts 911, 952, 1182, 1241 and 1252, the tip elements of the plug P1270 and the jack J1301, the tip conductor of the line 1327, through the loop circuit at the called substation H, the ring conductor of the line 1327, the ring elements of the jack J1301 and plug P1270, the contacts 1254, 1243, 1184, 955 and 914, the winding of the relay R906, the contacts 904 of the key K901, the ring elements of the plug P900 and jack J800, the conductor C783, the winding 703 of the repeating coil 700, the contacts 742 and 762, through the lower winding of relay R770, to battery.

As a result of the foregoing circuit it will be noted that the relay R906 is maintained energized over a loop circuit including the called substation H independently of the circuit including the contacts 921 and the resistance 932. As a further result of the operation of the relay R910, at its contacts 912 and 913 the answer relay R920 is disconnected from the called subscriber line and, as a result thereof, restores to normal. At its contacts 921, the relay R920 opens a multiple circuit, including the resistance 932 and the relay R906, and, at its contacts 922, it opens the initial energizing circuit of the relay R910. However, the latter relay remains in its energized position due to the circuit including ground at the contacts 907 under the control of the series relay R906. At its contacts 916, the relay R910 opens a further point in the incomplete circuit of the recall relay R1030 and, at its contacts 918, it opens the circuit for illuminating the call lamp L1271. At its contacts 915, the relay R910 also completes a circuit for the lower winding of the relay R940, which relay, upon operating, at its contacts 943 completes a holding circuit for its upper winding by way of ground through contacts 972 and 1121.

As a further result of the operation of the relay R940 it connects, at its contacts 942, the ring-down relay R930 in series with the condenser 933 across the tip and ring elements of the plug P900 and, at its contacts 941, it disconnects the left-hand winding of the shunt field relay R1020 from across the tip and ring elements of the plug P900. At its contacts 944, the relay R940 prepares a flashing circuit for the answer lamp L919.

Since the relay R1020 is now only energized over its right-hand polarizing winding, the relay does not remain in its operated position and, accordingly, restores to normal. Upon restoring, the relay R1020, at its contacts 1022, prepares a further point in the circuit of the answer lamp L919. The connection between the calling substation A and the called substation H is now completed and communication between the subscribers thereat may take place. It should be noted, however, that the transmission battery for the called substation H is supplied through the windings of the line relay R770 in the trunk circuit 500.

During the period of time the connection is maintained between the calling subscriber at substation A and the called subscriber at substation H, the relays R310, R410, R430, R440 and R450 in the main exchange trunk circuit 300; the relays R520, R540, R630, R640, R660, R730 and R770 in the branch exchange trunk circuit 500; and the relays R906, R910, R940, R970, R1140, R1150 and R1180 in the cord circuit 900, remain operated. It is to be noted, however, that the operator at the switchboard 1000 may actuate the key K1100 at any time in order to listen in on the conversation to ascertain whether or not a satisfactory connection has been established. Actuation of the key K1100 causes the relay R1120 to operate and bridge the operator telephone circuit across the tip and ring conductors of the cord circuit 900.

*Releasing the connection*

When the conversation between the subscriber at substation A and the subscriber at substation H has been completed, the subscribers at the respective substations disconnect by replacing their receivers upon the switchhooks of their respective telephone instruments. When the subscriber at the substation H replaces his receiver, the loop circuit including the relay R906 of the cord circuit 900 and the relay R770 of the trunk circuit 500 is interrupted, thereby causing these relays to restore to normal. When the relay R906 in the cord circuit 900 restores, at its contacts 907 it opens the circuit of the relay R910. The relay R910 now restores to normal and, at its contacts 911 and 914, it disconnects the tip and ring conductors extending to the plug P900 from the tip and ring conductors extending to the plug P1270; and, at its contacts 912 and 913, it reconnects the answer relay R920 to the tip and ring conductors extending to the plug P1270.

The latter circuit is prepared to provide a recall facility for the subscriber at the substation H, whereby the subscriber thereat may recall the operator at the switchboard 1000 by merely again removing his receiver from the switchhook at his telephone instrument. As a further result of the restoration of the relay R910, at its contacts 915 it opens a circuit for the lower winding of R940. At its contacts 916, the relay R910 completes an operating circuit for the recall relay R1030, which operating circuit may be traced from ground, by way of the contacts 972, 1121, 1185, 1245, 916, 923, 964 and 973, and through the winding of the relay R1030, to battery. At its contacts 1031, the relay R1030, upon operating, completes a locking circuit for itself from ground at the contacts 972 by way of the contacts 1121, 1031, 973, and the winding of the relay R1030, to battery; and, at it contacts 1032, it prepares a circuit for flashing the call lamp L1271 in the event the subscriber at the substation H should recall the operator at the switchboard 1000. As a further result of the restoration of the relay R910, at its contacts 918 it completes a circuit by way of the contacts 966, 1164 and 1147, for illuminating the call lamp L1271. The illuminated condition of the called lamp L1271 indicates to the operator at the switchboard 1000 that the subscriber at the substation H has disconnected and that she may now remove the plug P1270 from the associated jack J1301.

When the subscriber at the substation A replaces his receiver upon his telephone instrument, a loop circuit including the windings of the line relay R430 in the trunk circuit 300 in the main exchange 20 is interrupted. The relay R430 restores to normal and, at its contacts 431, interrupts the loop circuit including the windings of relays R640 and R650, and the left-hand operating winding of relay R410, whereupon these relays restore to normal. Upon restoring, relay R640, at its contacts 645, completes a circuit by way of contacts 669 for operating the reversing relay R740. Relay R740 operates and, at its contacts 741 to 744, inclusive, reverses the direction of current flow over conductors C783 and C784, but this operation has no effect in the cord circuit 900 in a connection of the type being described. The relay R430, upon restoring, also interrupts at its contacts 432, the circuit of the relay R440. Since the relay R440 is of the slowto-release type, a circuit is completed from ground through the contacts 433, 444 and 423, and through the winding of the control relay R320, to battery, before the relay R440 restores to normal. Upon operating, the relay R320, at its contacts 324, completes a multiple circuit for operating the relays R330 and R420. In response to the operation of the relay R420, a circuit is completed by way of the contacts 323 and 421 for maintaining the relay R440 in its operated condition. It will be noted that this circuit is independent of its initial operating circuit which was controlled by the contacts 432 of the line relay R430. As a further result of the operation of the relay R420, at its contacts 422 and 423, it opens the operating circuit of the relay R320. At its contacts 323 and 324, the relay R320, upon restoring, opens the holding circuit of the relay R440 and the operating circuits of the relays R330 and R420. It will be noted, however, that the relay R420 is maintained operated to prevent reoperation of the relay R320 until after the slow-to-release relay R440 has had sufficient time to restore and open its contacts 444. The circuit for maintaining the relay R420 operated may be traced from ground, by way of the contacts 433, 444 and 422, the resistance 424, and through the winding of the relay R420, to battery. Since the relay R320 cannot be reoperated, the relay R440 now restores to normal and, at its contacts 444, opens the circuit of the relay R420, which also restores to normal. As a further result of the restoration of the relay R440, at its contacts 441, it opens the circuit for controlling the right-hand polarizing winding of the supervisory relay R410 and the operating circuit of the switching relay R450. Since the relay R450 is of the slow-to-release type, the contacts 455 thereof are maintained closed for a sufficient period of time to permit a circuit to be completed for the relay R460, which may be traced from ground by way of the contacts 442 and 455, the winding of the relay R460, the conductor C503 of the trunk line 501, the contacts 612, the winding 702 of the repeating coil 700, the contacts 714 and 664, the lower winding of the differential relay R650, and through the lower winding of the line relay R640, to battery. The relay R460 operates over the above described circuit but due to the resistance of this relay, the relays R650 and R640 in the trunk circuit 500 do not operate at this time. The relay R460, upon operating, at its contacts 461 completes a holding circuit for the relay R450 in order to maintain the relay R450 in its operated condition until the operator at the switchboard 1000 removes the plug P900 from the associated jack J800. As a further result of the operation of the relay R460, at its contacts 462 ground potential is applied to the control conductor C222 in order to maintain the selector 202 and the line switch 201 in their operated positions. It should also be noted that at its contacts 461 the relay R460 maintains the right-hand polarizing winding of the supervisory relay R410 energized, but the latter relay restores to normal since the circuit for its left-hand operating winding is opened at the contacts 431 by the restoration of the line relay R430.

*Recall by the subscriber at the substation H*

Before describing the operations which take place when the operator at the switchboard 1000 breaks down the connection by removing the plugs P900 and P1270 from their respective jacks J800 and J1301, the operations which take place when the subscriber at the substation H desires to recall the operator will now be described. When the receiver is again removed by the subscriber at substation H from the telephone instrument after it has momentarily been replaced thereon, a circuit, described hereinbefore, is again completed for reoperating the answer relay R920 in the cord circuit 900. The relay R920, upon operating, at its contacts 922 causes the relay R910 to reoperate and again bridge the called line 1327 across the tip and ring conductors terminating in the plug P900, and as a result thereof the relay R770 in the trunk circuit 500 and the relay R906 in the cord circuit 900 reoperate. The relay R920 restores to normal since the windings thereof are disconnected from the tip and ring conductors of the cord circuit 900 upon the operation of the relay R910. It will be remembered that the recall relay R1030 is in its operated position at this time; therefore, when the contacts 917 of the relay R910 are closed, a circuit is completed for intermittently illuminating the call lamp L1271 to indicate to the operator at the switchboard 1000 that the subscriber at the substation H desires to converse with the operator. The intermittent circuit for flashing the call lamp L1271 may be traced from the intermittently grounded conductor C1044, the contacts 1032, 917, 966, 1164 and 1147, and the call lamp L1271, to battery.

In order for the operator at the switchboard 1000 to converse with the subscriber at the substation H, she operates the talk key K1100 to reconnect her telephone circuit to the cord circuit 900 in the manner previously described. Attention is directed to the fact that when the talk relay R1120 is operated under the control of the talk key K1100, at its contacts 1121 it opens the holding circuit for the recall relay R1030, which relay now restores and, at its contacts 1032, disconnects the circuit for intermittently flashing the call lamp L1271. It should be noted that the initial energizing circuit for the relay R1030 has been interrupted at the contacts 916 upon the operation of the switching relay R910. Transmission battery for the connection between the operator at the switchboard 1000 and the subscriber at the substation H is supplied through the windings of the line relay R770 in the trunk circuit 500.

*The operator at the switchboard 1000 takes down the connection*

When the operator at the switchboard 1000 receives the disconnect signal, i. e., the steady illuminated condition of the call lamp L1271, she reactuates the talk key K1100 of the associated cord circuit 900 in order to reconnect her head set 1400 of her telephone circuit to the tip and ring conductors of the cord circuit 900. After the key K1100 has been actuated the operator may then challenge the connection to determine whether or not the calling subscriber at the substation A, as well as the called subscriber at the substation H, has disconnected by replacing the receiver thereat upon the switchhook of the associated telephone instrument. Since both of the subscribers involved in the connection have disconnected, the operator now restores the key K1100 to normal in order to disconnect her telephone circuit from the associated cord circuit and then removes the answer and call plugs P900 and P1270 from their associated jacks J800 and J1301. Removal of the plug P1270 from the jack J1301 interrupts the series circuit including the relays R1320, R1140 and R1150, whereupon these relays restore to normal. The restoration of the cutoff relay R1320 reconnects the line relay R1325 to the line 1327 of the substation H to enable the subscriber thereat to initiate a new call. As a result of the restoration of the relay R1140, at its contacts 1147, it interrupts the circuit for illuminating the call lamp L1271 of the cord circuit 900, and, at its contacts 1148, it opens the holding circuit of the relay R1180, causing the latter relay also to restore to normal.

When the answer plug P900 is withdrawn from the jack J800 the series circuit including the relays R950 and R970 of the cord circuit 900, and the upper winding of the reversing relay R660 of the trunk circuit 500, is interrupted causing the relays R970 and R660 to restore to normal. Attention is directed to the fact that although the switching relay R950 is included in the above mentioned series circuit, the relay, being of the marginal type, does not operate when the above mentioned series circuit includes the upper winding of the reversing relay R660. Upon restoring, the relay R970 opens, at its contacts 972, the energizing circuit for the right-hand polarizing winding of the relay R1020, the holding circuit for the upper winding of the relay R940, and the holding circuit for the recall relay R1030. It should be noted that the relay R1020 restored to normal when the energizing circuit for its left-hand winding was interrupted at contacts 941; therefore the opening of the energizing circuit for its right-hand polarizing winding has no effect at this time. The relays R940 and R1030, however, restore to normal. The cord circuit 900 is now restored to normal and may be used to answer and extend other calls received by the operator at the switchboard 1000.

Referring now to the trunk circuit 500, attention is directed to the fact that the line relay R770 restored to normal when the subscriber at the substation H disconnected. Upon restoring, the relay R770, at its contacts 773, removes one source of holding ground potential from the conductor C677, the other source of holding ground potential being applied to conductor C677 by way of the contacts 668 in order to maintain the relay R730 operated until the operator at the switchboard 1000 withdraws the plug P900 from the jack J800.

As has been mentioned above, the series circuit including the sleeve conductor C675 and the upper winding of the reversing relay R660 is opened when the plug P900 is withdrawn from the jack J800. Consequently, the reversing relay R660 now restores to normal since the holding circuit for its lower winding is open at the contacts 643 and 651 of the restored relays R640 and R650, respectively. At its contacts 668, the relay R660 removes the final source of holding ground potential from the conductor C677 to permit restoration of the hold relay R730. Upon restoring to normal, the relay R660, at its contacts 665 and 667, opens points in the circuits for holding the relay in its operated position; at its contacts 662' it removes one of the sources of holding ground potential from the winding of the relay R520; and, at its contacts 669, it opens the previously traced circuit for operating the reversing relay R740 which now restores to normal. As a further result of the restoration of the relay R660, at its contacts 661', it completes a circuit for the slow-to-operate switching relay R710. It should be noted, however, that since the relay R710 is of the slow-to-operate type, the relay does not have sufficient time to operate its associated contacts before the operating ground potential therefor is removed at the contacts 733 by the restoration of the relay R730. At its contacts 661 to 664, inclusive, the relay R660 reverses the connection of battery and ground potentials to the conductors C502 and C503 of the trunk 501, thereby placing ground potential through the upper winding of the line relay R640 to the conductor C502, thereby shunting the winding of the relay R460 in the trunk circuit 300.

As has been mentioned above, the restoration of the hold relay R730 removes the operating ground potential, at its contacts 733, from the winding of the switching relay R710, before the latter relay has had sufficient time to operate its associated contacts. As a further result of the restoration of the relay R730, at its contacts 732, it removes the ground potential from the conductor C787, thereby removing the ground potential marking the trunk circuit 500 busy in the banks of the selectors, such as the selector 810, having access thereto. At its contacts 734, the relay R730 also removes ground potential from the conductor C782, thereby extinguishing the busy lamp L802 associated with the jack J800.

When the reversing relay R740 restores to normal, at its contacts 741 to 744, inclusive, it restores the reversed connection of battery and ground potentials by way of the winding of the line relay R770 to the conductors of the trunk 780 to normal. At its contacts 745, the relay R740 also opens the circuit of relay R520, which relay now restores to normal and, at its contacts 522, opens the circuit of the relay R540 which also restores to normal. The trunk circuit 500 is now restored to normal and may be seized by the selector 810 in order to extend a connection to the main exchange 20.

The reversal of the connection of battery and ground potentials to the conductors of the trunk 501, as has been described above, caused the relay R460 to restore to normal. Upon restoring, the relay R460, at its contacts 461, opens the circuit of the relay R450 and the circuit for the right-hand polarizing winding of the supervisory relay R410. Since the circuit through the left-hand operating winding of the latter relay was opened at the time the called subscriber at the substation H disconnected, the relay is in its restored position at the present time. At its contacts 462, the relay R460 also removes ground potential from the conductors C219 and C222. The removal of ground from the former conductor removes the busy marking potential from the banks of the outgoing selectors having access thereto. The removal of ground potential from the conductor C222, however, causes the outgoing selector 202 and the line switch 201 involved in the connection to be restored to normal, in a well known manner, and to remove the busy marking potential from the banks of the connectors, such as 211, having access to the line 21 of the substation A. Finally, the relay R450 restores to normal, removing the shunt from the winding of the relay R460 at its contacts 455, and, at its contacts 451 and 453, it reconnects the trunk 501 to the trunk 480 so that connections may be established from the branch exchange 50 to the main exchange 20 by way of the trunk circuit 500, the incoming selector 210, and subsequent switches in the train. The switching apparatus involved in the connection between the subscriber at the substation A and the subscriber at the substation H has now been restored to normal and may be utilized by other subscribers to establish new calls.

CALL FROM THE SUBSTATION A IN THE MAIN EXCHANGE 20 TO THE AUTOMATIC SUBSTATION G IN THE BRANCH EXCHANGE 50

A description will now be given of the operation of the telephone system when a connection is set up from a subscriber at the substation A by way of the automatic switching apparatus in the main exchange 20 and the automatic switching apparatus in the branch exchange 50 to the subscriber at the substation G. A connection of this type is completed by the subscriber at the substation A without the assistance of the operator at the switchboard 1000 located in the branch exchange 50. When the subscriber at the substation A initiates a call, the line switch 201 selects an idle selector in the previously described manner. Assuming that the selector 202 is the one selected by the line switch 201, and assuming further that the subscriber has dialed the first digit "4" of the telephone number of the substation G, the selector 202 will respond in a well-known manner to position its wipers to the fourth level of its associated bank contacts and then rotate its wipers over the contacts in the fourth level to select an idle trunk line, such as 203, extending to an idle trunk circuit, such as 300.

The trunk circuit 300, as has been previously described, may be seized over the trunk line 203 or the trunk line 204. When the digit "3" was dialed by the calling subscriber at the substation A the selector 202 seized the trunk line 204 and caused the trunk circuit 300 in the main exchange 20 to control the trunk circuit 500 in the branch exchange 50 to extend the connection to the switchboard 1000. However, when the digit "4" is dialed by the calling subscriber at the substation A the selector 202 seizes the trunk line 203 and causes the trunk circuit 300 to control the trunk circuit 500 in such a way that the switchboard 1000 is by-passed and the connection is extended to the automatic switching equipment in the branch exchange 50. Accordingly, the calling subscriber at the substation A may control the automatic switching apparatus in the branch exchange 50 in order to establish a connection with the subscriber at the substation G, as will now be described.

It will be assumed that the selector 202, upon operating in response to the dialing of the digit "4," has selected the trunk line 203 comprising conductors C217, C218 and C219 extending to the trunk circuit 300 and has temporarily applied ground potential to the control conductors C219 and C222 in order to mark the trunk circuit 300 busy to all selectors having access thereto over either the trunk line 203 or the trunk line 204.

Since the trunk circuit 300 in the present instance has been seized over the trunk line 203, the line relay R430 is operated over a loop circuit including conductors C217 and C218. The circuit for operating the line relay R430 may be traced from ground, by way of the upper winding of the relay R430, the winding 342 of the repeating coil 340, the contacts 322 and 314, the conductor C218 of the trunk line 203, through the selector 202, the line switch 201, one conductor of the subscriber line 21, the closed loop circuit at the substation A, and returning by way of the other conductor of the line 21 through the line switch 201, the selector 202, the conductor C217 of the trunk line 203, the contacts 313 and 321, the winding 341 of the repeating coil 340, and the lower winding of the relay R430, to battery. Upon operating over the above described circuit, the line relay R430, at its contacts 432, completes an energizing circuit for the hold relay R440 and, at its contacts 431, prepares a circuit for repeating impulses dialed by the subscriber at the substation A over the trunk line 501.

The hold relay R440 operates when the energizing circuit therefor is completed at the contacts 432 of the line relay R430 and, at its contacts 441, completes an operating circuit for the switching relay R450 and it also completes an energizing circuit for the right-hand polarizing winding of the supervisory relay R410. The supervisory relay R410, as has been mentioned hereinbefore, does not operate until the current flow in its left-hand operating winding is in the proper direction. At its contacts 443, the relay R440 applies ground potential to the control conductors C219 and C222 and to the control conductor of the trunk 480 extending to the incoming selector 210. The ground potential is applied to the control conductor C219 in order to replace the busy ground potential temporarily applied thereto by the selector 202. This ground potential now maintains the selector 202 and the line switch 201 in their operated positions and marks the trunk line 203 as busy to other selectors having access thereto. The ground potential applied to the control conductor C222 also marks the trunk line 204 as busy to the selectors having access thereto. At its contacts 444, the relay R440 prepares a circuit for operating the control relay R320, and it also prepares a circuit including the resistor 347 and the contacts 331 for preenergizing the lower winding of the line relay R430. The preenergizing circuit for the line relay R430, as will be described hereinafter, is effective to increase the speed at which the line relay R430 responds to impulses dialed over heavily loaded lines or particularly long lines.

When the switching relay R450 operates over the above mentioned circuit, at its contacts 451 and 453 it disconnects the conductors C502 and C503 from the incoming selector 210 and, at its contacts 452 and 454, it connects the conductors C502 and C503 to the right-hand windings of the repeating coil 340 and the left-hand winding of the supervisory relay R410. At its contacts 456, the relay R450 short-circuits the winding of the select relay R470 to prevent its operation and, at its contacts 455, it prepares a point in the incomplete circuit of the relay R460.

When the switching relay R450 operated and connected the conductors C502 and C503 to the right-hand windings of the repeating coil 340 and the left-hand winding of the supervisory relay R410, a loop circuit was completed for the line relay R640 in the trunk circuit 500, which may be traced from ground by way of the upper winding of the relay R640, the upper winding of the relay R650, the contacts 662 and 714, the left-hand windings 702 of the repeating coil 700, the contacts 612, the conductor C503, the contacts 454 and 431, the right-hand winding 344 of the repeating coil 340, the left-hand winding of the supervisory relay R410, the right-hand winding 343 of the repeating coil 340, the contacts 452, the conductor C502, the contacts 611, the winding 701 of the repeating coil 700, the contacts 712 and 661, the lower winding of the relay R650, and the lower winding of the line relay R640, to battery. In this circuit the relays R640, R650 and R410 are energized, but the differential relay R650 does not operate at this time because the current flow through one of its windings opposes the current flow through the other of its windings. The supervisory relay R410 does not operate at this time because the current flow through its left-hand winding is in opposition to the current flow in its right-hand winding. The line relay R640, however, operates and, at its contacts 641, connects the sleeve conductor C675 to the upper winding of the reversing relay R660. At its contacts 642, the relay R640 disconnects the sleeve conductor C675 from a circuit including the winding of the connect relay R620 and, at its contacts 643, it prepares holding circuits for the relays R630 and R660. As a further result of the operation of the relay R640, at its contacts 644 it completes a previously traced circuit for energizing the hold relay R730; at its contacts 645 it opens a point in the incomplete circuit of the reversing relay R740; and at its contacts 646 it opens a point in the incomplete circuit of the switching relay R710.

The relay R730, upon operating in the previously described manner, at its contacts 732 applies ground potential to the conductor C787 to busy the trunk circuit 500 and prevent its seizure by any selectors, such as the selector 810, having access thereto and, at its contacts 734, it applies ground potential to the conductor C782 in order to illuminate the busy lamp L802 at the switchboard 1000 to indicate to the operator thereat that the trunk circuit 500 is busy in a connection and cannot be used for other calls.

The seizure of the trunk circuit 500, as has been mentioned, has caused the operation of the line relay R640 and the hold relay R730 and the illumination of the busy lamp L802 at the switchboard 1000. Attention is now directed to the fact that the incoming selector 830 is also operated when the switching relay R450 in the trunk circuit 300 connected the conductors C502 and C503 in the series circuit whereby the line relay R640 in the trunk circuit 500 operated. The previously traced loop circuit, including the line relay R640, also includes a multiple circuit for seizing and operating the selector 830. One branch of this multiple circuit includes the conductor C502, the contacts 711 and 542, the negative (—) conductor of the trunk line 580 and one winding of the line relay, to battery (not shown) in the selector 830; the other branch of the multiple circuit includes the conductor C503, the contacts 543, the positive (+) conductor of the trunk line 580, and the other winding of the line relay to ground (not shown) in the selector 830. In response to the closure of this circuit, the line relay in the selector 830 operates and prepares the selector to respond to impulses dialed by the calling subscriber at the substation A.

When the selector 830 is seized in the above described manner and the line relay therein responds to prepare the selector for further operation, ground potential is also applied by the selector 830 to the conductor C1, whereupon the cut-off relay R610 in the trunk circuit 500 is operated. The effect of the operation of the relay R610 will be described hereinafter. Although the operations which take place in order to seize the trunk circuit 500 and the selector 830 have been described separately, it should be understood that they occur simultaneously as a result of the operation of the switching relay R450 in the trunk circuit 300.

The calling subscriber at the substation A may now dial the second digit of the telephone number of the subscriber at the substation G. When the line 21 is interrupted in accordance with the second digit of the telephone number, the line relay R430 in the trunk circuit 300 follows the impulses and interrupts, at its contacts 431, the loop circuit including the conductors C502 and C503 a corresponding number of times in order to repeat the impulses received over the trunk line 501 to the selector 830 in the branch exchange 50. The first time the line relay R430 restores, at its contacts 433 it completes a circuit by way of the contacts 444 and 423, and the winding of the control relay R320 to battery, and, at its contacts 431 it interrupts the loop circuit including the conductors C502 and C503.

The relay R320 operates over the above traced circuit and, at its contacts 321 and 322, it opens the loop circuit of the line relay R430 in order to prevent any surges or extraneous currents over the trunk line 203 from affecting relay R430; at its contacts 324 it completes operating circuits for the relays R330 and R420; and, at its contacts 323, it prepares a circuit for maintaining the hold relay R440 energized during the time its initial operating circuit has been opened by the restoration of the relay R430. The relay R420 now operates and, at its contacts 421, completes the above mentioned circuit for maintaining the relay R440 in its energized position; at its contacts 423 it opens the initial operating circuit of the relay R320; and, at its contacts 422, it completes a locking circuit for itself by way of the resistance 424. The relay R330, upon operating in the multiple circuit with the relay R420, at its contacts 332 completes a circuit for shunting the winding 343 of the repeating coil 340 and the left-hand winding of the supervisory relay R410 in order to improve the impulsing circuit over the conductors C502 and C503. At its contacts 331, the relay R330 also closes a circuit from ground, by way of the contacts 433 and 444, the resistance 347, the contacts 331, and the lower winding of the relay R430 to battery, in order to preenergize the line relay R430 so that it will quickly respond over heavily loaded or particularly long lines. The relay R320 now restores and, at its contacts 324, opens the multiple circuit including the windings of the relays R330 and R420. The relay R330, being of the slow-to-release type, remains operated during the pulsing period because it is intermittently energized each time the relay R320 operates under control of the contacts 433 of the line relay R430. As a further result of the restoration of the relay R320, at its contacts 321 and 322 it reconnects the line relay R430 to the loop circuit including the calling subscriber line, and, at its contacts 323, it opens the circuit of the hold relay R440. The hold relay R440, being of the slow-to-release type, remains in its operated position during the pulsing period. When the loop circuit including the calling subscriber line is again closed under the control of the dial at the substation A, the line relay R430 reoperates and, at its contacts 433, opens the holding circuit including the resistance 424 and the relay R420. The relay R420 now restores to normal and, at its contacts 423, again prepares a circuit for operating the control relay R320.

Upon reoperating, the line relay R430, at its contacts 431, again recloses the loop circuit including the conductors C502 and C503 and, at its contacts 432, it recloses the energizing circuit of the relay R440. The above cycle of operations, including the relays R320, R420 and R430, is repeated each time the circuit of the line relay R430 is interrupted by the dial at the substation A, whereupon the same number of impulses transmitted to the line relay R430 is repeated over the conductors C502 and C503 to control the selector 830 in the branch exchange 50.

When the line relay R430 comes to rest in its operated position after the last impulse of a digit has been received, the relays R420, R320, and R330 subsequently restore to normal. The latter relay, at its contacts 332, removes the shunt circuit from around the winding 343 of the repeating coil 340 and the left-hand winding of the supervisory relay R410, and, at its contacts 331, opens the preenergizing circuit for the lower winding of the line relay R430.

In view of the foregoing considerations, it will be understood that each time the subscriber at the substation A manipulates the dial thereat, the above described operations of the relays R430, R420, R320 and R330 will take place in order to improve the impulsing circuit to the trunk circuit 300 and in order to repeat the impulses over the trunk line 501 to the branch exchange 50.

Referring again to the trunk circuit 500, it will be recalled that the cutoff relay R610 operated when the selector 830 was seized. Upon operating, the relay R610, at its contacts 615, applies ground potential to the conductor C677 in order to maintain the hold relay R730 in its operated position; at its contacts 613 it prepares a point in the circuit for operating the connect relay R620 over the sleeve conductor C675; at its contacts 614 it disconnects the sleeve conductor C675 from the circuit including the winding of the relay R520; and, at its contacts 616, it opens a point in the incomplete circuit of the switching relay R710. As a further result of the operation of the relay R610, at its contacts 611 and 612, it disconnects the line relay R640 from the conductors C502 and C503, whereupon the line relay R640 restores to normal.

Upon restoring to normal, the relay R640, at its contacts 641, disconnects the sleeve conductor C675 from a circuit including the upper winding of the reversing relay R660, and, at its contacts 642, it completes the above mentioned circuit for connecting the relay R620 to the sleeve conductor C675. At its contacts 644, the relay R640 disconnects one of the multiple ground circuits from the conductor C677, the relay R730 now being held under the control of the cutoff relay R610, and, at its contacts 646 it closes a point in the incomplete circuit of the switching relay R710.

It will now be understood that when impulses are repeated by the trunk circuit 300 over the trunk line 501, the line relay R640 in the branch exchange 50 cannot respond since the windings thereof are disconnected by the operation of the relay R610. Consequently, when the impulses constituting the second digit of the number dialed by the calling subscriber at the substation A are repeated by the trunk circuit 300, the selector 830 responds to the impulses and raises its wipers to a level corresponding to the digit dialed. The selector 830 now rotates its wipers over the associated bank contacts of the selected level in a well-known manner to select an idle connector, such as 840.

It will be assumed that the connector 840 is selected and that the connector is a straight line connector since the wanted substation G is an individual line. The subscriber at the substation A now dials the final two digits of the wanted subscriber telephone number, whereupon the connector 840 responds in a well-known manner to raise its wipers to a particular level and then rotates the wipers over the selected level to the particular bank contacts terminating the line 847 of the substation G. It will be assumed that the line 847 of the substation G is idle when the wipers of the connector 840 engage the bank contacts terminating the line and automatically transmits ringing current to signal the subscriber at the substation G, in a well-known manner.

When the connector 840 transmits ringing current over the wanted line 847 to signal the subscriber at the substation G, ground potential is applied to the TS conductor of the connector 840, the selector 830, the trunk line 580, and contacts 521, whereupon the relays R550 and R560 are energized. The operation of the relays R550 and R560 initiates the operation of the timer 570 in a manner to be described hereinafter, whereby the operator at the switchboard 1000 may be signaled in the event that the called subscriber at the substation G does not answer the call within a predetermined elapsed time interval.

It may be well to mention at this time that the selector 830 has access by way of its wipers and associated bank contacts, to groups of straight line connectors, such as the connector 840, and to groups of party line connectors, such as the connector 820. The connectors, such as 840, operate to extend connections to single station lines, such as 847, and the party line connectors, such as 820, operate to extend connections to multiparty lines, such as 846. If the party line connectors are of the code ringing type the ringing period must be continued for a sufficient time interval to permit the individual subscribers on the line to ascertain whether or not the particular ringing code is the code of his particular station.

In some buildings, such as dormitories, the telephone company may provide a single telephone instrument in the dormitory hall for answering and extending calls and may also provide a ringer, for example, in each of a plurality of rooms on the particular floor. When such an arrangement is provided on a party line either code or harmonic ringing party line connectors may be provided. Furthermore, it should be understood that a particularly long answering time must be provided after the ringing period has been started by the connector in order to permit the wanted subscriber in one of the dormitory rooms to get from his room to the telephone instrument located in the dormitory hall in order to answer the call.

It will be understood as the description of operation of the trunk circuit 500 proceeds that the timer 570 is arranged to signal the operator at the switchboard 1000 in the branch exchange 50 in the event that the subscriber at the wanted substation does not answer his call within a predetermined elapsed time interval. The elapsed time interval after the connector has started to signal the wanted subscriber is determined by the class of the particular called line. In other words, if the called station is of the party type the timer 570 is arranged to signal the operator at the switchboard 1000 in a particular manner to enable the operator to intercept the call after a longer elapsed time interval than that on a call to a subscriber of the individual or straight line type. In order to control the time duration that ringing current is to be transmitted over the particular called line before the timer 570 signals the operator at the switchboard 1000, a control circuit is provided between the particular connector switch involved in the connection and the trunk circuit 500. If an individual line is being signaled and a straight line connector, such as 840, is utilized, direct ground is applied by the connector to the TS conductor of the trunk 580 at the start of the ringing or signaling period, thereby to cause the operation of both the relays R550 and R560. If, however, a subscriber on a party line is being signaled and a party line connector, such as 820, is utilized, resistance ground is applied by the connector to the TS conductor of the trunk 580 at the start of the ringing period, thereby to cause the operation of only the relay R560. If both relays R550 and R560 are operated, a shorter interval of time is provided between the start of the connector ringing period and the signal to the operator under control of the timer 570. However, if only the relay R560 is operated, a longer interval of time is provided between the start of the connector ringing period and the signal to the operator.

In the present instance, in the call being described to the subscriber at the substation G, the connector 840 has returned direct ground potential over the conductor TS of the trunk 580 and has caused the operation of both the relays R550 and R560. The relay R550, upon operating, at its contacts 551 connects the third terminal in the bank associated with the wiper 574 of the timer 570, by way of the conductor 577 to the winding of the relay R530, whereby the relay R530 is operated to disconnect the pulsing circuit for the rotary magnet 572 of the timer after the wiper 574 has been advanced to its associated third bank contact. At its contacts 552, the relay R550 prepares a circuit for connecting the grounded interrupter 536 to the conductor C676 when the wiper 575 of the timer is advanced to its associated third bank contact.

The relay R560, upon operating over the previously traced circuit, at its contacts 563 opens a point in the incomplete circuit of the release magnet 573 of the timer; at its contacts 561 it prepares a circuit for operating the control relay R540; and at its contacts 564 it prepares a point in the circuit for operating the rotary magnet 572 under the control of the timing relay R510.

The timer 515 is provided to intermittently apply ground potential to conductor 516 in order to operate periodically the timing relay R510 which, in turn, at its contacts 513 intermittently permits ground pulses to control the rotary magnet 572. Each time the timing relay R510 operates, at its contacts 513 it completes a circuit from ground, by way of the contacts 513, 534 and 564, and the winding of the rotary magnet 572, to battery. Each time the rotary magnet 572 is operated it advances it wipers 574 and 575 one step in a clockwise direction.

In the event that the call is not answered by the subscriber at the substation G within the time interval required for the wipers of the timer 570 to be advanced to the associated third bank contacts, a circuit will be completed from ground, by way of the wiper 574, the conductor 577, the contacts 551, and the winding of the relay R530, to battery in order to operate relay R530 and interrupt at contacts 534, the pulsing circuit from the timing relay R510 to the rotary magnet 572. At its wiper 575, the timer 570 also completes a circuit from the grounded interrupter 536 by way of the contacts 535, 547 and 552, the conductor 579, the wiper 575 and its associated third bank contact, the conductor C676 and the answer lamp L803, to battery. The answer lamp L803 is intermittently flashed over the above-traced circuit in order to indicate to the operator at the switchboard 1000 that a call has been extended to a subscriber in the branch exchange and that the subscriber has failed to answer the call within the predetermined elapsed time interval determined by the timer 570.

In the above described operation of the timer 570, the relays R550 and R560 were both operated when direct ground potential was applied to the TS conductor by the straight line connector 840. The relay R550, at its contacts 551, prepared a circuit for operating the relay R530, which circuit became effective when the timer had advanced its wipers to its associated third bank contacts. Consequently, if the calling subscriber does not answer the call within the time period required to advance the wipers of the timer three steps in a clockwise direction, the operator is signaled to intercept the call. In the event that the call being described had been extended by way of the party line connector 820, a resistance ground potential would have been applied to the TS conductor whereupon only the relay R560 is operated. Since the relay R550 is not operated when a connection is extended to a party line, the wiper 574 of the timer 570 must be advanced to its associated ninth bank contact before a circuit is completed for operating the relay R530. Consequently, the flashing condition of the lamp L803 to signal the operator that the call should be intercepted does not occur until the wiper 574 is advanced into engagement with its associated ninth bank contact. In view of the foregoing considerations, it will be understood that the answering time permitted for party line subscribers to answer calls is three times as long as the period provided for individual line subscribers to answer calls, before the intercept signal is given to the operator at the switchboard 1000. Further operation of the timer 570 is the same as that which has been previously described.

It may be well to mention at this time that if the called subscriber at the substation G had answered the call before the timer 570 had advanced its wipers into engagement with the associated third bank contacts, the direct ground potential applied to the TS conductor would have been removed when the subscriber answered the call and caused the restoration of the relays R550 and R560. Restoration of the relay R550, at its contacts 551 and 552, disconnects the relay R530 and the grounded interrupter 536 from the associated third bank contacts of the timer 570. Restoration of the relay R560, at its contacts 564, opens the pulsing circuit from the timing relay R510 to the rotary magnet 572; and, at its contacts 563, it completes a circuit by way of the off-normal contacts 571 (which are closed when the wipers 574 and 575 are stepped off normal) and the winding of the release magnet 573, to battery. The release magnet 573 operates over the above traced circuit and causes the wipers 574 and 575 to be restored to normal whereupon the off-normal contacts 571 are again opened in order to restore the release magnet 573. The subscriber at the substation A and the subscriber at the substation G may now converse with each other. The relay R730 in the trunk circuit 500 is maintained operated during the conversational period so that the busy lamp L802 remains illuminated to indicate to the operator that the trunk circuit 500 is busy, and the relay R610 is maintained operated to prevent the line relay R640 of the trunk circuit 500 from being connected to the conductors of the trunk line 501.

Since the call being described has not been answered by the subscriber at the substation G within the predetermined elapsed time interval, the operator at the switchboard 1000 upon noting the flashing condition of the answer lamp L803 may intercept the unanswered call by inserting the plug P900 of the cord circuit 900 into the jack J800. The operator now operates the talk key K1100, as has been previously described, in order to associate her telephone circuit with the particular selected cord circuit 900.

Insertion of the plug P900 into the jack J800 completes a circuit for the relay R620 in the trunk circuit 500 in series with the relays R950 and R970 in the cord circuit 900 which extends from ground through the windings of the relays R950 and R970, the contacts 1126, the conductor C1108, the contacts 1417 of the switch-through key K1415, the contacts 1410 of the release local key K1408, the conductor C1109, the contacts 1127, the conductor C975, the sleeve elements of the plug P900 and the jack J800, the contacts 801, the conductor C675, the contacts 642 and 666, the winding of the relay R520, the contacts 613, and the resistance 617, to battery. The relays R520 and R970 operate over the above described circuit but, due to the resistance of the relay R620, the switching relay R950 does not operate. At this time the line relay R770 in the trunk circuit 500 is also operated over a previously traced circuit including the left-hand winding of the relay R1020. The effect of the operation of the relay R770 is the same as has been previously described and, consequently, need not be reiterated here.

The relay R620, upon operating over the above traced circuit, at its contacts 624 completes a locking circuit for itself by way of the conductor C675, which circuit is independent of its initial operating circuit including the contacts 642 and 666. At its contacts 625, the relay R620 completes a circuit from ground, by way of the contacts 625, 561 and 533, and the winding of R540 to battery, whereupon the latter relay operates and, at its contacts 541 and 544, completes a loop circuit including the negative (—) and positive (+) conductors of the trunk 580, the contacts 531, and the resistance 548 to maintain the selector 830 and the connector 840 operated, and at the same time, at its contacts 542 and 543, disconnects the negative and positive conductors from the incoming trunk line conductors C502 and C503. The relay R620, at its contacts 621 and 622, also extends the connection from the trunk line 501 to the left-hand windings of the repeating coil 700 by way of the condensers C3 and C4. The relay R540, in addition to providing a holding circuit for the selector 830 and connector 840, also at its contacts 547 disconnects the grounded interrupter 536 from the conductor C676 to terminate the flashing condition of the answer lamp L803. At its contacts 545, relay R540, completes a shunt circuit from the battery through resistance 617 and contacts 613 to prevent operation of relay R520 at the present time.

The operation of the relays in the cord circuit 900 as a result of the insertion of the plug P900 into the jack J800 is the same as has been previously described and results in the completion of a connection from the subscriber at the substation A through the line switch 201, the selector 202, and the trunk circuit 300 in the main exchange 20, to the operator at the switchboard 1000 by way of the trunk circuit 500, the cord circuit 900, and the operator circuit disclosed in Fig. 14. The operator at the switchboard 1000 may now converse with the calling subscriber at the substation A and offer to locate the wanted subscriber at the substation G or make other arrangements for completing the connection to the desired called subscriber.

It should be noted, however, that since the selector 830 and the connector 840 are held operated over the negative and positive conductors of the trunk 580 under the control of the operated relays R530 and R540, the connector 840 continues to signal the subscriber at the substation G. If the wanted subscriber at the substation G should answer the call during the time the operator at the switchboard 1000 is conversing with the calling subscriber at the substation A, the called subscriber will be reconnected to the trunk circuit 500 in order to converse with the calling subscriber at the substation A.

Assuming now that the subscriber at the substation G has answered the call before the operator at the switchboard 1000 has released the connection, including the selector 830 and the connector 840, ground potential will be removed from the TS conductor of the trunk 580 and thereby cause the restoration of the relays R550 and R560 in the trunk circuit 500.

When the relay R550 restores to normal, at its contacts 551 it opens the circuit of the relay R530 which also restores to normal. The relay R560, upon restoring to normal, at its contacts 563 completes a circuit for operating the release magnet 573 over a circuit including the off-normal contacts 571. The release magnet operates and in a well known manner causes the wipers 574 and 575 to restore to their normal positions. At its contacts 561, the relay R560 opens a point in the circuit of the control relay R540 and, at its contacts 562, it places a multiple holding ground potential upon the conductor C677 in order to retain the relay R730 operated. At its contacts 564, the relay R560 also opens a point in the pulsing circuit of the rotary magnet 572 to prevent reoperation of the timer 570 responsive to the restoration of the relay R530. The slow-to-release relay R540 subsequently restores to normal and, at its contacts 542 and 543, reconnects the negative and positive conductors of the trunk 580 to the conductors C502 and C503 respectively, thereby bridging the line 847 of the subscriber at the substation G across the talking conductors of the trunk line 501. The calling subscriber at the substation A and the called subscriber at the substation G may now converse with one another and the operator at the switchboard 1000 may monitor the call and talk to the parties involved in the connection. It should be noted, however, that the release of the connection is under the control of the calling and called subscriber and not under the control of the operator at the switchboard 1000.

In the usual operation of the system, however, the operator, upon hearing the called subscriber at the substation G answer the connection which has been intercepted by the operator, but which has not been extended by the operator to another called line, will withdraw the plug P900 from the jack J800. The withdrawal of the plug P900 from the jack J800 opens the loop circuit including the windings of the line relay R770 and the circuit including the sleeve conductor C675 and the winding of the connect relay R620. The relay R770, upon restoring to normal, at its contacts 773 removes one of the points in the circuit applying holding ground potential to the conductor C677. The relay R620, upon restoring to normal, at its contacts 625 also removes the source of holding ground potential from the conductor C677. At its contacts 621 and 622, the relay R620 disconnects the condensers C3 and C4 from the circuit including the left-hand windings of the repeating coil 700. It may be well to mention at this time, however, that the cutoff relay R610 is retained in its operated position and, at its contacts 611 and 612, it disconnects the left-hand windings of the repeating coil 700 from the talking conductors of the trunk 501; and at its contacts 615 it retains ground potential upon the conductor C677 in order to maintain the relay R730 operated. The relay R730, as has previously been described, maintains the trunk circuit 500 busy to all selectors having access thereto over the trunk line 780 and also retains the illuminated condition of the busy lamp L802 to indicate to the operator at the switchboard 1000 that the trunk circuit 500 is busy.

As a further result of the fact that the called subscriber at the substation G has answered the connection, the connector 840 in a well known manner reverses the direction of current flow over the talking conductors of the trunk 501, whereupon the supervisory relay R410 in the trunk circuit 300 is operated in order to control the relay R310 and reverse the current flow over the talking conductors of the trunk 203 for the same purpose as has been described hereinbefore.

*Monitoring the connection*

In the event the operator at the switchboard 1000 deems it necessary to monitor the above described connection between the calling subscriber at the substation A and the called subscriber at the substation G, she may reinsert the plug P900 of the cord circuit 900 into the jack J800 and operate the talk key K1100, as has been previously described. In order to prevent the transmitter 1401 of the operator headset 1400 from transmitting voice currents over the three-way connection, including the calling and called subscribers and the operator at the switchboard 1000, the operator actuates the monitoring key K1407 to operate the monitoring relay R1440. The relay R1440, upon operating, at its contacts 1441, 1443, 1445 and 1448 disconnects the induction coil 1430 from the circuit including the receiver 1402 of the operator headset 1400 and the conductors C1104 and C1105 and substitutes therefor, at its contacts 1442, 1444, 1446 and 1447, the windings of the monitoring repeating coil 1490.

In response to the insertion of the plug P900 into the jack J800, the relay R620 and the relay R770 in the trunk circuit 500, and the relay R970 in the cord circuit 900 are operated, in the previously described manner. The relay R620, upon operating at its contacts 621 and 622, reconnects the left-hand windings of the repeating coil 700 by way of the condensers C3 and C4 to the talking conductors of the trunk line 501. Voice currents traversing the talking conductors of the trunk 501 are now extended by way of the condensers C3 and C4, the contacts 621 and 622, the windings of the repeating coil 700, the talking conductors of the trunk line 780, and the talking conductors of the cord circuit 900 to the right-hand winding 1491 of the monitoring repeating coil 1490, and are repeated into the left-hand winding 1492 of the monitoring repeating coil 1490 to the receiver 1402 at the operator headset circuit. The operator at the switchboard 1000 may now monitor the call since the voice currents traversing the trunk line 501 are repeated by the monitoring repeating coil 1490 to the receiver at the operator headset.

When the operator has determined that a satisfactory connection has been established between the calling and called subscribers, she may withdraw the plug P900 from the jack J800, whereupon the relays operated responsive to the insertion of the plug P900 into the jack J800 are restored to normal. The operator now restores the monitoring key K1407 to normal in order to reestablish the connection of her transmitter 1401 and receiver 1402 to the conductors C1104 and C1105 of the operator telephone circuit by way of the induction coil 1430. With the relays in the cord circuit 900 and the apparatus in the operator telephone circuit again restored to normal, the operator at the switchboard 1000 may again utilize the cord circuit 900 in answering and extending other connections.

*Release of the connection between the substation A and the substation G*

When the conversation between the subscribers at the substations A and G has been completed, the respective subscribers replace their receivers upon the switchhook of their associated telephone instruments. When the subscriber at the substation A replaces his receiver, the line relay R430 in the trunk circuit 300 restores to normal and in the previously described manner controls the release of the selector 202 and the line switch 201. Furthermore, the relay R430, upon restoring, at its contacts 431 opens the loop circuit including the talking conductors of the trunk 501 and the negative and positive conductors of the trunk 580 extending to the connector 840. Furthermore, when the called subscriber at the substation G restores his receiver, the connector 840 and the selector 830 restore to normal in a well known manner.

As a result of the restoration of the selector 830 and the connector 840, ground potential is removed from the conductor C1 of the trunk 580 in order to restore the cutoff relay R610 in the trunk circuit 500 to normal. Upon restoring, the relay R610, at its contacts 615, removes ground potential from the conductor C677, thereby causing the restoration of the relay R730. Other functions controlled by the restoration of the relay R610 are of no consequence at the present time and merely prepare the trunk circuit 500 for subsequent operation. The relay R730, upon restoring to normal, at its contacts 732 removes a busy ground potential from the conductor C787 to permit the trunk circuit 500 to be seized by the selectors, such as 810, having access thereto. At its contacts 734, the relay R730 also removes ground potential from the conductor C782 in order to extinguish the busy lamp L802. The circuits and apparatus involved in the connection between the subscriber at the substation A and the subscriber at the substation G are now restored to normal and may be utilized for other calls.

*Extension of a connection intercepted by the operator at the switchboard 1000*

It will be recalled that when a connection was extended to the substation G and the subscriber thereat failed to answer the connection in a predetermined elapsed time interval, the timer 570 signaled the operator, and the operator intercepted the call by inserting the plug P900 into the jack J800. It will now be assumed that the operator at the switchboard 1000, upon conversing with the calling subscriber at the substation A, has ascertained the number of the desired subscriber, and it will be assumed further that the desired called subscriber has previously informed the operator that he may be reached at the substation J. It should be understood that if the desired subscriber could be reached by calling the manual substation H, the operator at the switchboard 1000 would merely insert the plug P1270 into the jack J1301, in the previously described manner, to complete the connection between the calling subscriber at the substation A and the called subscriber located at the substation H.

Since it has been assumed that the desired subscriber at the substation G may be reached by extending the connection to the substation J, the operator at the switchboard 1000 will insert the plug P1270 into the jack J1303 (Fig. 13) in order to extend the connection via the automatic switching apparatus in the branch exchange 50 to the subscriber at the substation J. Before inserting the plug P1270 into the jack J1303, however, the operator at the switchboard 1000 should restore the selector 830 and the connector 840 to normal so that the connector 840 will not continue to operate the ringer at the substation G. In order to release the selector 830 and the connector 840, the operator at the switchboard 1000 actuates the release local key K1408. When the key K1408 is actuated, direct ground potential is applied by way of the contacts 1409, the conductor C1109, the contacts 1127, the conductor C975, the sleeve elements of the plug P900 and the jack J800, the contacts 801 of the jack J800, the conductor C675, the contacts 624, the winding of the relay R620, the contacts 613, and the resistance 617, to battery, in order to maintain the relay R620 operated, and further extending by way of the contacts 545 and the winding of the relay R520, to battery, in order to operate the latter relay in parallel with the resistance 617. As a further result of the actuation of the key K1408, at its contacts 1411, resistance battery potential is applied by way of the resistance 1412, the contacts 1411 and 1417, the conductor C1108, the contacts 1126, and the windings of the relays R970 and R950 in series, to ground. The latter circuit, including the resistance 1412, maintains the relay R970 operated but prevents the operation of the relay R950.

In response to the operation of the relay R520 in the trunk circuit 500, at its contacts 522 it completes a holding circuit for maintaining the relay R540 in its operated position, and, at its contacts 521, it removes the ground potential applied to the TS conductor of the trunk 580 from the windings of the relays R550 and R560. The latter relays now restore to normal in order to release the timer 570 and to cause the restoration of the relay R530, in the same manner as has been described hereinbefore. When the relay R530 restores to normal, at its contacts 531 it opens the holding loop circuit including the negative and positive conductors of the trunk 580, whereupon the connector 840 and the selector 830 restore to normal in a well known manner. When the connector 840 and the selector 830 restore to normal, ground potential is removed from the conductor C1 of the trunk 580, thereby causing the restoration of the cutoff relay R610. The relay R610, upon restoring to normal, at its contacts 611 and 612 reconnects the series circuit including the left-hand windings of the repeating coil 700 to the upper and lower windings of the line relay R640 and the differential relay R650 to the talking conductors of the trunk line 501. At its contacts 616, the relay R610 completes a circuit for the slow-to-operate switching relay R710, but this relay will not operate because its circuit is opened at the contacts 646 upon the reenergization of the line relay R640. At its contacts 613 and 614, relay R610 disconnects the resistance battery from the parallel circuit including the winding of relay R520 and connects relay R520 in series with relay R620. Accordingly, when the line relay R640 and the differential relay R650 are reconnected to the trunk line 501, a loop circuit including the right-hand windings of the repeating coil 340 and the left-hand winding of the supervisory relay R410 is completed, causing the operation of the relay R640. The relay R650, however, being of the differential type, does not operate at this time because the circuit including the upper and lower windings of the relay oppose each other.

Upon operating in the above described manner, the line relay R640, at its contacts 646, opens the circuit of the switching relay R710 before the latter relay has had sufficient time to operate and, at its contacts 644, it applies a multiple ground connection to the conductor C677. Attention is directed to the fact that the circuit including the left-hand winding of the supervisory relay R410 does not cause the relay R410 to operate at the present time because the current flow therethrough opposes the current flow through the right-hand winding of this relay.

In view of the foregoing description of the operation, it will be noted that the operator at the switchboard 1000 by actuating the release local key K1408 has caused the selector 830 and the connector 840 to be restored to normal and has reconnected the calling line, including the trunk line 501, to the operator telephone circuit.

Before the operator extends the connection to the subscriber at the substation J, she restores the release local key K1408 to its normal position. When the key K1408 is restored to its normal position the circuits controlled by way of the contacts 1411 and 1409 are transferred to the contacts 1410 and, consequently, a circuit is completed, which may be traced from ground, by way of the windings of the relays R950 and R970, the contacts 1126, the conductor C1108, the contacts 1417 and 1410, the conductor C1109, the contacts 1127, the conductor C975, the sleeve elements of the plug P900 and the jack J800, the contacts 801, the conductor C675, the contacts 624, the winding of the relay R620, the contacts 614, and the winding of the relay R520, to battery. In the above described circuit including the relays R520 and R620 in the trunk circuit 500, and the relays R950 and R970 in the cord circuit 900, the relays R520, R620 and R970 are maintained in their operated positions but the switching relay R950 is maintained in its restored normal position.

The operator at the switchboard 1000 has now released the connection, including the automatic switching apparatus in the branch exchange 50 which was utilized in the attempted connection with the subscriber at the substation G and may now extend the connection to the subscriber at the substation J (where the subscriber of the substation G may be found) by inserting the call plug P1270 of the cord circuit 900 into the jack J1303. When the plug P1270 is inserted into the jack J1303, the relays R1140 and R1150 in the cord circuit 900 are energized over a circuit which may be traced from ground, through the windings of the relays R1150 and R1140, the contacts 1120', the conductor C1110, the contacts 1422, the conductor C1111, the contacts 1121', the sleeve conductor C1265, the sleeve elements of the plug P1270 and the jack J1303, and the resistance 1303' to battery. Due to the fact that the resistance 1303' is included in the series circuit of the relays R1140 and R1150, the relay R1140 operates but the marginal relay R1150 remains in its restored position.

The relay R1140, upon operating over the above traced circuit, at its contacts 1141, disconnects the tip busy test lead C1101 from the tip element of the plug P1270; and at its contacts 1149 it completes a circuit from ground, by way of the contacts 950, 1124', 1149 and 1150', and the winding of the relay R1230, to battery. As a further result of the operation of the relay R1140, at its contacts 1147 it completes a circuit for illuminating the call lamp L1271 which may be traced from ground, by way of the contacts 918, 966, 1164 and 1147, and the call lamp L1271, to battery. As a result of the operation of the relay R1230 a circuit is completed, at its contacts 1233, for energizing the lower polarizing winding of the relay R1220; and at its contacts 1231 and 1232 it connects the tip and ring elements of the call plug P1270 to the tip and ring elements of the answer plug P900. The circuit including the tip elements of the call plug P1270 and the answer plug P900 may be traced from the tip element of the call plug P1270, the contacts 1252, 1241, 1181 and 1231, the condenser 976, and the contacts 902, to the tip element of the plug P900. The circuit including the ring elements of the call plug P1270 and the answer plug P900 may be traced from the ring element of the plug P1270 by way of the contacts 1254, 1243, 1183 and 1232, the condenser 977, and the contacts 904, to the ring element of the plug P900. The relay R1230, upon operating, at its contacts 1234 also completes a circuit for bridging the upper winding of the relay R1220 and the winding of the relay R1210, in series, across the tip and ring elements of the call plug P1270. Accordingly, the circuit including the relays R1210 and R1220 may be traced from the tip element of the call plug P1270, the contacts 1252, 1241, 1181 and 1263, the upper winding of the relay R1220, the winding of the relay R1210, and the contacts 1234, 1183, 1243 and 1254, to the ring element of the call plug P1270.

Referring now to Fig. 13, it will be noted that when the plug P1270 is inserted into the jack J1303, the line circuit 1331 responds in a well known manner to control the distributor 1335 which selects an idle finder-selector link. It will be assumed that the distributor 1335 has selected the finder-selector link 1332 and that the finder has operated in a well known manner to connect with the terminals of the line circuit 1331. Accordingly, the selector portion of the finder-selector link 1332 operates in a well-known manner to prepare the selector to respond to subsequent impulses transmitted thereto and to return battery and ground potentials over the tip and ring elements of the call plug P1270. When battery and ground potentials are applied to the tip and ring elements of the call plug P1270, the previously described circuit including the upper windings of the relays R1220 and R1210 is completed, whereupon these relays operate. When the relay R1220 operates over the above described series circuit, at its contacts 1221, it opens a point in the incomplete circuit for the relay R1160, and, at its contacts 1222, it prepares a point in the incomplete circuit of the relay R1030. The relay R1210, upon operating over the above described series circuit, at its contacts 1211, prepares a point in the circuit for the relay R1160; and, at its contacts 1213, it opens a point in the incomplete circuit of the relay R1260.

A dial tone signal is now returned by the selector portion of the finder-selector link 1332 to the operator at the switchboard 1000 as an indication that the operator may now actuate the calling device associated with the telephone circuit of Fig. 14 in order to control the selector portion of the link 1332 and the subsequent switches in the train, to extend the connection to the called subscriber substation.

When the operator at the switchboard 1000 hears the dial tone signal she may actuate the dial D1485 in accordance with the first digit of the telephone number of the subscriber at the substation J. When the dial D1485 is rotated off normal in the dialing of the first digit, a circuit is completed from ground, by way of the off-normal contacts 1487 and the lower winding of the relay R1460, to battery. The relay R1460 operates over the above traced circuit, and, at its contacts 1461 and 1462, it bridges the capacitance 1466 across the talking conductors C1104 and C1105 of the operator telephone circuit; and, at its contacts 1463 it completes a shunting circuit for the operator's receiver 1402. The above traced circuit, including the contacts 1461, 1462 and 1463, provides a click reducing circuit for both the calling subscriber at the substation A and the operator at the switchboard 1000 during the dialing period by shunting the calling subscriber line with the capacitance 1466 and by shortcircuiting the operator's receiver 1402. At its contacts 1464, the relay R1460 completes a circuit for operating the dial relay R1250 in the cord circuit 900, which may be traced from ground, by way of the off-normal contacts 1487 of the dial D1485, the contacts 1464, the conductor C1112, the contacts 1124', and the winding of the relay R1250, to battery. At its contacts 1465, the relay R1460 completes an operating circuit for the relay R1470, which includes the ground potential applied to the contacts 1465 by way of the off-normal contacts 1487 of the dial D1485.

When the relay R1470 operates over the above traced circuit, at its contacts 1471, it completes an operating circuit for the lower winding of the relay R1480; at its contacts 1472, it completes an energizing circuit for the upper winding of the relay R1460 in order to hold the latter relay in its operated position for a short period of time after the dial D1485 has restored to normal and has opened the off-normal contacts 1487; and, at its contacts 1473, it completes an operating circuit for the lower winding of the relay R1475 from ground at the off-normal contacts 1487. When the relay R1480 operates over the above described circuit, at its contacts 1482 it prepares a circuit for bridging the polar relay R1450 across the tip and ring elements of the plug P1270 after the relay R1250 restores to normal at the end of each series of impulses transmitted by the dial D1485. This circuit may be traced from the tip element of the plug P1270, the contacts 1252, 1241, 1261 and 1122, the conductor C1102, the two windings of the polar relay R1450, the contacts 1482, the conductor C1103, and the contacts 1123, 1243 and 1254, to the ring element of the plug P1270.

It should be noted at this time that the relay R1250 is in its operated position and, at its contacts 1252 and 1254, it disconnects the tip and ring elements of the plug P1270 from the above described circuit including the winding of the polar relay R1450 and substitutes in place thereof, at its contacts 1251 and 1253, a dialing circuit including the conductors C1106 and C1107, the contacts 1427 of the dial release key K1425, the impulsing contacts 1486 of the dial D1485, and the resistance 1478. Since the latter circuit is now bridged across the tip and ring elements of the plug P1270, a loop circuit is extended to the line relay (not shown) in the selector portion of the finder-selector link 1332. At its contacts 1481, the relay R1480 also prepares a circuit for illuminating the dial pilot lamp L1406; and, at its contacts 1483, it prepares a circuit including its upper winding for maintaining the relay R1480 operated in series with the dial relay R1250, after the dial D1485 has restored to normal and has removed ground potential at its off-normal contacts 1487 from the conductor C112, as will be subsequently explained.

When the relay R1475 operates over the previously mentioned circuit, the short-circuit around its upper winding, which makes the relay slightly slow-to-operate, is removed at its contacts 1477 and, at its contacts 1476, it places a shunt circuit around the resistance 1478 in order to improve the above traced impulsing circuit, including the line relay of the selector portion of the finder-selector link 1332.

Since the operator at the switchboard 1000 has actuated the dial D1485 in accordance with the first digit of the telephone number of the subscriber at the substation J, the dial will now automatically return to its normal position and, in so doing, will transmit impulses to the line relay of the above mentioned selector by interrupting the loop circuit including the conductors C1106 and C1107 at the impulsing contacts 1486 a number of times corresponding to the digit dialed. The line relay in the selector portion of the finder-selector link 1332 responds to the series of impulses transmitted under the control of the impulsing contacts 1486 and raises its wipers to a level of its associated bank contacts corresponding to the number of impulses constituting the first digit of the called subscriber telephone number. The selector now operates automatically to rotate the wipers over the contacts of the selected level to select an idle connector, such as the connector 1333.

When the dial D1485 returns to its normal position the impulsing contacts 1486 remain in their closed position and the off-normal contacts 1487 are opened and thereby interrupt the circuits for holding the relays R1460, R1470 and R1475 in their operated positions. It is also to be noted that the ground potential connected by way of the off-normal contacts 1487 to the conductor C1112 is now disconnected therefrom and causes the relay R1250 in the cord circuit 900 to restore to normal. It should also be noted, however, that the circuit including the upper winding of the relay R1480 will now become effective to maintain the relay R1480 energized after the circuit for its lower winding has been opened by the restoration of the relay R1470. The circuit may be traced from ground, by way of the contacts 1483, the upper winding of the relay R1480, the conductor C1112, the contacts 1124', and the winding of the relay R1250, to battery. The relay R1480 remains operated over this circuit but, due to the resistance of the relay R1480, the relay R1250 restores to normal.

When the relay R1475 restores to normal as a result of the restoration of the dial D1485, at its contacts 1476, it removes the shunt from around the resistance 1478. When the relay R1470 restores to normal, at its contacts 1471 it opens the energizing circuit for the lower winding of the relay R1480, but the relay R1480 remains in its operated position as has been mentioned above; and, at its contacts 1472, it opens the holding circuit for the upper winding of the relay R1460. The relay R1460 now restores to normal and, at its contacts 1461 and 1462, removes the capacitance 1466 from across the conductors C1104 and C1105; and at its contacts 1463 it removes the short-circuit from around the receiver 1402.

When the dial relay R1250 in the cord circuit 900 restores to normal as a result of the removal of direct ground potential from the conductor C1112, at its contacts 1251 and 1253 it disconnects the dialing circuit including the conductors C1106 and C1107 from the tip and ring elements of the plug P1270; and, at its contacts 1252 and 1254, it connects the previously traced circuit including the conductor C1104 and C1105 of the operator telephone circuit and the bridging circuit including the conductors C1102 and C1103, and the windings of the polar relay R1450, to the tip and ring elements of the plug P1270. Since the selector portion of the finder-selector link 1332 has selected the connector 1333, the line relay of the connector will return battery and ground potentials to the tip and ring elements of the plug P1270, whereupon a circuit is completed for operating the polar relay R1450.

From the foregoing explanation of the operation of the operator telephone circuit, including the relays R1460, R1470 and R1475, it will be understood that each time the operator at the switchboard 1000 actuates the dial D1485 the described cycle of operation of these relays will be repeated. When the polar relay R1450 operates over the above mentioned circuit, at its contacts 1451, it completes the circuit for illuminating the dial pilot lamp L1406 to indicate to the operator that the connection being set up under the control of the dial at her position has not been completed.

The operator at the switchboard 1000 may now actuate the dial D1485 in accordance with the final two digits of the called subscriber telephone number, thereby controlling the connector 1333 to position its wipers into engagement with its associated bank contacts terminating the line 1334 of the called subscriber at the substation J. It should be understood, however, that the dial relay R1250 operates each time the dial is moved off normal in order to connect the impulsing circuit including the conductors C1106 and C1107 to the tip and ring elements of the plug P1270, and that the relay restores to normal at the termination of the transmission of each series of impulses in order to reconnect, at its contacts 1252 and 1254, the operator headset circuit and the calling subscriber line to the tip and ring elements of the plug P1270.

It should also be noted that the circuit, including the polar relay R1450 and the conductors C1102 and C1103, is connected to the tip and ring elements of the plug P1270 each time the dial relay R1250 restores to normal. Accordingly, the polar relay R1450 will restore to normal to extinguish the dial pilot lamp L1406 during the period of time the dial D1485 is off normal and reoperates to again illuminate the pilot lamp L1406 each time the dial D1485 returns to its normal position.

When the connector responds to select the line 1334 extending to the substation J the usual busy test is made to determine whether or not the called subscriber line is busy. If the called line is busy the connector transmits a busy signal to the operator at the switchboard 1000 and to the calling subscriber at the substation A to indicate that the called subscriber is busy in another connection and should be recalled at a later time. After the calling subscriber has disconnected, the operator at the switchboard 1000 may break down the connection by removing the call plug P1270 from the jack J1303 in order to release the automatic switching apparatus involved in the connection, and removes the plug P900 from the jack J800 in order to break down the connection between the calling subscriber at the substation A and the switchboard 1000.

It will be assumed, however, that when the connector engages the called subscriber line the line is not busy and therefore the connector automatically transmits ringing current to signal the subscriber at the substation J in a well known manner. When the subscriber at the substation J answers the call by removing the receiver from the switchhook of his associated telephone instrument, the connector responds, in a well known manner, to terminate the transmission of ring current and to reverse the battery and ground potentials applied to the tip and ring elements of the plug P1270. When the battery and ground potentials are reversed in the above described manner the relay R1450 in the operator telephone circuit is restored to normal and, at its contacts 1451, opens a circuit including the dial pilot lamp L1406. The dial pilot lamp L1406 is thus extinguished in order to indicate to the operator that the call has been answered by the subscriber at the substation J.

In the cord circuit 900 the relays R1210 and R1220 are bridged across the tip and ring conductors of the plug P1270 over a previously described circuit. When the battery and ground potentials upon the tip and ring elements of the plug P1270 are reversed in response to the called subscriber answering the call, the current flow through the upper winding of the relay R1220 opposes the current flow through its lower winding. The relay R1220 now restores to normal but the relay R1210 remains in its operated position and consequently, at its contacts 1221, the relay R1220 completes a circuit by way of the contacts 1211 for operating the relay R1160. At its contacts 1222, the relay R1220 opens a point in the incomplete circuit for operating the relay R1030. The relay R1160 operates over the above-described circuit and, at its contacts 1161, prepares a point in the incomplete circuit of the relay R1030; and, at its contacts 1164, it opens the previously traced circuit for illuminating the call lamp L1271. As a result thereof the call lamp L1271 is extinguished in order to indicate to the operator at the switchboard 1000 that the call has been answered at the substation J and that she may inquire as to whether or not the wanted subscriber of the substation G may be reached at the substation J.

It will be assumed that the desired subscriber has been reached by extending the connection to the substation J and the operator at the switchboard 1000 should now take the necessary steps to operate the calling subscriber's individual meter. In order to operate the meter individual to the calling subscriber, the operator at the switchboard 1000 momentarily actuates the switch-through key K1415, whereupon the direction of current flow over the trunk line 501 is reversed to cause the actuation of the meter individual to the subscriber at the substation A. When the key K1415 is momentarily actuated, resistance battery potential is applied to the conductor C1108 in order to maintain the relay R970 in the cord circuit 900 operated. The circuit for maintaining the relay R970 operated may be traced from ground, by way of the windings of the relays R950 and R970, the contacts 1126, the conductor C1108, the contacts 1416, and the resistance 1412, to battery. The relay R970 remains in its operated position but, due to the resistance 1412 included in this circuit, the relay R950 remains in its restored position. At the contacts 1417, the key K1415 disconnects the above circuit including the relays R950 and R970 from the previously traced circuit including the conductor C1109 and the windings of the relays R620 and R520 in the trunk circuit 500. The relay R620 now restores to normal and, at its contacts 621 and 622, disconnects the condensers C3 and C4 from the conductors C502 and C503, respectively; at its contacts 623 it prepares a circuit including the sleeve conductor C675 for subsequently operating the reversing relay R660; at its contacts 624 it opens its own previously traced holding circuit; and at its contacts 626 it prepares a holding circuit for the relay R520. It should be noted that the relay R520 does not restore at this time due to the fact that the supplementary circuit, including the contacts 733, the resistance 581 and the contacts 546, makes the relay R520 somewhat slow to release.

When the switch-through key K1415 is again restored to its normal position, at its contacts 1416 it disconnects the resistance battery potential from the conductor C1108 and reconnects, at its contacts 1417, the conductors C1108 and C1109 in order to connect the relays R950 and R970 of the cord circuit in series with the upper winding of the reversing relay R660. Consequently this circuit may now be traced from ground, by way of the windings of the relays R950 and R970, the contacts 1126, the conductor C1108, the contacts 1417 and 1410, the conductor C1109, the contacts 1127, the conductor C975, the sleeve elements of the plug P900 and jack J800, the contacts 801, the conductor C675, the contacts 641 and 623, and the upper winding of the reversing relay R660 to battery. The relay R660 operates, the relay R970 remains in its operated position, and the relay R950 remains in its restored position when the above described circuit is completed. Upon operating, the relay R660 completes a circuit from ground, by way of the contacts 662' and 626, the resistance 601, the contacts 545, and the winding of the relay R520, to battery, before the relay R520 has had sufficient time to restore to its normal position. The relay R520, at its contacts 522, retains the controlling relay R540 in its operated position, thereby to prevent the trunk line 580 and the selector 830 from being reconnected to the trunk line 501 during the period of time that the switch-through key K1415 is momentarily operated. At its contacts 661 to 664, inclusive, the relay R660, upon operating, reverses the direction of current flow over the trunk line 501 and thereby causes the operation of the calling subscriber's meter in the same manner as has been previously explained.

Since the connection has been completed between the calling subscriber at the substation A and the desired called subscriber who has been reached by extending the connection to the substation J, and, furthermore, since the calling subscriber's meter has been operated to make a charge for the connection, the operator at the switchboard 1000 may now restore the key K1100 in order to disconnect her telephone circuit from the cord circuit 900. The operations of the various relays in the cord circuit 900 and the telephone circuit of Fig. 14, as a result of the restoration of the talk key K1100, have been previously described and need not be repeated here. The subscriber at the substation A and the wanted subscriber found at the substation J may now converse with one another by way of the cord circuit 900 and the automatic switching apparatus in the branch exchange 50. Attention is now directed to the fact that the automatic switching apparatus in the main exchange 20 is held over a holding bridge which includes the left-hand winding of the relay R1020 and the tip and ring elements of the answering plug P900, and that the automatic switching apparatus in the branch exchange 50 is held over a holding bridge which includes the relays R1210 and R1220 and the tip and ring elements of the call plug P1270. Consequently no transmission battery is supplied to the connection from the cord circuit 900.

If the subscriber at the substation J desires to recall the operator at the switchboard 1000, he may momentarily actuate the switchhook of the telephone instrument at the substation a number of times. Each time the switchhook is depressed the current flow through the upper winding of the polar relay R1220 in the cord circuit 900 is reversed and the relay operates. At its contacts 1222, the first time the relay R1220 operates, it completes a circuit from ground, by way of the contacts 1222, 1161 and 973, and the winding of the recall relay R1030 to battery. whereupon the recall relay R1030 operates and completes a holding circuit for itself by way of the contacts 1031. As a further result of the operation of the relay R1030, at its contacts 1032 it connects the intermittently grounded conductor C1044 by way of the contacts 1163 and 1147 and the call lamp L1271 to battery, in order to flash the lamp L1271. Each time the relay R1220 restores to normal, at its contacts 1221 it recompletes the circuit of the slow-to-release relay R1160. The latter relay is maintained operated during the intermittent operation of the relay R1220 in order to maintain the flashing condition of the lamp L1271. Upon noting the flashing condition of the call lamp L1271 the operator at the switchboard 1000 actuates the talk key K1100 of the cord circuit 900 in order to reconnect her telephone circuit to the cord circuit 900 and communicate with the subscriber at the substation J. As a result of the actuation of the key K1100 the relay R1030 in the cord circuit 900 is restored to normal in the previously described manner to terminate the flashing condition of the call lamp L1271.

In the above described recall operation the polar relay R1220 in the cord circuit was momentarily reoperated and restored and caused a flashing condition of the call lamp L1271. If the subscriber at the substation J had replaced his receiver on the switchhook of his telephone instrument, the relay R1220 would merely have been operated and the relay R1210 would have remained in its operated position. At its contacts 1222, the relay R1220 completes the above traced circuit for operating the recall relay R1030, before the relay R1160 restores to normal as a result of the opening of its circuit at contacts 1221. The operation of relay R1030 has no effect at this time. The relay R1160 subsequently restores to normal and at its contacts 1163 interrupts the incomplete flashing circuit for the lamp L1271 and, at its contacts 1164, completes a circuit from ground, by way of the contacts 918, 966, 1164 and 1147, and the call lamp L1271 to battery, in order to provide a steady illuminated condition of the lamp L1271. The operator now breaks down the connection in the same manner as has been previously described.

If the calling subscriber at the substation A desires to recall the operator at the switchboard 1000, he may do so by depressing the switchhook of his telephone instrument a number of times. Each time the switchhook is depressed the line relay R430 in the trunk circuit 300 restores to normal and, at its contacts 431, interrupts the loop circuit including the line relay R640 in the trunk circuit 500. Each time the line relay R640 momentarily restores to normal, at its contacts 645, it completes a circuit by way of the contacts 669 for operating the reversing relay R740. Each time the reversing relay R740 operates, at its contacts 741 to 744. inclusive, it reverses the current flow over the trunk line 780, thereby reversing the current flow in the left-hand winding of the relay R1020 in the cord circuit 900, which relay is bridged across the talking conductors of the cord circuit terminating in the tip and ring elements of the plug P900. Each time the current flow in the left-hand winding of the relay R1020 is reversed, the relay restores to normal and, at its contacts 1022, completes a circuit from ground. by way of the contacts 1148. 974. 1022, 945. 959 and 975. and the answer lamp L919. to battery. Consequently the answer lamp L919 will be intermittently illuminated, under control of the contacts 1022, to indicate to the operator at the switchboard 1000 that the calling subscriber at the substation A desires to communicate with her. The operator at the switchboard 1000 may now actuate the key K1100 in order to reconnect her telephone circuit to the cord circuit 900 and communicate with the subscriber at the substation A.

If the subscriber at the substation A had replaced his receiver upon the switchhook of his associated telephone instrument in order to terminate the connection. the line relay R430 in the trunk circuit 300 would have restored to normal but would not have been reoperated. Consequently, the circuit for the line relay R640 in the trunk circuit 500 would also have restored to normal and caused the operation of the relay R740. The relay R740 reverses the current flow over the trunk line 780 and causes the restoration of the relay R1020 in the cord circuit 900. Since the relay R1020 has restored to normal but has not been reoperated, the above traced circuit for illuminating the answer lamp L919 is closed to cause a steady illuminated condition of the answer lamp.

When the operator at the switchboard 1000 receives a steady illuminated condition on the answer lamp L919 and the call lamp L1271, she is informed of the fact that both the calling and called subscribers included in the connection have disconnected therefrom and that she may now break down the connection in the previously described manner by removing the plug P900 from the jack J800 and the plug P1270 from the jack J1303. When the plug P900 is removed from the jack J800, the trunk circuit 500, the trunk circuit 300, the selector 202, and the line switch 201 are restored to normal in the previously described manner. When the plug P1270 is removed from the jack J1303 the automatic switching apparatus in the branch exchange 50, including the line circuit 1331, the finder-selector link 1332, and the connector 1333, is restored to normal in a well known manner. The relays and equipment included in the cord circuit 900 and the operator telephone circuit of Fig. 14 are also restored to normal in the previously described manner and the operator may utilize the cord circuit 900 in answering and completing other calls.

Error in dialing

It will be recalled that in the event the operator at the switchboard 1000 is required to operate the dial D1485 in her telephone circuit, in order to set up a connection to a subscriber by way of the automatic switching apparatus in the branch exchange 50, various relays in the telephone circuit are operated and released during the dialing period. In the event the operator should make an error in the process of setting up a connection, for example, by dialing an incorrect digit, she may operate the dial release key K1425 in order to release a partially set up connection. More particularly, when the operator discovers an error in the number being dialed, she may release the switches involved in the connection by operating the key K1425. Operation of the key K1425, at its contacts 1426, completes a circuit for retaining the relays R1460, R1470, R1475 and R1480 in their operated positions in the same manner as has been previously described, during the period of time that the off-normal contacts 1487 of the dial D1485 are closed. At its contacts 1427, the key K1425 opens the loop circuit including the conductors C1106 and C1107 and the impulsing contacts 1486 of the dial D1485 in order to release any switches involved in the partially set up connection. Since the loop circuit is opened by actuation of the key K1425 the switches involved in the connection will restore to normal in a well known manner, whereupon the operator at the switchboard 1000 may restore the key K1425 and again actuate the dial D1485 to redial the telephone number of the wanted subscriber. The switches involved in the connection will respond in the previously described manner to extend the connection to the desired called substation.

CALL FROM THE MANUAL SUBSTATION H IN THE BRANCH EXCHANGE 50 TO THE SUBSCRIBER AT THE SUBSTATION B IN THE MAIN EXCHANGE 20

It will now be assumed that the manual subscriber at the substation H desires to extend a connection to the automatic subscriber at the substation B in the main exchange 20. When the manual subscriber at the substation H initiates a call by removing the receiver from the switchhook of his telephone instrument, a loop circuit is completed for operating the line relay R1325 associated with the line 1327 of the substation H. The circuit for the relay R1325 may be traced from ground at the contacts 1321, by way of the conductors of the line 1327 and the closed loop at the substation H, the contacts 1322, and the winding of the relay R1325, to battery. The relay R1325, upon operating, at its contacts 1326, completes a circuit for illuminating the call lamp L1302 in order to indicate to the operator at the switchboard 1000 that a call has been received and should be answered.

In order to answer the call the operator inserts the answer plug P900 into the jack J1301, whereupon the cutoff relay R1320 of the calling line and the relays R950 and R970 of the cord circuit 900 are operated over a circuit which may be traced from ground, by way of the windings of the relays R950 and R970, the contacts 1128, the conductor C975, the sleeve elements of the plug P900 and the jack J1301, and the winding of the relay R1320, to battery. The cutoff relay R1320, upon operating over the above traced circuit, at its contacts 1321 and 1322, disconnects the battery and ground potentials from the conductors of the line 1327. The battery and ground potentials are removed from the calling line in order to dry the line 1327 and to restore the line relay R1325 to normal. Upon restoring, the relay R1325, at its contacts 1326, extinguishes the lamp L1302. When the relay R970 in the cord circuit operates over the above traced circuit, at its contacts 971, it connects the left-hand winding of the relay R1020 across the talking conductors of the cord; and at its contacts 972, it completes a circuit for energizing the right-hand winding of the relay R1020. In view of the foregoing it will be noted that only the right-hand polarizing winding of the relay R1020 is energized and, therefore, the relay does not operate at this time. At its contacts 975, the relay R970 prepares a circuit for the answer lamp L919.

When the switching relay R950 in the cord circuit operates, at its contacts 958, it completes a circuit including the contacts 975, 958 and 1064, and ground at the contacts 1166 for illuminating the answer lamp L919. At its contacts 951 and 954, the relay R950 completes a circuit for operating the relay R1060. This circuit may be traced from ground, by way of the upper winding of the relay R1060, the contacts 1143, 951 and 902, the tip elements of the plug P900 and the jack J1301, the loop circuit including the conductors of the line 1327 and the substation H, the ring elements of the jack J1301 and the plug P900, the contacts 904, 954 and 1145, and the lower winding of the relay R1060, to battery. At its contacts 957, the relay R950 also disconnects the left-hand winding of the relay R1020 from the talking conductors of the cord circuit 900.

The relay R1060 operates over the above circuit and, at its contacts 1061, it completes a circuit for operating the relay R1050; and at its contacts 1064, it opens the circuit for the answer lamp L919, thereby extinguishing the lamp. When the relay R1050 operates it prepares circuits which will be described subsequently.

The operator at the switchboard 1000 may now actuate the talk key K1100 to associate the operator telephone circuit of Fig. 14 with the cord circuit 900 in the same manner as has been previously described, in order to communicate with the calling subscriber and ascertain the telephone number of the desired called subscriber at the substation B. The transmission battery for the communication connection between the calling subscriber at the substation H and the operator is supplied through the windings of the relay R1060.

If the calling subscriber at the substation H had desired to communicate with either a manual subscriber or an automatic subscriber located in the branch exchange 50, the operator at the switchboard 1000 could extend the connection by way of the plug P1270 and the associated jacks in the same manner has been previously described.

In the present connection the subscriber at the substation H desires to communicate with the subscriber at the substation B in the main exchange. In order to extend the connection to the subscriber at the substation B in the main exchange the operator at the switchboard 1000 inserts the plug P1270 into an idle jack, such as the jack J800, terminating a trunk circuit, similar to the trunk circuit 500, extending to the main exchange 20. The idle or busy condition of the trunks, such as 500, is indicated by the busy lamps L802 individual to each of the trunks. It will be assumed that the plug P1270 is inserted into the jack J800 terminating an idle trunk circuit 500, whereupon the contacts 801 of the associated jack are closed in order to complete a circuit for energizing the relays R520 and R620 in the trunk circuit 500 and the relays R1140 and R1150 in the cord circuit 900. This circuit may be traced from ground, by way of the windings of the relays R1150 and R1140, the contacts 1120′, the conductor C1110, the contacts 1422, the conductor C1111, the contacts 1121′, the conductor C1265, the sleeve elements of the plug P1270 and the jack J800, the contacts 801, the conductor C675, the contacts 642 and 666, the winding of the relay R620, the contacts 614, and the winding of the relay R520, to battery. When the above traced circuit is completed the relay R1140 in the cord circuit 900 and the relays R520 and R620 in the trunk circuit 500 are operated but, due to the resistance of the relays included in the above traced circuit, the relay R1150 does not operate at this time.

When the relay R1140 operates over the above traced circuit, at its contacts 1143 and 1145, it disconnects the windings of the relay R1060 from the talking conductors of the cord circuit, and at its contacts 1142 and 1144, it extends the tip and ring conductors of the answer plug P900 through to the tip and ring conductors of the call plug P1270, whereupon a circuit is completed for the line relay R770 in the trunk circuit 500. At its contacts 1147, the relay R1140 completes a previously traced circuit for illuminating the call lamp L1271. The relay R1060, upon restoring to normal, at its contacts 1061, opens the holding circuit of the relay R1050 which also restores to normal; and at its contacts 1064, it completes a circuit for again illuminating the answer lamp L919.

As a further result of the insertion of the plug P1270 into the jack J800, a loop circuit is now completed for energizing the line relay R770 in the trunk circuit 500 and the supervisory relay R1170 in the cord circuit 900 in series with the calling subscriber line. This circuit may be traced from ground, by way of the upper winding of the line relay R770, the contacts 761 and 741, the winding 704 of the repeating coil 700, the conductor C784, the tip elements of the jack J800 and the plug P1270, the contacts 1252, 1241 and 1181, the winding of the supervisory relay R1170, the contacts 1151, 1142, 951 and 902, the tip elements of the plug P900 and the jack J1301, the conductors of the calling line 1327 including the closed loop at the substation H, the ring elements of the jack J1301 and the plug P900, the contacts 904, 954, 1144, 1154, 1183, 1243 and 1254, the ring elements of the plug P1270 and the jack J800, the conductor C783, the winding 703 of the repeating coil 700, the contacts 742 and 762, and the lower winding of the line relay R770, to battery. The relays R770 and R1170 are operated over the above traced circuit, the latter relay upon operating, at its contacts 1171, completing an operating circuit for the relay R1160. At its contacts 1166, the relay R1160 opens a circuit in order to extinguish the answer lamp L919 and, at its contacts 1164, it opens a circuit in order to extinguish the call lamp L1271.

The cord circuit 900 and the operator circuit of Fig. 14 are now conditioned so that the operator may dial the telephone number of the calling subscriber at the substation B. However, before continuing with the description of the operation of the cord circuit, a description will now be given of the operation of the trunk circuit 500. It will be recalled that when the plug P1270 was inserted into the jack J800 the line relay R770 in the trunk circuit 500 was energized over the talking conductors including the tip and ring elements of the plug P1270, and that the relays R520 and R620 in the trunk circuit 500 were operated over a circuit including the sleeve element of the plug P1270.

When the line relay R770 operates over the above mentioned circuit, at its contacts 773, it completes an operating circuit for the hold relay R730. The relay R730, upon operating, at its contacts 732, places a busy potential upon the conductor C787 in order to busy the trunk circuit 500 to selectors having access thereto; at its contacts 734, it completes a circuit for illuminating the busy lamp L802 to indicate to the operator at the switchboard 1000 that the trunk circuit 500 is busy; and at its contacts 733 it completes an operating circuit for the switching relay R710 and an energizing circuit for the left-hand winding of relay R670.

When the connect relay R620 operates over the circuit including the sleeve element of the jack J800, at its contacts 624, it completes a holding circuit for itself which is independent of the contacts 642 and 666; at its contacts 625, it completes an additional holding circuit for the relay R730; and at its contacts 626, it opens a point in an incomplete multiple circuit for the relay R520. The actuation of the contacts 621 to 623, inclusive, is of no consequence at the present time.

When the relay R520 operates over the circuit including the sleeve element of the jack J800, at its contacts 521, it opens a point in the circuit for operating the series connected relays R550 and R560 and, at its contacts 522, it completes a circuit for operating the relay R540. Upon operating, the relay R540, at its contacts 542 and 543, disconnects the negative and positive conductors of the trunk 580 from the conductors of the trunk line 501 in order to prevent the operation of the selector 830 at the present time.

When the switching relay R710 operates, at its contacts 712 and 714, it disconnects the line relay R640 and the series connected differential relay R650 from across the talking conductors of the trunk 501; and at its contacts 713 and 715, it connects the right-hand winding of the answer relay R670 across the talking conductors of the trunk 501. At its contacts 716, the relay R710 also prepares a point in the circuit for controlling the relays R750 and R760; and at its contacts 717, it prepares a point in the circuit for holding the relay R520 in its operated position in the event that the connect relay R620 is restored to normal.

When the right-hand winding of the answer relay R670 is connected across the talking conductors of the trunk line 501, a loop circuit is completed for seizing the incoming selector 210 in the main exchange 20. This loop circuit includes battery and ground potentials connected through the line relay (not shown) of the selector 210, and the talking conductors of the trunk line 480; one of the talking conductors being connected by way of the contacts 471 and 451, the conductor C502, the contacts 611, the left-hand winding 701 of the repeating coil 700, the contacts 713 and 771, and the right-hand winding of the answer relay R670; and the other talking conductor being connected by way of the contacts 453, the conductor C503, the contacts 612, the left-hand winding 702 of the repeating coil 700, the contacts 715, and the right-hand winding of the answer relay R670. Attention is directed to the fact that although the left-hand winding of the relay R670 is energized over a circuit including the contacts 733 of the hold relay R730, the current flow through the right-hand winding is in opposition to the current flow through the left-hand winding, therefore, the relay does not operate at the present time.

When the selector 210 is seized in the above described manner, dial tone is transmitted to the operator at the switchboard 1000 to indicate that the circuits are now in condition to receive impulses indicative of the digits of the called subscriber telephone number, and ground potential is returned over the control conductor of the trunk 480 to the conductors C219 and C222 in order to mark the trunk circuit 300 busy to selectors having access thereto.

The operator at the switchboard 1000 may now manipulate the dial D1485 at her position in accordance with the digits of the called subscriber number, whereupon the operator telephone circuit and the cord circuit 900 operate in the manner previously described to transmit impulses over the tip and ring elements of the plug P1270. Since the plug P1270 is now inserted into the jack J800, the line relay R770 in the trunk circuit 500 responds to the impulses transmitted under the control of the dial D1485, and, at its contacts 771, it repeats the impulses to the selector 210 and subsequent switches in the switch train by interrupting the loop circuit including the right-hand winding of the relay R670.

The first time the line relay R770 restores to normal, at its contacts 772 it completes a circuit for operating the relay R760. This circuit may be traced from ground, by way of the contacts 772, 731, 716 and 752, and the winding of the relay R760, to battery. At its contacts 773, the relay R770 also interrupts the circuit of the relay R730, but due to the slow-to-release characteristics of the latter relay it does not restore during the impulsing period. The relay R760 operates over the above-described circuit and, at its contacts 761 and 762, disconnects the line relay R770 from the talking conductors C783 and C784 of the trunk circuit 500 in order to prevent transient current flow over the impulsing circuit from interfering with its operation. At its contacts 763, the relay R760 completes an operating circuit for the relay R750 and, at its contacts 764, it completes an operating circuit for the relay R720.

When the relay R750 operates, at its contacts 752, it opens the initial operating circuit for the relay R760 and, at its contacts 751, it completes a holding circuit for itself by way of the resistor 746. The latter circuit, however, is not effective until the relay R760 restores to normal and opens, at its contacts 763, the initial operating circuit for the relay R750. As a further result of the operation of the relay R750, at its contacts 753, it completes a holding circuit for the relay R730 from ground at contacts 764.

When the relay R720 operates in the above described manner, at its contacts 721, it shunts the left-hand winding 702 of the repeating coil 700 and the right-hand winding of the answer relay R670 in order to increase the efficiency of the impulsing circuit to the main exchange 20. At its contacts 722, the relay R720 completes a circuit from ground, by way of the contacts 772, 731, 716 and 722, the resistor 735, and the lower winding of the line relay R770, to battery, in order to pre-energize the relay slightly, thereby making the relay faster to operate when the windings of the relay are reconnected to the talking conductors of the trunk 780 upon the restoration of the relay R760. The relay R760 now restores to normal and, at its contacts 761 and 762, reconnects the windings of the line relay R770 to the talking conductors of the trunk 780; at its contacts 763, it opens the initial operating circuit of the relay R750 but this relay remains operated over a circuit including the resistor 746 until the line relay R770 again operates and opens its contacts 772; and at its contacts 764, it opens the initial operating circuit of the relay R720.

When the impulsing contacts 1486 of the dial D1485 are again closed to terminate the first pulse transmitted therefrom, the line relay R770 again operates and, at its contacts 772, opens the holding circuit for the relay R750 which also restores to normal; at its contacts 773, it applies ground potential to the conductor C677 in order to maintain the relay R730 in its operated position; and at its contacts 771, it closes the loop circuit including the talking conductors of the trunk line 501 in order to terminate the first pulse transmitted to the selector 210. The relay R750 upon restoring to normal, at its contacts 751, opens the holding circuit for itself including the resistor 746; at its contacts 752, it again prepares the circuit for operating the relay R760; and at its contacts 753 it opens the circuit of the relay R720, but due to the slow-to-release characteristics of the relay R720 it does not restore to normal until the last impulse of the series of impulses constituting the dialed digit has been terminated.

In view of the foregoing description of the operation of the relays in the trunk circuit 500, it will be seen that the relay R770 follows the pulses transmitted by the dial, that the relay R760 operates when the relay R770 restores and it restores to normal when the relay R750 is operated. The relay R750, in turn, operates each time the relay R760 is operated and it restores to normal when the relay R770 is operated.

After the last impulse of the dialed digit has been transmitted, the relay R770 remains in its operated position, thereby opening, at its contacts 772, the circuit of the relay R750. At its contacts 771, relay R770, maintains closed the loop circuit including the conductors of the trunk 501; and, at its contacts 773, it maintains the relays R730 and R720 in their operated positions. The relay R750 now restores to normal and, at its contacts 753, opens the circuit of the relay R720 which also restores to normal. Restoration of the relay R720, at its contacts 721, removes the shunt circuit from around the left-hand winding 702 of the repeating coil 700 and the right-hand winding of the answer relay R670, thereby connecting the relay R670 across the talking conductors of the trunk 500. At its contacts 722, the relay R720 opens the preenergizing circuit for the lower winding of the line relay R770.

The above described cycle of operations of the relays in the trunk circuit 500 is repeated each time the operator at the switchboard 1000 actuates the dial D1485 to transmit a digit of the telephone number of the wanted subscriber. The impulses constituting the digits of the wanted subscriber number are repeated by the trunk circuit 500 in order to control the selector 210 and the subsequent switches in the train to extend the connection to the wanted subscriber at the substation B. Accordingly, the selector 210 responds to the first digit dialed to select an idle connector, such as the connector 211, and the connector in turn responds to the last two digits of the wanted subscriber telephone number to select the line extending to the subscriber at the substation B.

If the called subscriber line is busy the connector functions in a well known manner to transmit busy tone to the operator at the switchboard 1000, and to the subscriber at substation H to inform the operator and the subscriber at the substation H that the called subscriber at the substation B is busy. It will be assumed, however, that when the wipers of the connector 211 engage the line of the subscriber at the substation B, the line is idle and the connector transmits ringing current over the selected line. When the called subscriber at the substation B responds by removing the receiver from the switchhook of his telephone instrument, the connector reverses the direction of current flow over the trunk line 480, thereby causing the answer relay R670 in the trunk circuit 500 to operate. Upon operating, the relay R670, at its contacts 671, completes a circuit for operating the reversing relay R740. When the relay R740 operates, at its contacts 741 to 744, inclusive, it reverses the direction of current flow over the trunk line 780.

Referring to the cord circuit 900, it will be noted that if the operator has not restored the talk key K1100 to normal, the polar relay R1450 of the telephone circuit is bridged across the tip and ring conductors of the call plug P1270 and will respond to the reversal of the current flow over the trunk line 780 to open the circuit of the dial pilot lamp L1406 and indicate to the operator that the call has been answered. If the operator at the switchboard 1000 has prematurely restored the key K1100 to normal the reversal of current flow over the trunk line 780 will have no effect upon the cord circuit 900. When this condition exists the operator will not be informed as to whether or not the called subscriber has answered the connection and must wait for disconnect supervision which is transmitted as a result of the calling subscriber releasing the connection.

The connection between the calling subscriber at the substation H and the called subscriber at the substation B is now completed and the subscribers may converse with one another. Transmission battery for the calling subscriber at the substation H is supplied by way of the windings of the line relay R770 in the trunk circuit 500, and the transmission battery for the called subscriber and the trunk circuit 500 is supplied from the connector 211 in the main exchange 20.

*Release of the connection*

When the conversation between the calling subscriber at the substation H and the called subscriber at the substation B has been terminated, the subscribers replace their receivers on the switchhooks of their respective telephone instruments in order to release the connection. Replacement of the receiver upon the switchhook of the telephone instrument by the called subscriber at substation B causes the connector 211 to again reverse the direction of current flow over the trunk line 501 back to normal, whereupon the answer relay R670 in the trunk circuit 500 restores to normal and, at its contacts 671, it opens the circuit of the reversing relay R740. The relay R740, upon restoring to normal, at its contacts 741 to 744, inclusive, again reverses the current flow over the trunk line 780 but this reversal has no effect upon the cord circuit 900 in a connection of the type being described.

When the calling subscriber at the substation H replaces his receiver upon the switchhook of his associated telephone instrument, the loop circuit, including the supervisory relay R1170 and the line relay R770, is opened whereupon both relays restore to normal. When the relay R1170 restores to normal it opens the circuit of the relay R1160, which relay also restores to normal and, at its contacts 1164, completes the previously traced circuit for illuminating the call lamp L1271. At its contacts 1166, the relay R1160 also completes a previously traced circuit for illuminating the answering lamp L919. When the line relay R770 restores to normal, at its contacts 771, it opens the loop circuit including the right-hand winding of the relay R670 and the talking conductors of the trunk line 501, whereupon the automatic switching apparatus in the main exchange 20 is restored to normal in a well known manner. At its contacts 772, the relay R770 also completes a previously described cycle of operation causing the sequential operation of the relays R760, R750 and R720. Since these relays perform no essential operations at this time the circuits controlled by the contacts of the various relays will not be described.

When the operator at the switchboard 1000 receives the disconnect signal in the form of the illuminated lamps L1271 and L919, she may release the connection by removing the plugs P900 and P1270 from the jacks J1301 and J800, respectively. The removal of the plug P1270 from the jack J800 opens the previously traced circuit including the relays R1140 and R1150 in the cord circuit 900, and the relays R520 and R620 in the trunk circuit 500. The relay R620 restores to normal and, at its contacts 626, completes a holding circuit, including the contacts 717, for the relay R520 in order to maintain the relays R520 and R540 in their operated positions until the trunk circuit 500 has completely restored to normal. At its contacts 625, the relay R620 removes the final holding ground potential from the conductor C677 whereupon the relay R730 restores to normal. Upon restoring to normal the relay R730, at its contacts 731, opens a point in the previously traced circuit for the relay R750; at its contacts 732, it removes the busy ground potential from the conductor C787; at its contacts 733, it opens the energizing circuit for the left-hand winding of the relay R670 and the circuit of the switching relay R710; and at its contacts 734, it removes ground potential from the conductor C782 in order to extinguish the busy lamp L802. The relay R710, at its contacts 717, opens a point in the holding circuit of the relay R520. The relay R520 now restores to normal and, at its contacts 522, opens the circuit of the relay R540 which also restores to normal. Restoration of the latter relay again connects the trunk line 580 to the trunk circuit 500 and restores the trunk circuit to its normal condition.

In the cord circuit 900 the removal of the plugs P900 and P1270 from their respective jacks causes the operated relays in the cord circuit 900 to be restored to normal in the same manner as has been previously described.

In view of the foregoing description it will be understood that if the called subscriber at the substation B disconnects first, the reversal in the direction of current flow transmitted by the connector will have no effect upon the cord circuit 900. However, when the calling subscriber at the substation H disconnects, the cord circuit functions to give the operator at the switchboard 1000 the necessary disconnect supervision.

Recall supervision

In the event that the calling subscriber at the substation H should desire to recall the operator before the plugs of the cord circuit are removed from their respective jacks, the switchhook of the telephone instrument should be momentarily actuated several times in order to open and close the loop circuit including the supervisory relay R1170. Each time the supervisory relay R1170 restores to normal, it opens the circuit of the relay R1160. Although the relay R1160 is somewhat slow to release, if the spacing between the intermittent actuation of the switchhook is of sufficient spaced intervals, the relay R1160 will restore to normal and, at its contacts 1166, completes a circuit for illuminating the answer lamp L919. At its contacts 1164, the relay R1160 also completes a circuit for illuminating the call lamp L1271. Each time the above mentioned circuit, including the supervisory relay R1170, is closed during the intermittent actuation of the switchhook, the relay R1160 is reoperated to extinguish the answer lamp L919 and the call lamp L1271. The flashing condition of the lamps L919 and L1271 indicates to the operator at the switchboard 1000 that the calling subscriber at the substation H desires the attention of the operator.

CALL FROM THE AUTOMATIC SUBSTATION J TO THE MANUAL SUBSTATION K IN THE BRANCH EXCHANGE 50

The branch exchange 50 of the illustrated telephone system includes both manual and automatic subscriber lines. In conventional manual systems the calls to or from the manual subscriber lines are completed by the manual operator, and in conventional automatic systems the calls to and from the automatic subscriber lines are completed by the calling subscriber without the assistance of an operator. When these two systems are incorporated into a single system, arrangements must be provided to permit the automatic and the manual subscribers to call each other. Calls of the latter type are usually completed with the aid of a manual operator. In other words, the automatic subscribers are instructed to call the operator when they desire to extend a connection to a manual subscriber and the operator, in turn, completes the connection by plugging into the jack terminating the called manual line. However, when a manual subscriber desires to call an automatic subscriber, the manual operator receives the call and then extends it by plugging into a jack terminating the automatic switch train and then dialing the digits of the called subscriber telephone number.

In the present system facilities are provided to enable the automatic subscriber to control the automatic switch train and extend calls directly to certain manual lines without the intervention of a manual operator, while all calls originating at such manual subscriber substations are completed to either other manual lines or to other automatic lines with the assistance of the manual operator.

Referring now to Fig. 13, it will be noted that the substation K is of the type referred to above, which may be called directly by the automatic subscribers and which may extend calls with the assistance of the operator at the switchboard 1000. More specifically, when the automatic subscriber at the substation J desires to extend a connection to the manual subscriber at the substation K, he removes his receiver and causes the line circuit 1362, the distributor 1396, and the finder portion of the finder-selector link 1361 to function in the previously described manner to connect the substation J to the selector portion of the link. The subscriber at the substation J may now dial the digits of the telephone number of the manual subscriber at the substation K, whereupon the selector portion of the finder-selector link 1361 and the connector 1360 operate in a well known manner to test the idle or busy condition of the called line 1365 of substation K. If the called line is busy when the wipers of the connector 1360 are in engagement with the terminal of the called line, ground potential will be encountered upon the control conductor by way of the contacts 1353 or by way of the contacts 1308 or 1311 of the jacks J1306 and J1309. In either event the connector will function to transmit a busy tone signal to the calling subscriber at the substation J to indicate that the wanted subscriber at the substation K is busy. If the line is idle when the wipers of the connector engage the called line terminals, the connector will extend ground by way of the contacts 1352, 1307 and 1310, and the resistance 1310' to the sleeve elements of the jacks J1306 and J1309 in order to mark the line busy to the operators at the switchboard 1000. The ground potential applied to the above described circuit is also extended by way of the winding of the cutoff relay R1340 to battery, whereupon the latter relay operates and, at its contacts 1341 and 1342, disconnects the line relay R1350 from the talking conductors of the subscriber line 1365. The connector 1360 also operates in a well known manner to transmit ringing current to signal the subscriber at the substation K. When the subscriber at the substation K answers the call by removing his receiver from his associated telephone instrument, the connector again functions in a well known manner to terminate the ringing signal and to connect the calling subscriber at the substation J with the called subscriber at the substation K.

When the conversation between the calling and called subscriber has been terminated and their receivers have been replaced upon the switchhooks of their respective telephone instruments, the automatic switching apparatus involved in the connection restores to normal in a well known manner, whereupon the connector 1360 removes all ground potential from the control conductor to permit the cutoff relay R1340 to restore to normal and to remove the busy marking potential from the sleeve elements of the jacks J1306 and J1309.

CALL FROM THE MANUAL SUBSCRIBER AT THE SUBSTATION K IN THE BRANCH EXCHANGE 50 TO THE AUTOMATIC SUBSCRIBER AT THE SUBSTATION B IN THE MAIN EXCHANGE 20

When a call is initiated by the manual subscriber at the substation K by the removal of his receiver from the associated telephone instrument, a loop circuit, including the conductors of the line 1365, is completed for operating the line relay R1350. This circuit may be traced from ground, by way of the contacts 1341, the conductors of the line 1365 including the loop circuit at the substation K, the contacts 1342, and the winding of the relay R1350, to battery. The relay R1350 operates over this circuit and, at its contacts 1353, applies ground potential to the control conductor terminating in the bank contacts accessible to the connector 1360. This ground potential busies the terminals of the line 1365 and prevents the connector 1360 from extending another connection to the subscriber at the substation K. The relay R1350, upon operating, also completes a circuit, at its contacts 1351, for illuminating the call lamps L1305 and L1312 individual to the jacks J1306 and J1309, respectively.

It should be understood at this time that the jack J1306 is provided at one position of the manual switchboard 1000 and that the jack J1309 is a multiple jack provided at an adjacent position in the manual switchboard 1000. Consequently an operator at either of the two above mentioned positions may answer the call by inserting the answering end of her cord circuit into the jack indicated by the illuminated condition of the lamp L1305 or the lamp L1312. It will be assumed, however, that the operator at the switchboard 1000 inserts the plug P900 of the cord circuit 900 into the jack J1306 in order to answer the call. When the plug P900 is inserted into the jack J1306 the cutoff relay R1340 and the relays R950 and R970 in the cord circuit 900 are operated in a series circuit which extends from ground, by way of the windings of the relays R950 and R970, the contacts 1128, the conductor C975, the sleeve elements of the plug P900 and the jack J1306, and the winding of the relay R1340 to battery. The relay R1340 operates over the above traced circuit and, at its contacts 1341 and 1342, disconnects the circuit of the line relay R1350 from the talking conductors of the line 1365. The relay R1350 now restores to normal and, at its contacts 1351, extinguishes the lamps L1305 and L1312. At its contacts 1353, the relay R1350 disconnects the ground potential applied to the control conductor extending to the banks of the connector and substitutes therefor, at its contacts 1352, a ground potential applied by way of the contacts 1308 of the jack J1306. The ground potential for maintaining the busy condition in the banks of the connectors is now supplied under control of the contacts 1308 of the jack J1306.

The relays R950 and R970 in the cord circuit 900 operate over the above described circuit and prepare the cord circuit for further operation in the same manner as that which has been previously described. The operator at the switchboard 1000 may now actuate the talk key K1100 in order to connect her operator telephone circuit with the cord circuit 900, in the same manner as has been previously described.

After the operator has ascertained the number of the desired called subscriber at the substation B, she inserts the plug P1270 into the jack J800 and manipulates the dial D1485 in accordance with the digits of the called subscriber telephone number. Accordingly, additional operations for the extension of the connection, i. e., the dialing of the called subscriber number, ringing, supervision, and the release of the connection, are performed in the same manner as that which has been described in extending a connection from the subscriber at the substation H to a subscriber at the substation B.

It should be understood that if the subscriber at the substation K desires to extend a connection to the manual subscriber at the substation H, the operator at the switchboard 1000 may extend such a connection by inserting the plug P1270 into the jack J1301. The cord circuit now operates in the same manner as has been previously described in extending a connection to the manual subscriber at the substation H.

Furthermore, if the subscriber at the substation K desires to communicate with an automatic subscriber, such as the subscriber at the substation J, the operator at the switchboard 1000 inserts the plug P1270 into the jack J1303 and completes the connection by dialing the telephone number of the automatic subscriber at the substation J in the same manner as has been described hereinbefore.

In view of the foregoing considerations it will be understood that the manual subscriber at the substation K may be called by other automatic subscribers located in the branch exchange 50, that the manual subscriber may be called by other manual subscribers located in the branch exchange 50, and that the subscriber at the substation K may extend calls to manual subscribers and automatic subscribers in the branch exchange 50 and to automatic subscribers in the main exchange 20. All the above mentioned connections, except the connection from the automatic subscribers in the branch exchange 50 to the substation K, are completed under the control of the operator at the switchboard 1000.

CALL FROM THE AUTOMATIC SUBSCRIBER AT THE SUBSTATION C IN THE BRANCH EXCHANGE 50 TO THE AUTOMATIC SUBSCRIBER AT THE SUBSTATION A IN THE MAIN EXCHANGE 20

A description will now be given of the operation of the telephone system when an automatic subscriber in the branch exchange 50 desires to extend a connection to an automatic subscriber in the main exchange 20. When the subscriber at the substation C removes his receiver from the switchhook of his associated telephone instrument, a loop circuit is completed including the talking conductors of the line 816 and the line circuit 815, whereupon the line circuit 815, the distributor 817, and the finder 811 function in a well known manner to associate the calling line with the selector 810. The selector 810 is now conditioned for further operation and when dial tone is received by the calling subscriber at the substation C he actuates his dial in accordance with the first digit of the telephone number of the desired subscriber in the main exchange 20. The selector 810 operates in a well known manner to raise its wipers to a level terminating a group of trunks, including the trunk 781, and rotates its wipers over the selected level to engage the contacts terminating an idle trunk, such as the trunk line 781.

Assuming that the trunk line 781 is the first idle trunk in the group encountered by the wipers of the selector 810, a circuit is completed for operating the line relay R770 in the trunk circuit 500. This circuit may be traced from ground, by way of the upper winding of the line relay R770, the contacts 761 and 741, the winding 704 of the repeating coil 700, the conductors C784 and C786, the selector 810, the finder 811, the line circuit 815, one conductor of the calling subscriber line 816, a loop circuit at the substation C, the other conductor of the line 816, the line circuit 815, the finder 811, the selector 810, the conductors C785 and C783, the winding 703 of the repeating coil 700, the contacts 742 and 762, and the lower winding of the line relay R770, to battery. The relay R770 operates over the above traced circuit and, at its contacts 773, completes an operating circuit for the hold relay R730. The relay R730 now operates and, at its contacts 732, applies ground potential to the conductor C787 in order to maintain the selector 810 and subsequent switches in the train in their operated positions and to mark the trunk line 781 busy to other selectors having access thereto. At its contacts 734, the relay R730 also applies ground potential to the conductors C782 in order to illuminate the busy lamp L802 and indicate to the operator at the switchboard 1000 that the trunk circuit 500 terminating in the jack J800 is busy and cannot be utilized for other calls. At its contacts 733, the relay R730 also completes a circuit by way of the contacts 716, 649 and 661' for operating the switching relay R710. It should also be noted that in parallel with the above traced circuit an energizing circuit is completed for the left-hand winding of the answer relay R670.

The switching relay R710 operates over the above mentioned circuit and, at its contacts 713 and 715, connects the right-hand winding of the relay R670 in series with the contacts 771 of the operated line relay R770, across the talking conductors C502 and C503 of the trunk line 501. At its contacts 716, the relay R710 prepares a circuit for subsequently operating the relay R760; and at its contacts 717 it completes a circuit including the contacts 626, the resistance 601 and the contacts 614, for operating the relay R520.

The relay R520 operates over the above mentioned circuit and, at its contacts 522, completes an operating circuit for the relay R540, and, at its contacts 521, disconnects the relays R550 and R560 from the TS conductor of the trunk 580. The relay R540, upon operating, at its contacts 542 and 543 disconnects the negative and positive conductors of the trunk 580 from the talking conductors C502 and C503 of the trunk 501, thereby to prevent the seizure of the incoming selector 830 at the present time.

When the above mentioned circuit, including the right-hand winding of the relay R670 and the impulsing contacts 771, is bridged across the talking conductors C502 and C503 of the trunk 501, a loop circuit is completed for seizing the incoming selector 210 in the main exchange 20. The selector 210, upon operating, transmits a dial tone signal over the trunk lines 480 and 501, the trunk circuit 500, the trunk line 781, the selector 810, the finder 811, the line circuit 815, and the line 816 to the subscriber at the substation C in order to indicate that the subscriber may now dial the second and subsequent digits of the telephone number of the called subscriber at the substation A.

The remaining operations in the trunk circuit 500 in response to the dialing of the digits of the called subscriber number by the subscriber at the substation C, are the same as have been previously described in extending a connection from the subscriber at the substation H to the subscriber at the substation B. The main difference lies in the fact that the relay R620 is not operated at this time and that the impulses transmitted to the trunk circuit 500 and repeated thereby to the trunk line 501 are under the control of the dial at the calling substation C instead of under the control of the dial at the operator position. The connector 211 transmits ringing current to signal the called subscriber at the substation B and, when the subscriber responds by removing its receiver, the connector functions in the previously described manner to reverse the direction of current flow over the trunk line 501. Since the operator at the switchboard 1000 is not included in the connection being described, the reversal in the current flow over the trunk line 501 and the trunk line 781 is not utilized for the purpose of giving answering supervision to the operator at the switchboard 1000 but may be used to control the operation of the meter individual to the calling substation.

When the subscribers terminate the connection by replacing their receivers on the switchhooks of their respective telephone instruments, the automatic switching apparatus involved in the connection is restored to normal in the same manner as has been previously described. Consequently, when the calling subscriber at the substation C replaces his receiver the line relay R770 in the trunk circuit 500 restores to normal, whereupon the relay R730 also restores to normal to extinguish the busy lamp L802 and to remove the busy potential from the conductor C787. The trunk circuit 500 may now be used to extend connections in either direction.

EXTENSION OF A TOLL CALL FROM THE SUBSCRIBER AT THE SUBSTATION A TO A SUBSCRIBER REACHED OVER THE TOLL LINE 216 EXTENDING TO A DISTANT EXCHANGE

When an automatic subscriber in the main exchange 20 desires to extend a toll call to a subscriber in a distant exchange, the calling subscriber must dial the number of the toll switchboard 206. When such a call is received at the toll switchboard 206, the operator thereat will complete the connection by extending it over the toll line 216 to the toll board in the desired distant office. More particularly, when the subscriber at the substation A removes his receiver, the line switch 201 operates in a manner previously described to select an outgoing selector, such as the selector 202. When the selector 202 is seized by the line switch 201, dial tone is transmitted to the subscriber at the substation A to indicate that the subscriber may now actuate his dial in accordance with the digits of the telephone number of the toll operator at the toll board 206.

In the present instance it will be assumed that the toll operator may be reached by dialing the single digit "0." Consequently, when the calling subscriber at the substation A actuates the dial in accordance with the digit "0," the selector 202 responds in a well known manner to raise its wipers to the tenth level and automatically rotate its wipers over the level to select an idle trunk line, such as 240, extending to an idle trunk circuit, such as 220, terminating in a jack, such as 208, at the toll board 206. When the call is extended to the trunk circuit 220 it responds in a well known manner to signal the toll operator at the toll board 206 and maintain the selector 202 and the line switch 201 in their operated positions. The toll operator answers the call by inserting the plug of one of her cord circuits, such as 207, into the jack J208 terminating the calling trunk circuit 220 and receives the necessary information for extending the connection to the desired subscriber in the distant office.

The toll operator, after ascertaining the necessary information, inserts the call end of the selected cord circuit 207 into the jack J209 terminating an idle toll line 216, and completes the connection to a toll board in the desired distant office. The toll operator also makes out a toll ticket carrying the necessary information in order to assess the charge for the call against the calling subscriber after connection is terminated.

After the conversation between the calling and called subscribers has been terminated and the subscribers replace their receivers upon the switchhooks of their respective telephone instruments, the toll operator at the toll board 206 receives the disconnect signal and breaks down the connection by removing the plugs of the selected cord circuit 207 from the associated jacks J208 and J209.

In view of the foregoing it should be understood that all toll calls from automatic subscribers located in the main exchange 20 are completed by the toll operator at the switchboard 206 and that the toll operator is obtained by the dialing of the single digit "0." It will be seen from a subsequent description of the operation of the equipment in the illustrated telephone system that the automatic subscribers in the branch exchange 50 must complete their toll calls by first extending the connection to the branch exchange operator at the switchboard 1000. In the event that some subscriber in the branch exchange 50 should attempt to make a direct connection with the toll operator at the toll board 206, and thus by-pass the branch exchange operator at the switchboard 1000, the automatic switching apparatus in the main exchange 20 will function to route the call to the branch exchange operator at the switchboard 1000 instead of to the toll operator at the switchboard 206.

EXTENSION OF A TOLL CALL FROM THE SUBSCRIBER AT THE SUBSTATION J IN THE BRANCH EXCHANGE 50 TO THE TOLL SWITCHBOARD 206 IN THE MAIN EXCHANGE 20.

In the event the subscriber at the substation J desires to extend a toll connection to a subscriber located in a distant exchange (not shown) by way of the toll board 206, the subscriber at the substation J controls the line circuit 1362, the distributor 1396, the finder-selector link 1361, and the connector 1360 in the manner previously described and selects a trunk line, such as the line 1366, terminating in the jack J1313 at the switchboard 1000. It should be noted that in the previous description of the operation of the connector 1360, the connection was extended to the terminals of the line extending to the manual substation K. However, in the present connection the digits dialed into the connector 1360 are such that the wipers thereof are operated into engagement with the bank contacts terminating the conductors of the trunk line 1366. If the trunk line 1366 is busy at the time the wipers of the connector 1360 are positioned into engagement therewith, ground potential will be applied to the conductor C1369 by way of the contacts 1374 of the operated sleeve relay R1370, and the connector in that event will function to transmit busy tone to the subscriber at the substation J to indicate that the trunk line extending to the switchboard 1000 is busy. If the connector 1360 is of the trunk hunting type and there are a plurality of trunk lines, such as the trunk line 1366, the connector will function to automatically rotate its wipers over the selected level to select an idle one of the trunk lines.

It will be assumed that the trunk line 1366 is idle when it is selected by the connector 1360 and, consequently, battery potential will be applied by way of the resistance 1379 and the contacts 1373 to the conductor C1369. The connector now functions in a well known manner to transmit ringing current over the conductors C1367 and C1368, the contacts 1372, the condenser 1378, and the ring-down relay R1380. Since the ring-down relay R1380 is bridged across the line conductors, it responds to the ringing current transmitted over the above traced circuit and, at its contacts 1381, completes an obvious circuit for operating the signal relay R1390. The relay R1390, upon operating, at its contacts 1391, prepares a circuit for operating the ring cut-off relay in the connector in order to terminate the transmission of ringing current therefrom; at its contacts 1393, it completes a locking circuit for itself which is independent of its initial operating circuit including the contacts 1381; and finally, at its contacts 1394, it completes a circuit for illuminating the call lamp L1315 which is individual to the jack J1313.

When the operator at the switchboard 1000 notices the illuminated condition of the lamp L1315, she inserts the plug P900 into the jack J1313. The insertion of the plug P900 into the jack J1313 causes the contacts 1314 of the jack springs to be closed and complete a circuit for operating the sleeve relay R1370 in the line circuit 1385 and the relay R970 in the cord circuit 900. This circuit may be traced from ground, by way of the windings of the relays R950 and R970, the contacts 1128, the conductor C975, the sleeve elements of the plug P900 and the jack J1313, the contacts 1314, and the winding of the sleeve relay R1370, to battery. Although the relay R950 is included in the above traced circuit it does not operate at the present time due to the resistance of the sleeve relay R1370. However, both relays R970 and R1370 operate over this circuit.

The relay R1370, upon operating over the above traced circuit, at its contacts 1373 and 1374, transfers the control conductor C1369 from the resistance battery marking the trunk line 1366 as idle, to the ground potential in order to mark the trunk line busy to all other connectors having access thereto. At its contacts 1371, the relay R1370 connects the resistance 1376 across the talking conductors C1367 and C1368 in order to trip the ring cutoff relay in the connector in a well known manner and thereby terminate the transmission of ringing current by the connector 1360. At its contacts 1372, the relay R1370 also disconnects the ring-down relay R1380 from across the talking conductors C1367 and C1368 and, at its contacts 1375, it opens the circuit of the signal relay R1390. The relay R1390 now restores to normal and, at its contacts 1394, extinguishes the lamp L1315. As a further result of the restoration of the relay R1390, at its contacts 1391, it disconnects the resistance bridge 1376 from across the talking conductors C1367 and C1368 and, at its contacts 1392, it connects the talking conductor C1368 through to the ring element of the jack J1313.

Further operations of the cord circuit 900 as a result of the insertion of the plug P900 into the jack J1313 are the same as have been previously described when the plug P900 was inserted into the jack J800. The operator at the switchboard 1000 now actuates the key K1100 and associates the operator telephone circuit with the cord circuit 900 in order to complete the connection between the calling subscriber at the substation J and the operator telephone circuit. The subscriber now informs the operator at the switchboard 1000 that the desired toll connection is to be extended to a subscriber located in a distant office reached by the toll line 216 in the main exchange 20.

If the operator at the switchboard 100 determines that the calling subscriber is entitled to make a toll call, she advises the subscriber at the substation J to hang up his receiver and wait until the wanted subscriber has been obtained. The calling subscriber at the substation J replaces his receiver on the switchhook of his associated telephone instrument and the operator at the switchboard 1000 withdraws the plug P900 from the jack J1313, and as a result thereof the line circuit 1362, the finder-selector link 1361 and the connector 1360 restore to their normal positions in a well known manner. As a further result of the withdrawal of the plug P900 from the jack J1313, the sleeve relay R1370 is restored to normal, and, at its contacts 1372, reconnects the ring-down relay R1380 across the talking conductors C1367 and C1368 of the trunk 1366. The calling subscriber at the substation J must now wait until the toll operator at the toll board 206 obtains the wanted subscriber over the toll line 216, at which time the toll operator will recall the calling subscriber at the substation J, either directly over the automatic switch train in the branch exchange 50 or by way of the operator at the switchboard 1000, as is described in detail in the copending Wicks application, Serial No. 576,912, filed February 9, 1945, now Patent No. 2,415,057, granted Jan. 28, 1947.

In order that the operator at the switchboard 1000 may call the toll switchboard 206 and inform the toll operator thereat that the calling subscriber at substation J desires a toll connection, separate interconnecting trunk lines are provided between the main exchange 20 and the branch exchange 50. One of these trunk lines is illustrated by the trunk line 851 and terminates in a jack J850 before the operator at the branch exchange switchboard 1000. In order to extend a connection the operator at the switchboard 1000 makes the usual tip busy test, and when it is ascertained that the trunk line 851 is idle the operator inserts the plug P1270 of the cord circuit 900 into the jack J850. When the plug is inserted into the jack, a circuit is completed for operating the relay R1140, which may be traced from ground, by way of the windings of the relays R1150 and R1140, the contacts 1122', the conductor C1265, the sleeve elements of the plug P1270 and the jack J850, and the resistance 853, to battery. The relay R1150 is included in the above traced circuit, but due to the resistance 853 this relay does not operate at this time. The relay R1140, however, operates to perform the same functions that have been previously described.

It will be recalled that when the relay R1140 operates, at its contacts 1149, it completes a circuit for operating the relay R1230. The relay R1230, in turn, at its contacts 1233, completes an energizing circuit for the polarizing winding of the relay R1220 and, at its contacts 1234, it completes a circuit for bridging the upper winding of the relay R1220 and the winding of the relay R1210 across the tip and ring elements of the plug P1270. When the above bridging circuit is completed a loop circuit, including the talking conductors of the trunk line 851, is completed for controlling the line switch 214 in the main exchange 20 in a well known manner in order to select an idle selector, such as the selector 212.

The operator at the switchboard 1000 now actuates the talk key K1100 in order to associate the operator telephone circuit with the tip and ring elements of the call plug P1270. When the dial tone signal is returned from the selector 212 in the main exchange 20 the operator at the switchboard 1000 may actuate the dial D1485 in accordance with the digit "0" assigned for extending connections to the toll operator at the toll board 206. Operation of the telephone circuit and the cord circuit 900 during the transmission of impulses by the dial D1485 has been previously described and for the sake of brevity will not be repeated. The selector 212 in the main exchange 20 responds to the impulses constituting the digit "0" and raises its wipers to the tenth level, whereat it automatically rotates the wipers to select an idle trunk circuit, such as 220, extending to the toll board 206. The trunk circuit 220 responds in a well known manner to maintain the selector 212 and the line switch 214 in their operated positions and to signal the toll operator at the toll board 206.

The operator at the toll board 206 answers the call by inserting the answering plug of the cord circuit 207 into the jack J208, and converses with the operator at the switchboard 1000 in order to obtain the necessary information for completing the toll call to the wanted subscriber in the distant exchange and for recalling the original calling subscriber at substation J. Since the toll call is completed by the toll operator at the board 206 by extending the connection to the desired called subscriber, and then by recalling the original calling subscriber at the substation J, the connection set up by the operator at the switchboard 1000 to the toll operator may now be released. Accordingly, the operator at the switchboard 1000 removes the plug P1270 from the jack J850 and restores the key K1100 to its normal position. Withdrawal of the plug P1270 from the jack J850 causes the trunk circuit 220, the selector 212, and the line switch 214 in the main exchange, to be restored to their normal positions, and in the cord circuit 900 the relays and apparatus involved in the connection are also restored to normal in the same manner as has been previously described.

The toll operator at the toll board 206 may now extend the toll call by way of the toll line 216 to the called subscriber in the distant exchange and may then recall the calling subscriber at the substation J, in the manner described in the copending Wicks application, Serial No. 576,912, filed February, 1945, referred to above.

Although the above toll connection involved the automatic subscriber at the substation J in the branch exchange 50, it should be understood that manual subscribers in the branch exchange 50 may also extend toll calls by obtaining the assistance of the branch exchange operator at the switchboard 1000. In the latter event the operator will also extend the connection by way of her cord circuit 900 to the toll operator at the toll board 206 in the main exchange 20, in the same manner as has been described above in the extension of a toll call from a subscriber at the substation J.

*Attempted extension of a toll call from the branch exchange 50 to the toll board 206 without the assistance of the branch exchange operator*

In the foregoing description of the operation of the telephone system in the extension of toll calls from the branch exchange subscribers to the toll board 206, the operator at the switchboard 1000 was called in order to determine whether or not the calling subscriber is permitted to make the particular toll call. However, toll calls extended by subscribers located in the main exchange 20 may be completed to the toll board 206 by merely dialing the digit "0" and the operator thereat will extend the calls to the desired distant exchange. In the event that an automatic subscriber in the branch exchange 50 attempts to obtain a connection with the toll operator at the toll board 206 by extending a connection to the automatic switching apparatus in the main exchange 20 and by then dialing the digit "0" which is generally used to extend calls to the toll operator, the switching apparatus functions in a manner to be described hereinafter to route such calls to the branch exchange operator at the switchboard 1000.

If an automatic subscriber in the branch exchange 50 attempts to extend a connection to the toll operator at the toll board 206 in violation of his instructions to first call the operator at the branch exchange switchboard 1000, the call will be intercepted by the branch exchange operator. In order to describe the operation of the apparatus when a calling subscriber violates his instructions, it will be assumed that the calling subscriber at the substation C has extended a connection by way of the line circuit 815, the finder 811, the selector 810, the trunk circuit 500, and the trunk lines 501 and 480 to the incoming selector 210 in the main exchange 20. This method of routing a call from the subscriber at the substation C to the main exchange 20 has been previously described in connection with the description of the extension of a call to the subscriber B at the substation B. However, in this case, instead of dialing the selector 210 and the connector 211 to extend a call to a subscriber in the main exchange 20, the calling subscriber dials the digit "0" of the toll operator at the toll board 206. When the incoming selector 210 responds to the digit dialed by the calling subscriber at the substation C, the wipers of the selector are raised to the tenth level and are automatically rotated thereover to select an idle trunk line, such as 862. Assuming that the trunk line 862 is selected, the connection will be further extended to the ring-down repeater 350 located in the main exchange 20. When the latter circuit is seized by the incoming selector 210 it functions in a well known manner to transmit ringing current over the trunk line 861 to the incoming trunk circuit 864 located in the branch exchange 50. The incoming trunk circuit 864 responds to the ringing current transmitted over the trunk line 861 and in a well known manner operates to illuminate the answer lamp L865 individual to the trunk line 853 which interconnects the trunk circuit 864 and the jack J860 located at the switchboard 1000. The calling subscriber at the substation C believes, that since he has obtained a connection with the automatic switching apparatus in the main exchange 20 and has dialed the digit "0" which usually obtains the toll operator when a main exchange automatic subscriber dials the digit "0," he will also be connected with the toll operator at the switchboard 206. It will be noted, however, that the incoming selectors, such as 210, when seized from the branch exchange 50, will complete connections to automatic subscribers in the main exchange 20, but if the digit "0" of the toll operator's position is dialed into the incoming selectors, the call is forwarded by way of the trunk line 862 to the branch exchange operator at the switchboard 1000.

When the operator at the switchboard 1000 notices the illuminated condition of the lamp L865, she answers the call by inserting the answer plug P900 of the cord circuit into the jack J860, and operates the talk key K1100 in the previously described manner. A conversational circuit is now completed between the calling subscriber at the substation C and the operator at the switchboard 1000 over a path which includes the calling line 816, the line circuit 815, the finder 811, the selector 810, the trunk circuit 500, the trunk lines 501 and 480, the incoming selector 210, the trunk line 862, the ring-down repeater 350, the trunk line 861, the incoming trunk circuit 864, the trunk line 863, the jack J860, the plug P900, the cord circuit 900, and the operator telephone circuit of Fig. 14. It should be understood, however, that when the plug P900 is inserted into the jack J860, the incoming trunk circuit 864 functions to terminate the transmission of ringing current from the repeater 350 and to extinguish the lamp L865.

The branch exchange operator obtains the necessary information for completing the toll call for the subscriber at the substation C and, in the event the subscriber is entitled or permitted to make such a toll call, is informed that the toll operator will recall the substation C when a connection is obtained with the wanted subscriber in the distant exchange. When the operator at the switchboard 1000 and the calling subscriber at the substation C disconnect, in the previously described manner, the switching apparatus involved in the connection is again restored to normal.

EXTENSION OF A CALL FROM A MANUAL SUBSRIBER IN THE BRANCH EXCHANGE 50 TO AN AUTOMATIC SUBSCRIBER LOCATED IN EITHER THE BRANCH EXCHANGE 50 OR THE MAIN EXCHANGE 20

In the present telephone system some of the manual substations located in the branch exchange 50 are equipped with the usual dialing mechanism which is ordinarily provided at only the automatic substations. Although these manual lines cannot be directly called through the automatic switching apparatus in the branch exchange 50, arrangements are provided in the cord circuits of the switchboard 1000, whereby such manual lines may control the automatic switching apparatus through the cord circuit utilized, and extend connections to subscribers accessible by way of the automatic switching apparatus in either the branch exchange 50 or the main exchange 20. In order to illustrate the operation of the cord circuit 900 and the associated apparatus when utilized in a connection of the above mentioned type, it will be assumed that the manual substation H is equipped with a standard dialing mechanism and that the subscriber thereat desires to extend a connection to the automatic subscriber at the substation J.

When the calling subscriber at the substation H removes his receiver from the switchhook of his associated telephone instrument, the line circuit 1300 responds in the previously described manner to illuminate the call lamp L1302 associated with the jack J1301. The operator at the switchboard 1000 now inserts the plug P900 into the jack J1301, whereupon the cord circuit 900 functions in the manner previously described in answering a call initiated by the subscriber at the substation H. Consequently, the relays R1320, R950 and R970 operate over the circuit including the sleeve elements of the plug P900 and the jack J1301, thereby extinguishing the lamp L1301. As a further result of the insertion of the plug P900 into the jack J1301 the relay R1060 is operated and, at its contacts 1061, completes an operating circuit for the relay R1050. The operator may now actuate the key K1100 and associate the operator telephone circuit with the talking conductors of the cord circuit 900 in the same manner as has been described hereinbefore. Since the operator is aware of the fact that the calling subscriber at the substation H is provided with a dial and may extend calls to automatic subscribers, the operator upon ascertaining that the calling subscriber desires to extend a connection to the automatic substation J, inserts the plug P1270 into the jack J1303 and instructs the calling subscriber to dial the telephone number of the subscriber at the substation J.

As a result of the insertion of the plug P1270 into the jack J1303, the relays R1140 and R1150 in the cord circuit are energized over the sleeve elements of the plug P1270 and the jack J1303. Due to the resistance 1303' included in the circuit of the above mentioned relays, the relay R1150 does not operate at this time. The relay R1140, upon operating over the above mentioned circuit, at its contacts 1143 and 1145 disconnects the windings of the relay R1060 from the tip and ring elements of the plug P900 and, at its contacts 1142 and 1144, connects the tip and ring elements of the plug P900 with the corresponding elements of the plug P1270. Attention is directed to the fact that if the key K1100 is restored to normal before the plug P1270 is inserted into the jack J1303, a circuit will be completed upon the restoration of the relay R1060, from ground at the dial-through key K1025, by way of the contacts 1123', 1162, 1062, 1051, 1256 and 1146, and the winding of the answer recall relay R1040, to battery. The relay R1040, upon operating, at its contacts 1041, completes a holding circuit for itself which is independent of the contacts 1051, 1062 and 1162; and at its contacts 1042 and 1043, it prepares circuits for flashing the lamps L919 and L1271. In order to prevent the flashing of the lamps during the subsequent operation of the cord circuit 900, the operator now actuates the dial-through key K1025, thereby permitting the relay R1040 to restore to its normal position.

The dialing circuit from the calling subscriber at the substation H now includes the line conductors C1327, the tip and ring elements of the jack J1301 and the plug P900, the contacts 902 and 904 of the key K901, the contacts 951, 954, 1142, 1144, 1151 and 1154, the winding of the supervisory relay R1170, the contacts 1181, 1183, 1241, 1243, 1252 and 1254, the tip and ring elements of the plug P1270 and the jack J1303, the contact 1304, the talking conductors of the trunk 1330, the line circuit 1331, the finder portion of the finder-selector link 1332, and to battery and ground respectively, through the windings of the line relay in the selector portion of the finder-selector link 1332. It should be noted that in the above traced circuit the relay R1170 in the cord circuit 900 is connected in series with the upper or tip conductor of the cord circuit and will restore each time the above traced circuit is interrupted by the impulsing contacts of the calling subscriber's dial. Each time the relay R1170 restores to normal, at its contacts 1171 it opens the circuit of the relay R1160. However, the relay R1160 is of the slow-to-release type and remains in its operated position during the dialing period in order to prevent the illumination of the lamps L919 and L1271.

The line relay (not shown) of the selector portion of the finder-selector link 1332 responds to the impulses transmitted from the calling subscriber's dial and causes the selector to raise its wipers to the selected level and then automatically rotates its wipers over the level to select an idle connector, such as 1333. The next two digits dialed by the calling subscriber control the connector 1333 whereby its wipers are operated in a well known manner to select the line 1334 extending to the substation J. The usual busy test is made by the connector when the wipers are positioned into engagement with the contacts terminating the line 1334 and, if the line is found to be idle, the connector functions to signal the wanted subscriber at the substation J.

When the called subscriber answers the call the connector functions in a well known manner to reverse the direction of current flow over the talking conductors of the line. In the present connection, however, this reversal of current performs no function in the cord circuit 900 and, consequently, the operator does not receive answering supervision. It is to be noted, however, that if the calling subscriber should abandon the call before the called subscriber has answered, the relay R1170 in the cord circuit would restore to normal and open the circuit of the relay R1160. When the relay R1160 restores to normal, at its contacts 1166, it completes a circuit for illuminating the answer lamp L919; and at its contacts 1164, it completes a circuit for illuminating the call lamp L1271. The illumination of the above mentioned lamps indicates to the operator that the calling subscriber has either abandoned the call or that the connection between the calling subscriber at the substation H and the called subscriber at the substation J has been terminated, and that the subscribers have withdrawn from the connection. The operator at the switchboard 1000 may now withdraw the plug P900 and the plug P1270 from the jacks J1301 and J1303. As a result of the removal of the plugs of the cord circuit 900 from the above mentioned jacks, the apparatus involved in the connection is restored to normal in the previously described manner.

While one embodiment of the invention has been disclosed, it will be understood that various modifications may be made therein which are within the true spirit and scope of the invention.

I claim:

1. In a telephone system, a first trunk line, a trunk repeater for said first trunk line, a second trunk line, a line relay in said repeater responsive to impulses of current received over said first trunk line for repeating said impulses over said second trunk line, a pair of windings for said relay normally connected in bridge of said first trunk line, means controlled each time said relay restores to normal during impulsing for temporarily disconnecting said windings from said first trunk line, means operated upon the first control of said last-mentioned means and maintained operated during a series of impulses for completing a circuit for preenergizing one winding of said relay each time said relay is restored, and means controlled by said line relay for repeating said impulses over said second trunk line.

2. In a telephone system, a first line, a line relay in series with said line and responsive to impulses transmitted thereover, a second line, a pair of contacts controlled by said relay for repeating said impulses over said second line, said relay having a pair of windings normally connected in bridge of said first line, means responsive to the first impulse transmitted to said relay for disconnecting said relay windings from said first line, means controlled by said last-named means for completing a preenergizing circuit for said relay thereby partially to magnetize said relay, and means controlled by said disconnect means for restoring said disconnect means to normal thereby to reconnect said windings to said first line, said relay operated responsive to the termination of said first impulse thereby to restore said last-mentioned means and to remove said preenergizing circuit.

3. In a telephone system, a line, a line relay operated over said line, cyclic means controlled by said line relay each time it restores responsive to an impulse transmitted over said line for momentarily disconnecting said relay from said line, and means controlled each time an impulse is terminated for preparing said cyclic means to respond to the next impulse.

4. In a telephone system, a line, a line relay operated over said line, cyclic means operated each time said relay restores responsive to an impulse transmitted over said line for disconnecting said relay from said line and for reconnecting said line to said relay, contacts for completing a preenergizing circuit for said relay during each impulse, and means controlled each time an impulse is terminated for preparing said cyclic means to respond to the next impulse.

5. In a telephone system, a line, a line relay operated over said line and responsive to impulses transmitted thereover; cyclic means controlled each time said relay restores responsive to an impulse for disconnecting said relay from said line, for completing a circuit for preenergizing said relay, and for reconnecting said relay to said line; and means controlled each time said relay operates responsive to an impulse for restoring said cyclic means to normal and for terminating said preenergizing circuit.

KARL L. BURGENER.